US012400768B2

(12) United States Patent
Singh et al.

(10) Patent No.: US 12,400,768 B2
(45) Date of Patent: Aug. 26, 2025

(54) HIGH-DENSITY SUBTERRANEAN STORAGE SYSTEM FOR NUCLEAR FUEL AND RADIOACTIVE WASTE

(71) Applicant: HOLTEC INTERNATIONAL, Camden, NJ (US)

(72) Inventors: Krishna P. Singh, Jupiter, FL (US); Stephen J. Agace, Middletown, DE (US)

(73) Assignee: Holtec International

( * ) Notice: Subject to any disclaimer, the term of this patent is extended or adjusted under 35 U.S.C. 154(b) by 0 days.

(21) Appl. No.: 18/419,615

(22) Filed: Jan. 23, 2024

(65) Prior Publication Data

US 2024/0212874 A1 Jun. 27, 2024

Related U.S. Application Data

(63) Continuation of application No. 17/746,804, filed on May 17, 2022, now Pat. No. 11,881,323, which is a continuation-in-part of application No. 17/527,476, filed on Nov. 16, 2021, now abandoned.

(60) Provisional application No. 63/189,423, filed on May 17, 2021, provisional application No. 63/123,706, filed on Dec. 10, 2020, provisional application No. 63/118,350, filed on Nov. 25, 2020.

(51) Int. Cl.
*G21F 5/10* (2006.01)
*G21F 9/34* (2006.01)

(52) U.S. Cl.
CPC . *G21F 5/10* (2013.01); *G21F 9/34* (2013.01)

(58) Field of Classification Search
CPC .................................... G21F 5/10; G21F 9/34
See application file for complete search history.

(56) References Cited

U.S. PATENT DOCUMENTS

| | | | |
|---|---|---|---|
| 4,192,629 | A | 3/1980 | Hallenius |
| 4,834,916 | A | 5/1989 | Chaudon et al. |
| 5,753,925 | A | 5/1998 | Yamanaka et al. |
| 5,920,602 | A | 7/1999 | Botzem et al. |

(Continued)

FOREIGN PATENT DOCUMENTS

| | | | |
|---|---|---|---|
| DE | 3151475 | A1 | 5/1983 |
| DE | 3244707 | A1 | 6/1984 |

(Continued)

*Primary Examiner* — Janine M Kreck
(74) *Attorney, Agent, or Firm* — The Belles Group, P.C.

(57) ABSTRACT

A passively cooled stackable nuclear waste storage system includes an at least partially below grade cavity enclosure container (CEC) and above grade cask. Each vessel includes a cavity holding a nuclear waste canister containing spent nuclear fuel or other high-level radioactive wastes. The CEC is founded on a below grade concrete base pad and cask is mounted on an above-grade concrete top pad in a vertically stacked arrangement. The upper cask comprises a perforated baseplate which establishes fluid communication between cavities of both casks and is configured to prevent radiation shine. One or both vessels include air inlets which draw ambient cooling air into their respective cavities for cooling the nuclear waste. Air heated in the lower CEC rises into the upper cask through the baseplate where it mixes with air drawn into the cask and is returned to atmosphere. The system increases storage capacity of new or existing facilities.

20 Claims, 44 Drawing Sheets

(56) References Cited

U.S. PATENT DOCUMENTS

| | | | | |
|---|---|---|---|---|
| 6,518,585 | B1 | 2/2003 | Gluschke et al. | |
| 7,068,748 | B2 | 6/2006 | Singh | |
| 7,330,526 | B2 | 2/2008 | Singh | |
| 7,676,016 | B2 * | 3/2010 | Singh | G21F 7/015 250/507.1 |
| 7,786,456 | B2 | 8/2010 | Singh et al. | |
| 8,625,732 | B2 | 1/2014 | Singh | |
| 8,660,230 | B2 | 2/2014 | Singh et al. | |
| 9,460,821 | B2 | 10/2016 | Singh | |
| 10,147,509 | B2 * | 12/2018 | Singh | G21F 9/34 |
| 10,418,136 | B2 | 9/2019 | Singh et al. | |
| 10,446,287 | B2 | 10/2019 | Singh | |
| 2003/0167735 | A1 | 9/2003 | Georgii | |
| 2004/0028170 | A1 | 2/2004 | De Crecy | |
| 2006/0251201 | A1 | 11/2006 | Singh | |
| 2009/0252274 | A1 * | 10/2009 | Singh | G21F 9/34 376/274 |
| 2014/0226777 | A1 | 8/2014 | Singh | |
| 2015/0357066 | A1 | 12/2015 | Singh | |
| 2018/0061515 | A1 * | 3/2018 | Singh | G21F 5/10 |
| 2018/0190401 | A1 | 7/2018 | Singh | |
| 2019/0103197 | A1 | 4/2019 | Singh | |
| 2019/0131024 | A1 | 5/2019 | Holger et al. | |
| 2020/0273591 | A1 | 8/2020 | Muller | |
| 2021/0057120 | A1 | 2/2021 | Singh | |
| 2021/0202123 | A1 | 7/2021 | Rico Arenal et al. | |

FOREIGN PATENT DOCUMENTS

| | | | |
|---|---|---|---|
| FR | 2433816 | A1 | 3/1980 |
| JP | 2000275394 | A | 10/2000 |
| JP | 6728971 | B2 | 7/2020 |
| RU | 2660143 | C2 | 7/2018 |

* cited by examiner

HIGH-DENSITY SUBTERRANEAN STORAGE SYSTEM FOR NUCLEAR FUEL AND RADIOACTIVE WASTE

CROSS-REFERENCE TO RELATED APPLICATIONS

The present application is a continuation of U.S. patent application Ser. No. 17/746,804 filed May 17, 2022, which is a Continuation-in-Part of U.S. patent application Ser. No. 17/527,476 filed Nov. 16, 2021, which claims the benefit of U.S. Provisional Patent Application No. 63/118,350 filed Nov. 25, 2020, and U.S. Provisional Patent Application No. 63/123,706 filed Dec. 10, 2020 U.S. patent application Ser. No. 17/746,804 claims the benefit of U.S. Provisional Patent Application No. 63/189,423 filed May 17, 2021. The foregoing applications are all incorporated herein by reference in their entireties.

FIELD OF THE INVENTION

The present invention relates to spent nuclear fuel and radioactive waste storage systems, and more particularly to such a system suitable for consolidated interim waste storage.

BACKGROUND OF THE INVENTION

Used or spent nuclear fuel and radioactive waste materials are presently stored on an interim basis "on site" at commissioned and some decommissioned nuclear generating plants until the federal government provides a central permanent repository. For example, spent nuclear fuel (SNF) is stored in the reactor fuel pool after removal from the core where it continues to generate decay heat. The fuel can be transferred after a period of cooling in the pool to nuclear waste canisters which are placed in thick-walled outer vessels such as dry storage modules or casks typically constructed of concrete, steel, and iron, etc. to provide containment and radiation shielding. The casks are stored on site at the generating plant.

The concept of using consolidated interim storage (CIS) is intended to provide geographically distributed off-site storage facilities for spent nuclear fuel and other high level nuclear radioactive wastes gathered from a number of individual generating plant sites, thereby providing greater control over the widely dispersed waste stockpiles. The waste materials are stored in sealed nuclear waste canisters such as a multi-purpose canister (MPC) available from Holtec International Inc. of Camden, New Jersey. The canister generally includes an elongated cylindrical stainless steel shell, baseplate, and lid hermetically seal welded to the shell to form the confinement boundary for the stored fuel assemblies disposed in the canister. A fuel basket arranged inside the canister has a rectilinear honeycomb construction defining a plurality of open prismatic cells which each hold a nuclear fuel assembly. The fuel assembly comprises a plurality of nuclear fuel rods or "cladding" which contains the uranium fuel pellets that continue to emit considerable decay heat after removal from the nuclear reactor.

The nuclear waste canisters may be initially transported to the CIS facility from the generating plants for a period of time, with the eventual goal of a final move to a permanent nuclear waste repository when available from the government. Such so called independent spent fuel storage installations (ISFSI) are facilities designed for the interim storage of spent nuclear fuel comprising solid, reactor-related, greater than Class C waste, in addition to other related radioactive materials. Each ISFSI facility would typically maintain an inventory of a multitude of waste canisters containing spent nuclear fuel and/or radioactive waste materials.

Some ISFSIs comprise multiple storage modules which store nuclear waste below ground/grade and are ventilated by natural ambient cooling air. Such existing underground nuclear waste storage systems however do not meet all current needs of ISFSIs in all situations. For example, the modules may be fluidly coupled to the source of available ambient cooling air and/or each other in a manner which may deprive certain modules of the ventilation air required for optimal cooling of the radioactive waste in each module.

In addition, the generally only a single nuclear waste storage cask with single MPC therein occupies a dedicated space or spot on an ISFSI concrete slab or pad laid above grade. However, this practice does not make efficient use of available ISFSI storage space and results in such nuclear waste storage facilities quickly reaching maximum capacity.

Accordingly, improvements in nuclear waste storage practices and systems are needed.

SUMMARY OF THE INVENTION

The present disclosure in one aspect provides an underground naturally ventilated and passively cooled radioactive nuclear waste storage system designed for below ground/grade storage of fuel. The system comprises a plurality of modules such as CECs (cavity enclosure containers) which may be arrayed in an upright position on a subterranean concrete base pad situated below the storage site's final cleared grade of topsoil and/or engineered fill. A majority of the height of the underground CECs is therefore preferably located below grade created a low profile for protection against potential intentional or unintentional projectile impacts. The CECs in the array may be arranged in a single-file linear pattern spaced apart manner thereby forming nuclear waste storage row extending horizontally along a common longitudinal axis in in one embodiment. Multiple parallel linear rows of CECs may be provided in a CIS facility which may form an ISFSI facility.

In one embodiment, each CEC defines an internal cavity having a height and diametrically configured in cross-sectional area for holding a single cylindrical spent nuclear fuel (SNF) canister. The canister holds the SNF assemblies and/or other high level radioactive waste materials as previously described herein which continue to emit considerable amounts of heat that require dissipation in order to protect the structural integrity of fuel assemblies or other waste material. In certain other embodiments contemplated, multiple canisters may be vertically stacked one above each other in a single CEC such as disclosed in commonly owned U.S. Pat. No. 9,852,822, which is incorporated herein by reference. In this case, the CECs may be diametrically configured in cross-sectional area to hold a single canister at a single elevation in both the upper and lower positions within the CEC.

The CECs and canisters inside are cooled using a passive ambient air ventilation system unassisted by fans or blowers in preferred but non-limiting embodiments to circulate cooling air through the CECs. Heat emitted by the canister fluidly drives a convective natural thermo-siphon effect to draw ambient air through the CECs cavity in the annulus between the CEC and canister as the air inside the annulus is heated by the canister. In other possible embodiments, fans/blowers may be provided if necessary, but are less preferred since the interruption of electrical power to the CIS site may interfere with the ability to adequately cool the CECs and radioactive nuclear fuel and/or other waste material housed therein.

In preferred but non-limiting embodiments, each CEC includes a minimum of two air inlets. Two air inlets are provided in one embodiment. The air inlets are fluidly coupled via laterally and horizontally extending flow conduits directly to at least one direct source of cooling air (i.e. there are no intervening CECs in the air flow pathway defined by the flow conduits between the cooling air source and air inlets of the CEC). Further, each CEC is not fluidly coupled in a direct manner via the flow conduits to any other CEC (i.e. shell-to-shell). This advantageously minimizes fluidic air flow interaction between adjacent CECs which may result in air pressure imbalance in which those CECs containing radioactive waste materials emitting greater heat than others disproportionally draw a greater amount of the available ventilation air in the system than other CECs which may be partially starved of sufficient cooling air.

The cooling air source in some implementations may be one or more vertically-elongated and tubular/hollow ambient cooling air feeder shells. The air feeder shells may have a smaller outer diameter than the CECs, thereby allowing the CECs to be spaced as closely as possible to conserve available nuclear waste storage space at the CIS facility within each row of CECs. The air feeder shells are each in fluid communication with ambient atmosphere at top and operable to draw cooling air downwards into the shell via the natural convective thermo-siphon effect driven by the heat emitted from nuclear waste canister within the CEC. The air flows to and enters the CEC via the flow conduits, is heated by the radioactive waste in the canister, and then is exhausted back to atmosphere through the top of the CEC which may be located above grade to define an air outlet.

In some embodiments disclosed herein, the pair of air inlets of the CEC may each be fluidly coupled directly to a single discrete and separate cooling air feeder shell via the flow conduits. In other embodiments disclosed herein, the CEC is fluidly coupled directly to a pair of air feeder shells via flow conduits. In yet other embodiments disclosed herein for nuclear waste still emitting extremely high levels of heat conductively passed through the nuclear waste canister walls, a high airflow capacity system is provided in which each CEC is fluidly coupled to two pairs (i.e. four) cooling air feeder shells. In all of these embodiments, each air inlet of the CEC is fluidly coupled directly to an air feeder shell via a separate dedicated single flow conduit rather than a shared branch or header type flow conduit arrangement as in some past approaches which may prevent each CEC from receiving the required volume/flow rate of cooling air in some situations.

In any of the foregoing three possible cooling air supply arrangements of the CECs and cooling air feeder shells, the provision of at least two separate air inlets for each CEC and direct fluid coupling to one or more feeder shells advantageously improves the ability of the natural ventilation system to adequately cool each CEC to the necessary degree in order to protect the structural integrity of the SNF assemblies and/or other high level nuclear waste stored inside the canisters in the CEC. Because the ambient cooling air flowing to each CEC from one or two cooling air feeder shells does not first pass through any upstream intervening CECs such as employed in some prior systems, the flow rate of ambient cooling air supplied directly to the CEC for naturally ventilating its interior space or cavity and cooling the SNF canister is therefore not diminished. This prevents the situation in such prior ventilation systems where a vertically-oriented CEC or storage shell located at the end of a number of fluidly and serially interconnected CECs may not receive an adequate amount of cooling air due. This is due to the fact that upstream CECs may have drawn a disproportionate share of the available cooling air supply flowing through the ventilation system. By instead directly coupling each CEC directly to at least one cooling air feeder shell according to the present disclosure, the required amount of cooling air to adequately cool the canister in each CEC via the thermo-siphon fluid flow effect is assured irrespective of the level of decay heat generated by the radioactive waste material in each CEC. Air pressure imbalances between the CECs due to disparate levels of decay heat are thus also avoided.

In a nuclear waste storage system such as a CIS facility with passive ambient air ventilation system according to the present disclosure in which multiple parallel linear rows of CECs are provided, no CEC in one row may be fluidly coupled to any other CECs or cooling air feeder shells in another adjacent row either directly or indirectly (i.e. via an intervening CEC or flow conduits). This prevents fluidic interaction between CECs in adjoining rows which could result in possible pressure and flow imbalances, thereby causing disproportionate cooling of some CECs versus others as previously described herein. In addition, it bears noting that use of multiple parallel rows of CECs which are not fluidly interconnected advantageously simplifies expansion of an existing CIS facility since no prior rows of CECs need to be partially unearthed to make new fluid couplings to existing buried CECs.

The collective array of CECs according to the present disclosure may form part of an independent spent fuel storage installation (ISFSI) facility suitable for a CIS system that may include any suitable number of CECs desired. The CECs may be part of a CIS system such as HI-STORM UMAX (Holtec International Storage Module Underground Maximum Safety) which is an underground Vertical Ventilated Module (VVM) dry spent fuel storage system engineered to be fully compatible with all presently certified multi-purpose canisters (MPCs). Each HI-STORM UMAX Vertical Ventilated Module provides storage of an MPC in the vertical configuration inside a cylindrical cavity located entirely below the top-of-grade of the ISFSI. The VVM, akin to the aboveground overpack, is comprised of the CECs; each of which includes a removable top closure lid according to the present disclosure.

The nuclear waste canisters usable in the present CECs, which may contain both radioactive used or spent nuclear fuel (SNF) and/or non-fuel radioactive waste materials, may be stainless steel multi-purpose canisters (MPCs) available from Holtec International of Camden, New Jersey. Other canisters may be used.

The present underground nuclear waste storage system is intended to provide vanishingly low site boundary radiation dose levels and safety during catastrophic events. As an underground system, the system takes advantage of the surrounding soil/engineered fill or subgrade to provide radiation shielding, physical protection, and a low center of gravity for a stable storage installation.

According to one aspect, an underground passively ventilated nuclear waste storage system comprises: a horizontal longitudinal axis; a subterranean concrete base pad; a vertically elongated first cavity enclosure container located on the base pad and the longitudinal axis, the cavity enclosure container defining a vertical centerline axis and comprising a first air inlet, a second air inlet, an air outlet, and an internal cavity; the cavity of the first cavity enclosure container being configured for holding a nuclear waste canister which contains radioactive nuclear waste emitting heat; a vertically elongated first cooling air feeder shell in fluid communication with an ambient atmosphere and operable to draw in ambient air, the first cooling air feeder shell being fluidly coupled directly to the first air inlet of the first cavity enclosure container via a first flow conduit; a vertically elongated second cooling air feeder shell in fluid communication with the ambient atmosphere and operable to draw in ambient air, the second cooling air feeder shell being fluidly coupled directly to the second air inlet of the first cavity enclosure container via a second flow conduit. In one embodiment, the first cavity enclosure container is not fluidly coupled directly to any other cavity enclosure container.

According to another aspect, an underground passively ventilated nuclear waste storage system comprises: a horizontal longitudinal axis; a subterranean concrete base pad; a vertically elongated first cavity enclosure container located on the base pad and the longitudinal axis; a vertically elongated second cavity enclosure container located on the base pad and the longitudinal axis, the second cavity enclosure container being spaced apart from the first cavity enclosure container; the first and second cavity enclosure containers each defining a vertical centerline axis and comprising a first air inlet, a second air inlet, an air outlet, and an internal cavity; a nuclear waste canister positioned in each of the internal cavities of the first and second cavity enclosure containers, the canister emitting heat; a vertically elongated cooling air feeder shell arranged on the longitudinal axis between the first and second cavity enclosure containers, the cooling air feeder shell being in fluid communication with an ambient atmosphere and operable to draw in ambient air; the cooling air feeder shell fluidly coupled directly to the first air inlet of the first cavity enclosure container via a first flow conduit; the cooling air feeder shell fluidly coupled directly to the first air inlet of the second cavity enclosure container via a second flow conduit; wherein the first cavity enclosure container is not fluidly coupled directly to any other cavity enclosure container, and the second cavity enclosure container is not fluidly coupled directly to any other cavity enclosure container.

According to another aspect, a consolidated interim storage facility for nuclear waste comprises: a plurality of elongated cavity enclosure containers each founded on a subterranean base pad and extending vertically upwards therefrom to a concrete top pad; an engineered fill disposed between the base and top pads; the cavity enclosure containers being arranged in an array comprising a plurality of longitudinally-extending and parallel linear rows of cavity enclosure containers, each row defining a longitudinal axis and the cavity enclosure containers each being arranged on the longitudinal axis; a plurality of vertically elongated cooling air feeder shells disposed in each row on the respective longitudinal axis, one cooling air feeder shell being interposed between and fluidly coupled directly to a pair of the cavity enclosure containers on opposite sides of the cooling air feeder shell, the cooling air feeder shells each being in fluid communication with an ambient atmosphere; the one cooling air feeder shell being operable to draw in ambient air and distribute the air to directly to each pair of cavity enclosure containers; wherein the cavity enclosure containers in each row are fluidly isolated from the cavity enclosure containers in any other row.

According to another aspect, an underground passively ventilated nuclear waste storage apparatus for a consolidated interim storage facility, the apparatus comprising: a vertically elongated cavity enclosure container supported on a subterranean base pad and extending vertically upwards therefrom to a concrete top pad; an engineered fill disposed between the base and top pads; a nuclear waste canister positioned in an internal cavity of the cavity enclosure containers, the canister emitting decay heat which heats air in an annulus formed between the cavity enclosure container and the canister; a vertically elongated hollow cooling air feeder shell arranged on a lateral side of the cavity enclosure container, the cooling air feeder shell being in fluid communication with an ambient atmosphere and operable to draw in ambient air; the cooling air feeder shell fluidly coupled directly to a lower portion of the cavity by a first air inlet of the cavity enclosure container via a first flow conduit; the cooling air intake shell further fluidly coupled directly to the lower portion of the cavity by a second air inlet of the cavity enclosure container via a second flow conduit; the first and second flow conduits being fluidly coupled to a lower portion of the cooling air feeder shell; wherein a cooling air flow pathway is defined in which ambient cooling air is drawn into the cooling air feeder shell, flows through the first and second flow conduits to the lower portion of the cavity of the cavity enclosure container, flows upwards in the annulus and is heated by the canister, and exits from an air outlet at a top of the cavity enclosure container back to atmosphere.

The present disclosure also addresses the challenge of limited nuclear waste storage capacity at an ISFSI facility and overcomes the drawback of the past practices noted above. In one embodiment, a stackable nuclear waste storage system may comprise a pair of vertically stacked nuclear waste storage vessels including a lower below grade module and an upper above grade module.

The below grade module may be a vertically elongated CEC (cavity enclosure containers) described above which is mounted on the subterranean concrete base pad of the ISFSI and situated below the storage site's final cleared grade of topsoil and/or engineered fill. The above grade module may be a vertically-elongated radiation-shielded cask positioned above the below grade CEC. The CEC and cask may each have a cylindrical body in one embodiment. The above grade cask may be coaxially aligned with a vertical centerline axis of the below grade CEC. In one embodiment, the cask may be fixedly and detachably mounted to the ISFSI top pad such as via bolting or other means. In such a design, there may be no direct fixed coupling via bolting or other means of the cask to the below grade CEC. In other possible embodiments, the cask may be directly coupled to top of the CEC (e.g., bolted or otherwise) either instead of or in addition to mounting to the concrete top pad.

The CEC and cask each define an internal cavity configured for holding a single nuclear waste canister, such as a multi-purpose canister (MPC) available from Holtec International of Camden, New Jersey, or other dry storage canister. Such canisters are known in the art and are unshielded from a radiation attenuation or blockage standpoint which instead is provided by the embedment of the below grade CEC in the concrete top pad and engineered fill for a first canister in the first case, and the above grade thick radiation-shielded cask for a second canister in the second case. The cask may include a sidewall which comprises concrete that may contain hematite or another iron ore to increase conductive heat transfer through the cask sidewall to ambient atmosphere. The internal cavities of the CEC and cask each have a height and transverse cross-sectional area configured to hold no more than a single nuclear waste fuel canister therein.

The internal cavities of the CEC and cask may be in direct fluid communication internally within the stacked modules such that heat cooling air from the lower CEC flows directly upwards into the upper cask via natural convective thermo-siphon flow. The process and act of mounting the upper cask above the lower below grade CEC establishes fluid communication between the internal nuclear waste storage cavities of each module. Whereas the lower CEC includes a solid metallic baseplate hermetically seal welded to its bottom end which effectively closes body from a fluidic standpoint, the bottom of the upper cask conversely is not fully closed. Instead, a perforated support structure may be mounted inside the lower portion of the cask internal cavity which comprises a plurality axial through holes which fluidly interconnect the internal cavities of the CEC and cask. Because the top end of the CEC in the stacked nuclear waste storage module assembly is open, the perforated support structure allows air from the cavity of the lower CEC heated by thermal energy emitted for the nuclear waste canister therein to flow upwards into the cavity of the upper cask.

At least the lower below grade CEC includes at least one ventilation or cooling air inlet configured to draw in ambient air for cooling the canisters inside both the CEC and upper cask. In certain preferred but non-limiting embodiments, the upper cask may include a plurality of air inlets to separately draw ambient air into its internal cavity independently of the air inlet of the lower CEC. This secondary ventilation or cooling air provides additional cooling capacity for the canister in the upper cask and is mixed with the already heated ventilation or cooling air rising upwards into the cavity of the cask from the CEC below. Whereas the cask may draw ambient cooling air directly in from the ambient atmosphere via its air inlets formed through the sidewall of the cask, the cooling air system for the below grade CEC may include a vertically elongated cooling air feeder shell in fluid communication with an ambient cooling air and the at least one air inlet of the CEC via a lateral/horizontal flow conduit. The air feeder shell which extends below grade for a majority of its height is operable to draw in ambient cooling air downwards and horizontal into the internal cavity of the CEC.

The ventilation or cooling air system for the fluidly interconnected stacked CEC and cask assembly operates via natural convective thermo-siphon flow driven by the decay heat emitted from the canisters inside the casks emanating from the SNF (or other high level nuclear waste) stored in the canisters located inside the lower CEC and upper cask. The cooling air system thus passively cools the nuclear waste without requiring the assistance of blowers or fans. The heated ventilation air is returned to the ambient environment via the top closure lid on the upper cask, as further described herein.

Because the body of the lower CEC of the stackable nuclear waste storage system advantageously is located for a majority of its height below grade, handling and mounting the upper above grade cask over the CEC does not exceed the maximum lifting height limitations of conventional track-driven cask crawlers, thereby allowing use of such standard equipment for moving and mounting the upper cask to the concrete top pad.

In one aspect, a passively ventilated nuclear waste storage system comprises: a lower cavity enclosure container configured for mounting at least partially below grade, the cavity enclosure container comprising at least one first air inlet and a first internal cavity configured for holding a first canister which contains radioactive nuclear waste; and an upper cask comprising a second internal cavity configured for holding a second canister which contains radioactive nuclear waste, the cask being located above grade; at least one air outlet configured to allow heated air in a top portion of the second internal cavity to exit the second internal cavity of the cask; the cask stacked atop the lower cavity enclosure container in a vertically stacked arrangement so that a cask-to-cask interface is formed between the cavity enclosure container and the cask; wherein the first and second internal cavities are fluidly interconnected so that heated air in a top portion of the first internal cavity can flow into a bottom portion of the second internal cavity.

In another aspect, a method for forming a passively cooled nuclear waste system comprises: positioning a cavity enclosure container on a below above grade concrete base pad, the lower cavity enclosure container including a body comprising a first cavity; inserting a first canister containing nuclear waste emitting thermal energy in the first cavity of the lower cavity enclosure container; providing an upper cask on an above grade including a body comprising a second cavity; inserting a second canister containing nuclear waste emitting thermal energy in the second cavity of the upper cask; positioning the upper cask on an above grade concrete top pad atop of the lower cavity enclosure container in a vertically stacked arrangement, the second cavity being placed in fluid communication with the first cavity of the lower cavity enclosure container; and detachably coupling the upper cask to the top pad.

The method may further include drawing ambient cooling air into the first cavity of the lower cavity enclosure container through at least one air inlet in the lower cavity enclosure container.

The method may further include: detachably coupling a closure lid on a top end of the upper cask after inserting the second canister therein; heating the cooling air in the first cavity; flowing the heated cooling air upwards into the second cavity of the upper cask; drawing ambient cooling air into the second cavity of the upper cask through a plurality of second air inlet ducts; mixing the heated cooling air with the cooling air drawn into the second cavity of the upper cask; further heating the mixed cooling air in the second cavity; and discharging the further heated cooling air to ambient atmosphere via a closure lid detachably coupled to a top end of the upper cask. The upper cask may comprise a perforated baseplate at bottom, and wherein the foregoing step of flowing the heated cooling air upwards into the second cavity of the upper cask comprises flowing the heated cooling air through the perforated baseplate in the upper cask. The perforated baseplate comprises a plurality of axial through holes configured to prevent radiation streaming or shine to the ambient environment.

In another aspect, a method for adding storage capacity to an existing nuclear waste storage system comprises: positioning a lower cavity enclosure container on a below grade concrete base pad at a first point in time, the lower cavity enclosure container including a body comprising a first cavity and at least one air inlet in fluid communication with the first cavity and ambient atmosphere; inserting a first canister containing nuclear waste emitting thermal energy in the first cavity of the lower cavity enclosure container; detachably coupling a first closure lid on top of the lower cavity enclosure container, the first closure lid defining at least one air outlet duct in fluid communication with the second cavity of the lower cavity enclosure container; operating the lower cavity enclosure container for a period of time; removing the first closure lid from the lower cavity enclosure container at a second point in time later than the first point in time; positioning an upper cask on an above grade concrete top pad, the upper cask including a body comprising a second cavity and plurality of radial second air inlet ducts in fluid communication with the second cavity; inserting a second canister containing nuclear waste emitting thermal energy in the second cavity of the upper cask; lifting and repositioning the upper cask on the top pad atop the lower cavity enclosure container; establishing fluid communication between the first cavity of the lower cavity enclosure container and the second cavity of the upper cask; and detachably coupling the upper cask to the top pad atop the cavity enclosure container in a vertically stacked arrangement.

BRIEF DESCRIPTION OF THE DRAWINGS

The features of the exemplary embodiments of the present invention will be described with reference to the following drawings, where like elements are labeled similarly, and in which.

Figure 1:
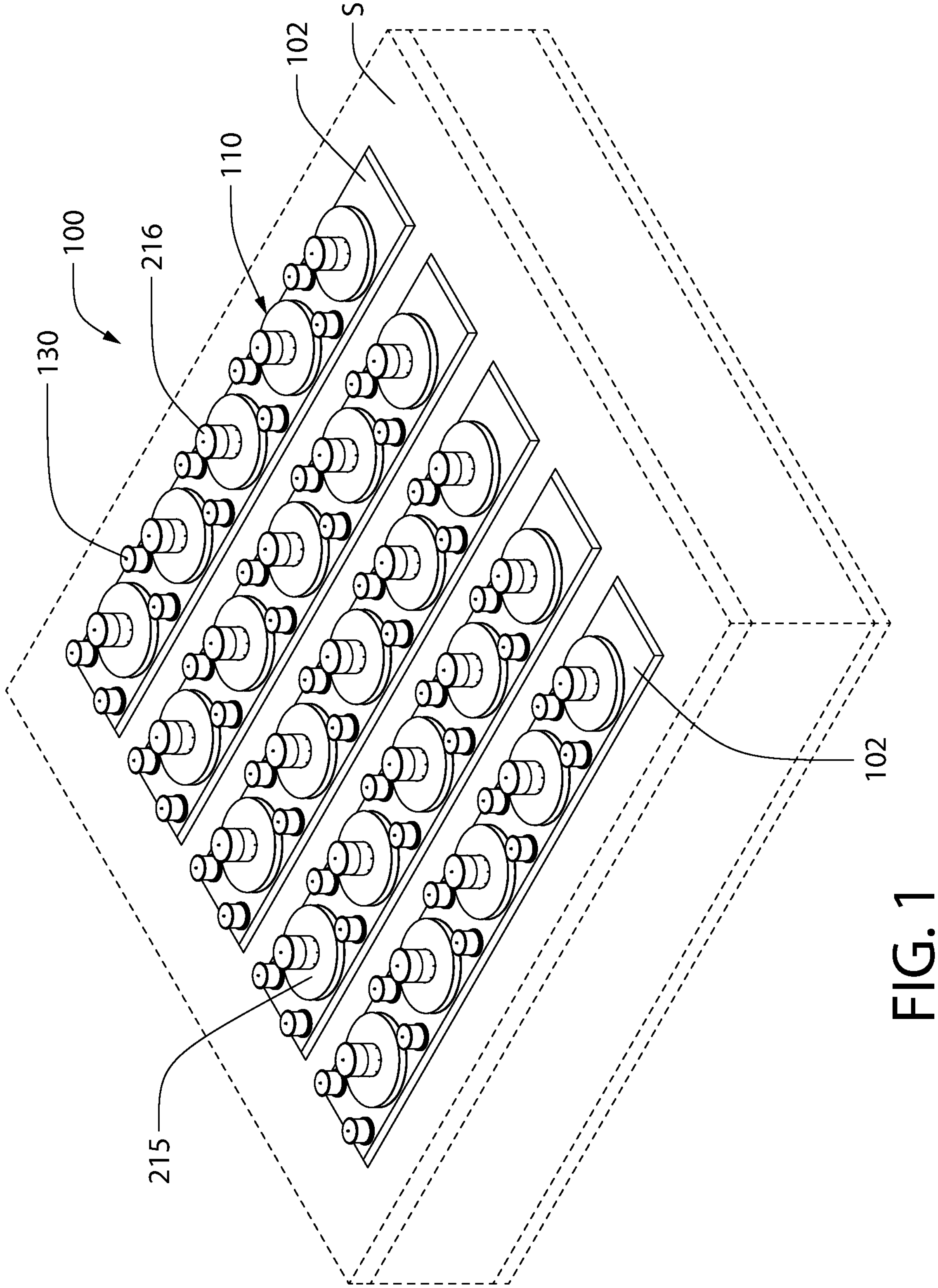
FIG. 1 is a perspective view of an ISFSI facility comprising a first embodiment of a nuclear waste storage system according to the present disclosure for consolidated interim storage of spent nuclear fuel and other high level radioactive nuclear waste materials.

All drawings are schematic and not necessarily to scale. Parts given a reference numerical designation in one figure may be considered to be the same parts where they appear in other figures without a numerical designation for brevity unless specifically labeled with a different part number and described herein. References herein to a whole figure number herein which may comprise multiple figures with the same whole number but different alphabetical suffixes shall be construed to be a general reference to all those figures sharing the same whole number, unless otherwise indicated.

DETAILED DESCRIPTION OF THE EMBODIMENTS

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein to prior patents or patent applications are hereby incorporated by reference in their entireties. In the event of a conflict in a definition in the present disclosure and that of a cited reference, the present disclosure controls.

Figure 2:
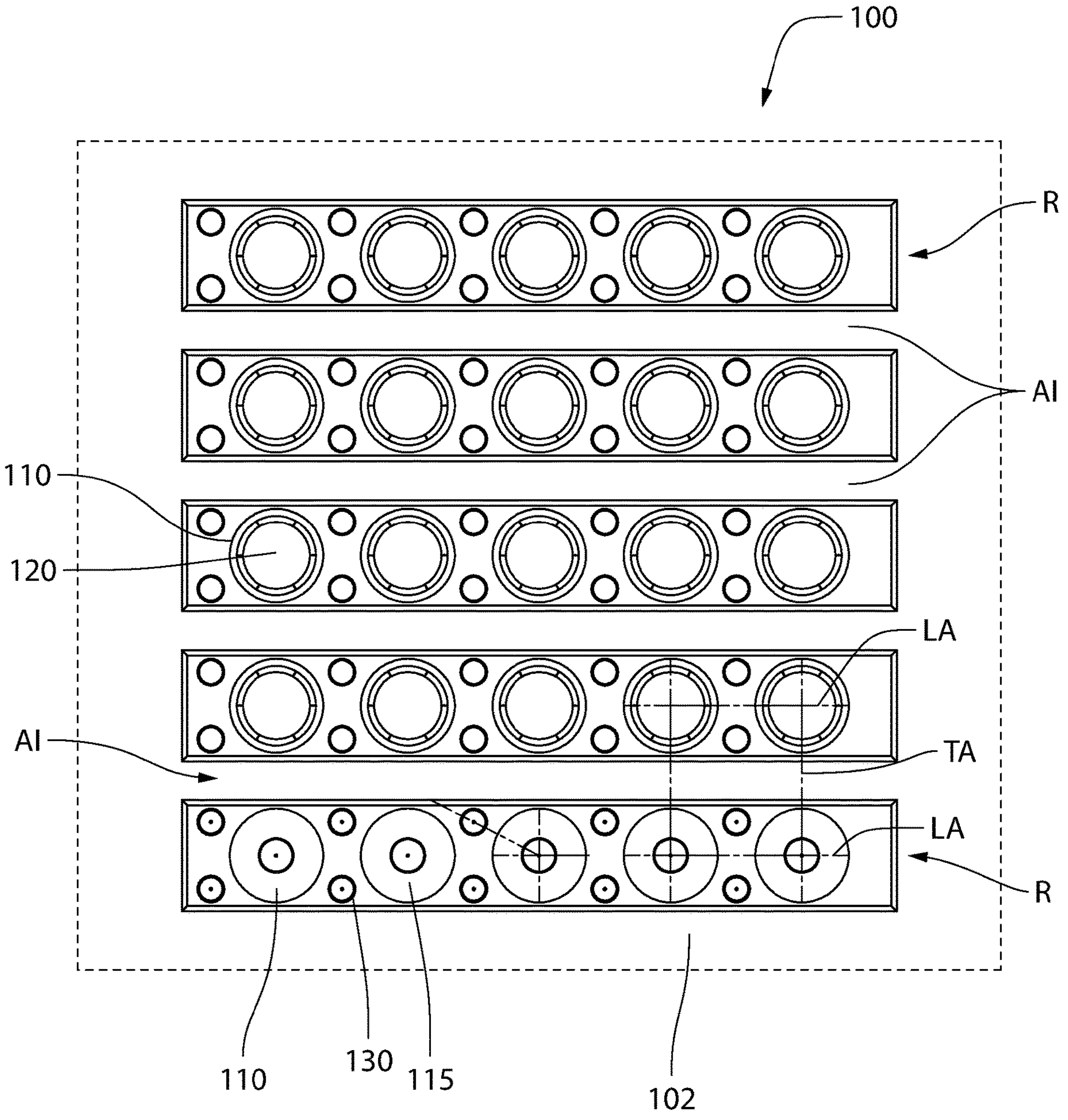
FIG. 2 is a top plan view thereof.

FIGS. 1 and 2 depict a top views of an ISFSI facility comprising a passively cooled subterranean consolidated interim storage (CIS) system 100 according to the present disclosure. System 100 comprises an array of underground vertical ventilated cavity enclosure containers (CECs) 110 each holding a single nuclear waste canister 150 containing the radioactive nuclear waste, and vertically elongated cooling air feeder shells 130 interspersed between and fluidly coupled to the CECs according to the present disclosure. The CECs and air feeder shells are configured to form integral parts of an unpowered natural convective ventilation system which operates via the thermo-siphon effect to cool the nuclear waste fuel stored in each CEC, as further described herein.

Figure 4:
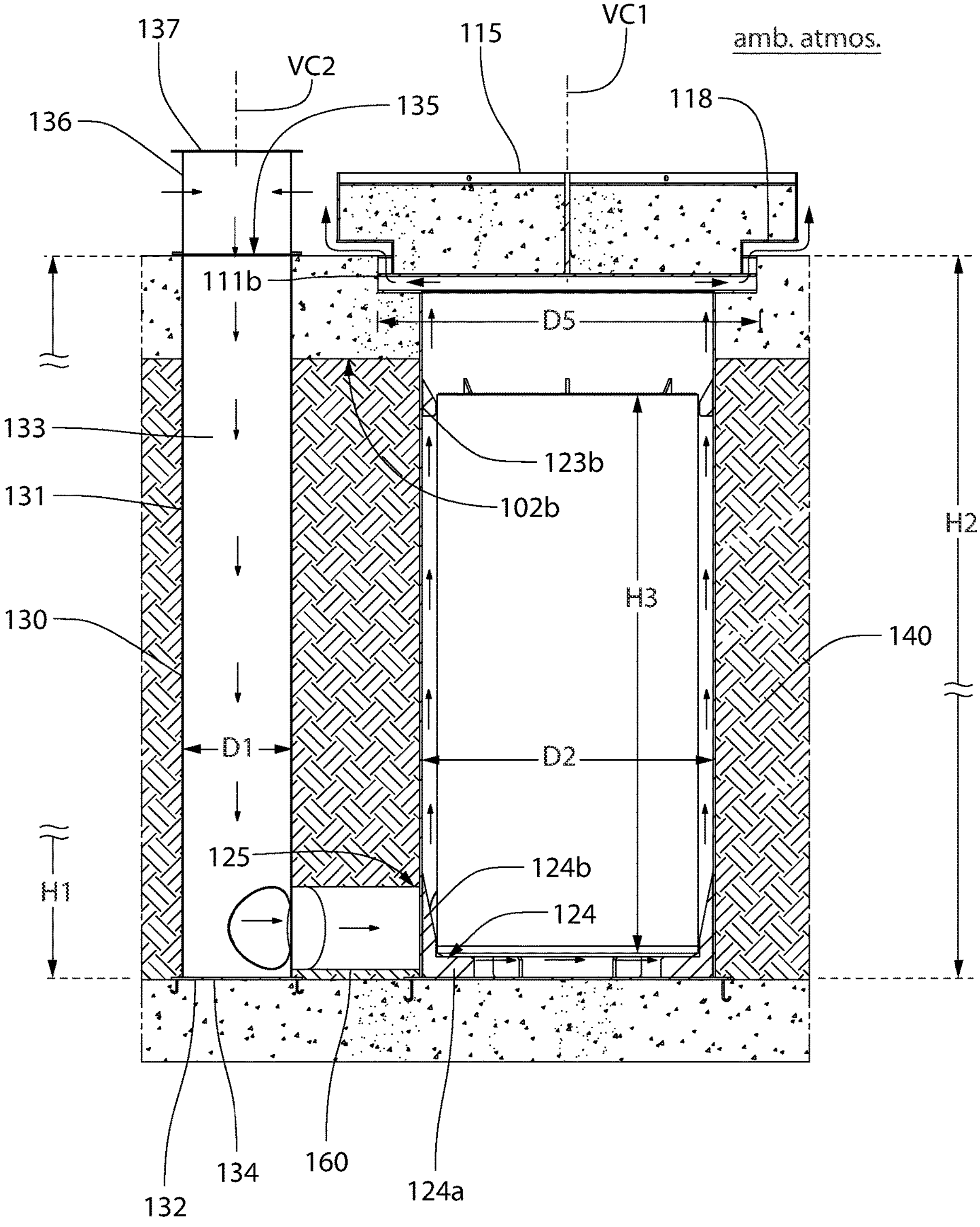
FIG. 4 is a first cross sectional view of a second embodiment of a nuclear waste storage system showing a cavity enclosure container (CEC) and cooling air feeder shell thereof.
Figure 5:
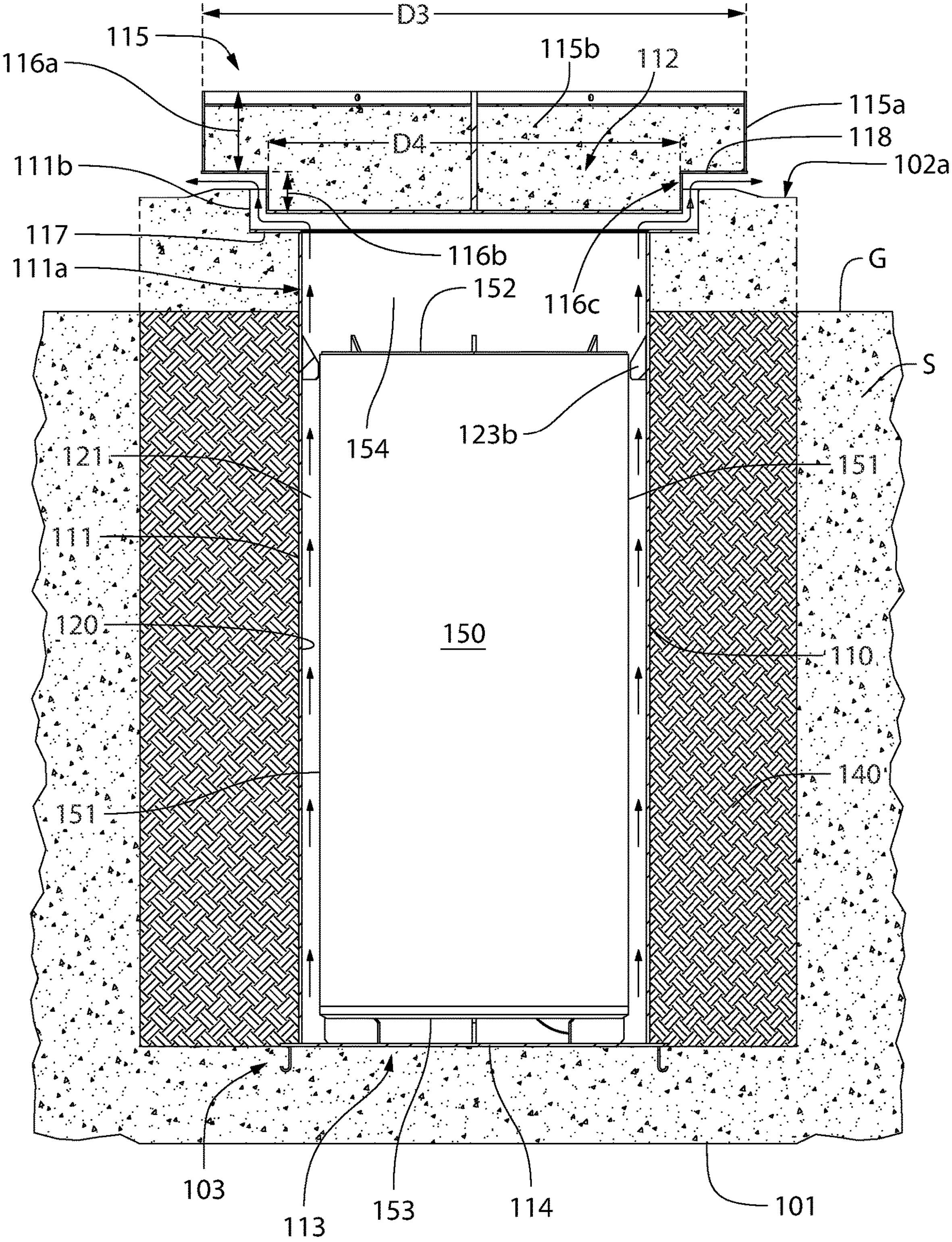
FIG. 5 is a second cross sectional view thereof of the CEC alone.

FIGS. 4 and 5 depict one embodiment of a CEC 110 and cooling air feeder shell 110 of a nuclear waste storage system according to the present disclosure in greater detail. The CECs 110 and cooling air feeder shells 130 are founded on and supported by a thick and horizontally extending subterranean bottom base pad 101 located below a cleared top surface or grade "G" of the native soil "S" at the CIS system site. Base pad 101 may be made of reinforced concrete in one embodiment; however, in other embodiments other materials may be used such as compacted gravel so long a stable and firm base is provided to support the CECs and air feeder shells. In the case of concrete as shown in the illustrated embodiment, the CECs and air feeder shells may be rigidly anchored to the base pad via multiple anchor members 103 such as robust J-shaped fasteners (threaded or otherwise), or other suitable types of anchors commonly used for fastening structural objects to concrete. Preferably, base pad 101 has a suitable thickness and construction robust enough to withstand postulated seismic events and maintain safe support the CECs 110 and containment of their nuclear waste contents.

A horizontally and longitudinally extending concrete top pad 102 is formed on top of the engineered fill 140 described below which is placed after pouring base pad 101. Top pad 102 therefore protrudes upwards from and is raised above the cleared grade G of the surrounding native soil S. The top pad is vertically spaced apart from the below grade base pad 101. The top pad defines an upward facing top surface 102*a* elevated above grade to prevent the ingress of standing water from the surrounding native soil S into the CECs 110 originating from rain events. Top surface 102*a* is substantially parallel to an upward facing top surface 101*a* of base pad 101 (the term "substantially" accounting for small variations in the level of surfaces 101*a*, 102*a* and recesses and/or contours formed therein for various purposes). The top pad 102 preferably extends at least one CEC outer diameter beyond the peripheral CECs 110. A gradually sloping terrain of native soil S around the top pad is preferred to facilitate rainwater drainage away from the CECs.

The vertical gap or space formed between base and top pads 101, 102 including the open horizontal/lateral space between adjacent CECs 110 and cooling air feeder shells 130 is filled with a suitable "engineered fill" 104 to provide both lateral radiation shielding for the nuclear waste stored inside the CECs 110, and full lateral structural support to the CECs and the cooling air feeder shells 130. Any suitable engineered fill may be used, such as without limitation flowable CLSM (controlled low-strength material) which is a self-compacting cementitious fill material often used in the industry as a backfill in lieu of ordinary compacted soil fill. Plain concrete may also be used as the inter-CEC and base pad to top pad gap filler material if it is desired to further increase the CIS system's radiation dose blockage capabilities. Other types of fill material which can provide radiation shielding and lateral support of the CECs and air feeder shells may be used.

With continuing general reference to FIGS. 4 and 5, each CEC 110 comprises a vertically elongated metallic shell body 111 defining a vertical centerline axis VC1 and which extends between a top end 112 and bottom end 113 of the body. The upper portion 111*a* of the shell body which defines top end 112 may be embedded in in concrete top pad 102 including between the top surface 102*a* and bottom surface 102*b* of the top pad 102 as shown. In some embodiments shown in FIGS. 4-5 and 17-19. the top end 112 of the CEC shell body 111 may terminate at the top surface 102*a* of the top pad. In either case, body 111 of CEC 110 may be cylindrical with a circular transverse cross-sectional shape in preferred non-limiting embodiments; however, other non-polygonal and polygonal shaped bodies may be used in certain other acceptable embodiments. The shell body 111 of each CEC 110 defines a vertically extending internal cavity 120 extending between ends 112, 113 which is configured for holding a cylindrical nuclear waste canister 150. As previously described herein, the waste canister 150 defines an interior space which holds spent fuel assemblies and/or other high level radioactive waste from the nuclear reactor.

The nuclear waste canister 150 stored in CEC 110 includes a vertically-elongated hollow cylindrical shell 151, top closure plate 152, and bottom closure plate 153. The top and bottom closure plates are hermetically seal welded to the top and bottom ends of shell 151 to form a gas-tight containment boundary for the nuclear waste stored in the canister. Canister 150 (i.e. shell and closure plates) may be formed of stainless steel in preferred embodiments for corrosion resistance. Canister 150 has a height H3 smaller than the height H2 of the CEC shell body 111 such that the top of the canister is spaced vertically apart and downwards from the bottom of the concrete top pad 102 (see, e.g., FIG. 3). This helps to both ensure that there is no lateral radiation streaming outwards from the CEC 110 at the top, and provides impact protection from incident projectiles (e.g., missiles, etc.). Canister 150 may be any type of nuclear waste/SNF canister, including without limitation Multi-Purpose Canisters (MPCs) available from Holtec International of Camden, New Jersey.

CEC 110 further includes a baseplate 114 hermetically seal welded to the bottom end 113 of shell body 111. A plurality of metallic radial support lugs 124 are welded to baseplate 114 and/or inside surface of the CEC shell body 111 in a circumferentially spaced apart manner at the bottom of cavity 120. The lugs are formed of suitable metal (e.g., stainless steel or other) and act to support and elevate the canister 150 above the baseplate. This creates open space between the top of the baseplate 114 and bottom closure plate 153 of the canister 150 to allow cooling ventilation air to circulate beneath the canister for removing heat emitted from the bottom of the canister by the nuclear waste material stored therein.

In one embodiment, the support lugs 124 may be generally L-shaped having a horizontal portion 124*a* welded to baseplate 114 and an integral adjoining vertical portion 124*b* welded to the inner surface of the CEC shell body 111. Vertical portions 124*b* each define radially-extending lower seismic restraint members which engage the sides of the canister 150 to keep it centered in the cavity 120 of the CEC 110 particularly during a seismic event (e.g., earthquake). A plurality of radially-extending upper seismic restraint members 123*b* project inwards from the shell body 111 in cavity 120 to keep the upper portion of the canister 150 centered. Restraint members 123*b* may be formed by circumferentially spaced apart metal plates or lugs welded to the inner surface of the CEC shell body 111.

When the canister 150 is positioned in the cavity 120 of the CEC 110, a ventilation annulus 121 is formed therebetween which extends for the full height of the canister. The ventilation annulus is fluid communication with the cooling air feeder shells 130 at the bottom via flow conduits 160 and an air outlet plenum 152 formed inside the CEC cavity 120 above the canister.

The shell body 111 and baseplate 114 of each CEC 110 may be formed of a suitable metal such as stainless steel for corrosion resistance.

The top end 112 of CEC 110 is enclosed by a removable thick radiation shielded lid 115 detachably mounted on top of the CEC shell body 111. The lid may have a composite metal and concrete construction including an outer shell 115*a* formed of steel such as stainless steel, and interior concrete lining 115*b*. This robust construction not only provides radiation shielding, but also offers added protection against projectile impacts. In one configuration, lid 115 includes a cylindrical circular upper portion 116*a* and adjoining cylindrical circular lower portion 116*b* having an outer diameter D4 smaller than an outer diameter D3 of the upper portion. An annular stepped shoulder 116*c* is formed between the upper and lower portions of the lid. Diameters D3 and/or D4 in some embodiments may be larger than an outer diameter D2 of the CEC shell body 111.

Lower portion of 116*b* of lid 115 is insertably positioned inside a corresponding upwardly open circular recess 117 formed into the top surface 102*a* of the top pad 102 around the top end 112 of each CEC 110 as shown (see, e.g., FIGS. 4-5). Recess 117 is larger in diameter D5 that the outer diameter D2 of the CEC shell body 111. In one embodiment, the upper portion 111*a* of CEC 110 (i.e. shell body 111) may include a diametrically enlarged top cylindrical section 111*b* which has the same diameter D5 as recess 117 and in fact defines the recess in this embodiment shown in FIGS. 14 and 16). The lid is slightly elevated and ajar from top pad 102 in its recess to create an air outlet 118 thereby forming an exit pathway between the lid and CEC 110 for the rising ventilation air from the cavity 120 of the CEC to return to ambient atmosphere. The air outlet 118 is configured to form a circuitous multi-angled pathway such that there is no direct line of sight from cavity 120 to atmosphere for radiation to escape (i.e. radiation streaming). Outlet 118 may have a double L-shaped configuration in one embodiment for this purpose as shown in FIG. 2; however other circuitous shaped pathways may be used.

Figure 16:
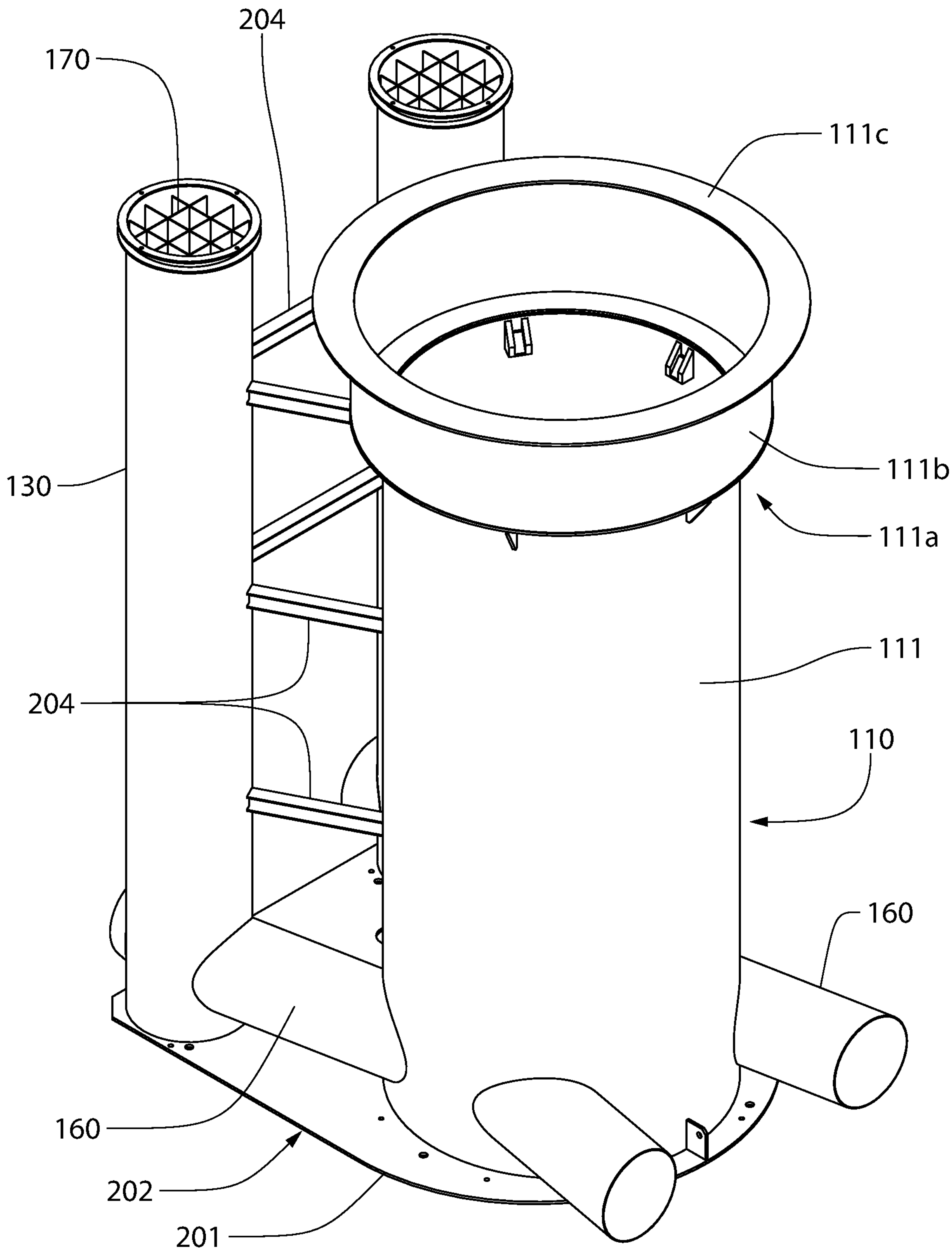
FIG. 16 is a top perspective view thereof.
Figure 17:
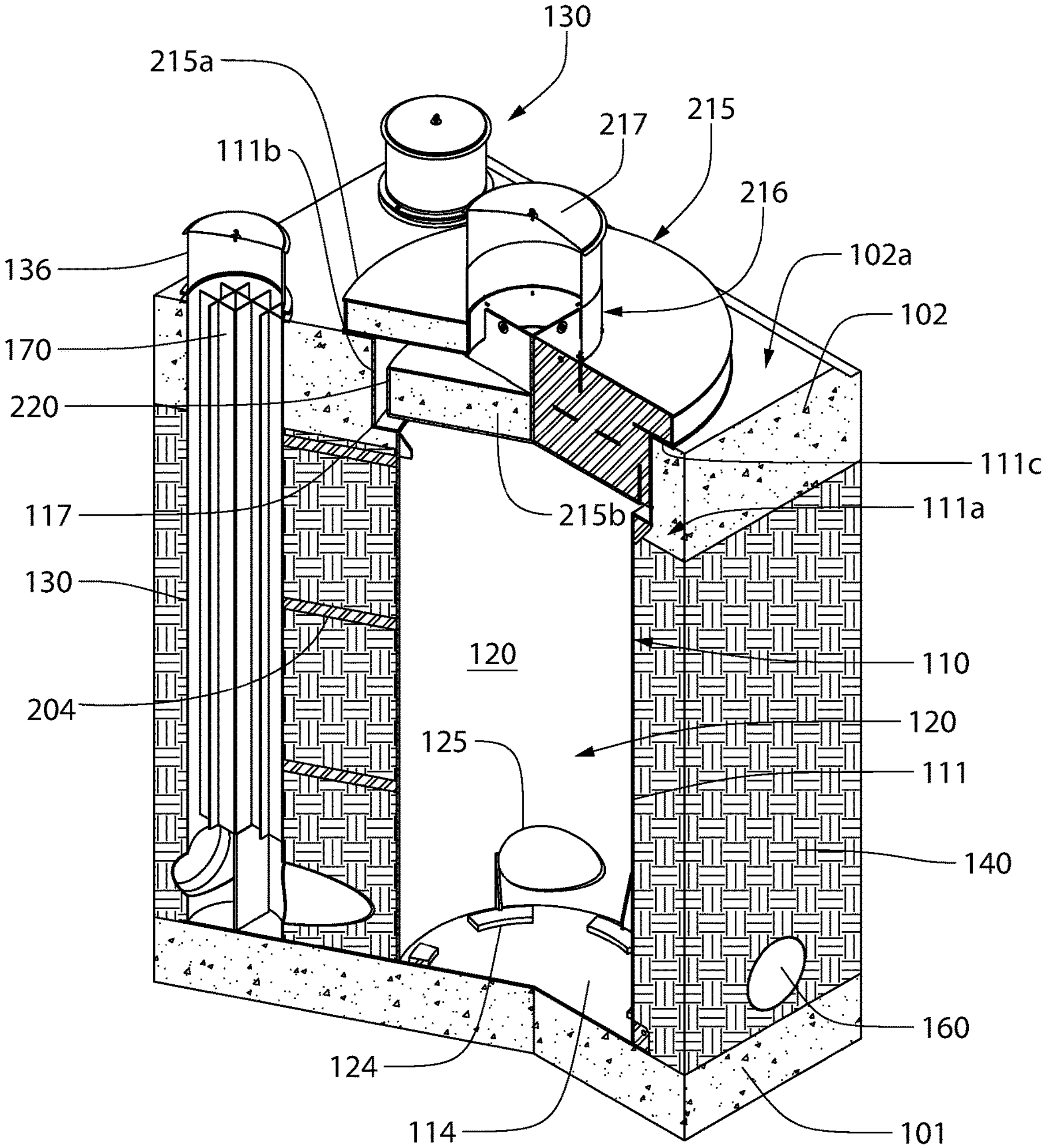
FIG. 17 is a cross-sectional perspective view thereof showing the modular nuclear waste storage unit installed on a concrete base pad below grade, a concrete top pad, and engineered fill therebetween.
Figure 18:
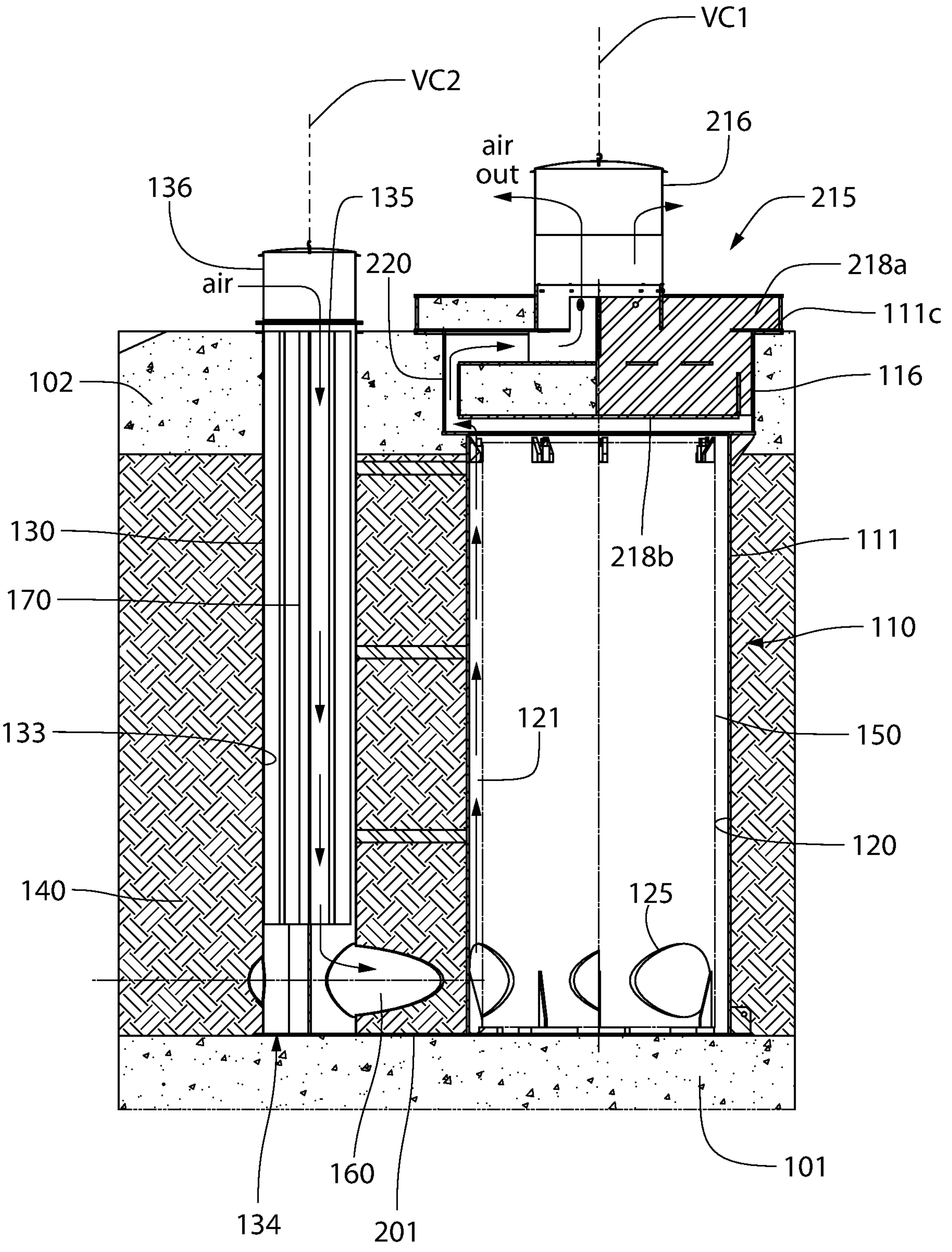
FIG. 18 is a cross-sectional side view thereof.

In some embodiments as shown in FIGS. 16-18, the top section 111*b* of the CEC shell body 111 may further include a flat radially projecting annular seating flange 111*c*. The seating flange is configured for engaging and resting on top surface 102*a* of the concrete top pad 102.

Each cooling air feeder shell 130 is a tubular hollow structure comprising a metallic vertically-elongated body 131 defining a vertical centerline axis VC2 and bottom closure plate 132 welded to the bottom end 134 of the shell. The vertical centerlines VC2 and VC1 of the CECs 110 are parallel to each other. The body 131 may be cylindrical with a circular transverse cross-sectional shape in preferred non-limiting embodiments; however, other non-polygonal and polygonal shaped bodies may be used in certain other acceptable embodiments. The body 131 of each feeder shell defines an open vertical air passage 133 extending between the bottom end 134 and top end 135 of the shell 130 for drawing ambient cooling air downwards through the shell. The top end of shell 130 may terminate at the top surface 102*a* of the concrete top pad 102 in some embodiments. A perforated air intake housing 136 is coupled to the top end 135 of the shell 130 which projects vertically upwards from the top pad 102 as shown. In one embodiment, housing 136 may be formed of a cylindrical shell which is perforated to form a plurality of lateral openings extending 360 degrees circumferentially around for drawing air laterally into the feeder shell 130. A circular cap 137 encloses the top of the air inlet housing 136 to prevent the ingress of rain. The air feeder shell 130, bottom closure plate 132, air intake housing 136, and cap 137 may be formed of metal such as stainless steel for corrosion protection. Other shaped caps and intake housings may be used in other embodiments.

To minimize rising air leaving the top of the cavities 120 of the CECs 110 which has been heated by the canisters 150 from being drawn back into the intake housings 136 of the cooling air feeder shells 130, each feeder shell is preferably spaced apart from the shell bodies 101 of adjacent CECs by a sufficient lateral/horizontal distance such as at least one outer diameter D1 of feeder shell in some embodiments.

With continuing reference to FIGS. 4 and 5, cooling air feeder shells 130 have a height H1 which is at least coextensive as height H2 of CEC shell bodies 111. As one non-limiting example, H2 and H1 may be about 227 inches (576.6 cm). In one embodiment, shells 130 may have a slightly greater height H1 (measured between bottom and top ends 134, 135) than height H2 of the CEC shell bodies 111 (measured between bottom and top ends 113, 112 of the bodies in including upper portion 111*a*).

The canister 150 has a total height H3 (inclusive of the top and bottom closure plates 152, 153) less than height H2 of the CEC shell bodies 111 so that an air outlet plenum 154 is formed between the bottom of CEC lid 115 and the top closure plate 152 of the canister. The top of the canister defined by top closure plate 152 terminates beneath the concrete top pad 102 of the CIS system at an elevation that may fall within the vertical extent of the engineered fill 140. This helps prevent "sky shine" radiation streaming to the ambient environment.

Referring to FIGS. 1 and 2, the cavity enclosure containers 110 and cooling air feeder shells 130 in one embodiment may be arranged in a tightly packed array to minimize spatial site requirements at the CIS facility. The array comprises a plurality of longitudinally-extending and parallel linear nuclear waste storage rows R each including a plurality of CECs 110 and cooling air feeder shells 130. For convenience of illustration, the array in FIGS. 1-2 shows only five rows R; however, it is recognized that more or less rows of CECs and air feeder shells may of course be provided as needed. Each row defines a respective horizontally-extending longitudinal axis LA. The geometric centers of each CEC which intersect their vertical centerline axes VC1 intersect the respective longitudinal axis LA in each row such that the CECs 110 may be considered to be located on the longitudinal axis. For convenience of reference, a transverse axis TA may be defined as oriented perpendicularly to the longitudinal axis LA in each row extending front to back between rows R in the array (see, e.g., FIG. 2).

The nuclear waste storage rows R of CECs 110 are spaced apart and parallel to each other to form longitudinally-extending access aisles AI which provide access for commercially-available motorized wheeled or track driven lifting equipment such as without limitation cask crawlers or other equipment which transport, maneuver, and raise/lower the canisters 150 for insertion into and removal from the CECs 110. The equipment may straddle the row of CECs 110 and the wheels or tracks run in aisles AI on each side of the row. Such equipment is well known to those skilled in the art without further elaboration. The low exposed vertical profile of the CECs 110 (as further described herein) allows the equipment to move over the CECs modules in a single row to the desired CEC for inserting or removing canisters.

FIGS. 4-7 show a possible first embodiment and arrangement of CECs 110 and cooling air feeder shells 130. In this embodiment, each CEC 110 in each row R is fluidly coupled directly to a pair of cooling air feeder shells 130 by horizontally/laterally extending flow conduits 160; one each of feeder shells 130 being on opposite lateral sides of the CECs along the longitudinal axis LA as shown. Viewed the other way, each air feeder shell 130 may be considered centrally located between a pair of CECs. Each CEC therefore comprises a pair of air inlets 125 on opposite sides forming openings which extend through the shell body 111 of the CEC 110 to the internal cavity 120. The air inlets 125 are therefore formed in and through the lower portion 111*d* of the CECs (i.e. shell body 111) to introduce cooling air into the bottom of the CEC cavity 120 and ventilation annulus 121. In a preferred but non-limiting embodiment, the air inlets 125 are each configured and arranged to introduce cooling ventilation air tangentially into the cavity 120 of each CEC 110 as shown. Introduction of cooling air in this tangential manner which flows circumferentially around the inner surface of the CEC to quickly fill the CEC cavity and ventilation advantageously results in less pressure drop than introducing the air radially and perpendicularly at the canister shell 151.

The flow conduits 160 comprise sections of horizontally-extending metal piping spanning between the cooling air feeder shells 130 and their respective CECs 110. The flow conduits fluidly couple each CEC air inlet 125 "directly" to a respective air feeder shell 130 meaning that the cooling air passes from the feeder shell to the respective CEC without passing through any other CEC or feeder shell on the way. As previously described herein, this arrangement advantageously maximizes the amount of cooing air received by each CEC 110 commensurate with the level of heat emitted by the canisters in each CEC which may differ. Accordingly, no CEC is starved of its required cooling air flow by any upstream CEC. Because the CECs and their nuclear waste material contents are passively and convectively cooled via the natural thermo-siphon effect as previously described herein, pressure imbalances in the cooling air ventilation system which can adversely affect proper cooling of each CEC are avoided by the present cooling equipment arrangement. The provision of two air inlets 125 for each CEC 110 and separate sources of cooling air (i.e. feeder shells 130) for each inlet further ensures each CEC is cooled to remove the heat generated in its cavity to the maximum extent possible.

For the same foregoing reasons to ensure each CEC 110 receives the needed amount of cooling air based on its particular heat load generated by the nuclear waste canister 150 therein, it further bears noting that there is no interconnecting flow conduits between any CECs or cooling air feeder shells 130 in one row and any other rows R. Accordingly, each nuclear waste storage row R is fluidly isolated from every other row.

Although perhaps not readily apparent from the figures, it also bears noting that each CEC 110 in a single row R is fluidly isolated from adjacent CECs and every other CEC in the same row when the ambient air cooling ventilation system is in operation (i.e. nuclear waste canisters 150 disposed in the CECs thereby creating active air flow through the ventilation system via the thermo-siphon effect previously described herein). For example, referring to FIG. 4, ambient cooling air will be drawn downwards in the centrally located air feeder shell 130 and then flow laterally outwards to each of the two CECs 110 pictured via flow conduits 160 (see directional air flow arrows). The cool air enters the bottoms of the CECs and flows vertically upwards as the air in the CEC cavities 120 is heated by the canisters 150 (see, e.g., FIG. 2). Accordingly, given the direction of flow through these nuclear waste storage system components, air cannot possibly flow from one CEC 110 backwards through the centrally located air feeder shell 130 and into the remaining CEC. The CECs are therefore effectively fluidly isolated from each other.

As previously noted, the flow conduits 160 may comprise sections of metal piping such as stainless steel of suitable diameter. In preferred but non-limiting embodiments, the flow conduits are configured such that there is no straight line of sight between each cooling air feeder shell 130 and either of its respective pair of cavity enclosure containers 110 fluidly coupled thereto to prevent radiation streaming. This concomitantly also ensures there is no straight line of sight between any of the CECs 110 in the row R through the feeder shells 130. In one configuration, flow conduits 160 may each comprise an angled transverse section 162 oriented transversely to the longitudinal axis LA, and an adjoining longitudinal section 161 oriented parallel to the longitudinal axis. A welded mitered joint 163 may be formed between the transverse and longitudinal sections (see, e.g., FIG. 6). An oblique angle is formed between these two sections of the flow conduit. In other possible embodiments, curved piping elbows may be used instead of mitered sections of straight piping to prevent the straight line of sight.

Because each cooling air feeder shell 130 need only be sized in diameter to supply cooling air to a pair of CECs 110, the diameter of the feeder shells can be minimized to allow CECs in each row to be closely spaced. This advantageously allows more CECs and nuclear waste to be packed into each row R. Accordingly, in preferred but non-limiting embodiments, the outer diameter D1 of the feeder shells 130 may be smaller than the outer diameter D2 of the CECs 110. As one non-limiting example, D1 may be about 30 inches (76.2 cm) and D2 may be about 84 inches (213.4 cm). For size comparison, the flow conduits 60 May have a smaller diameter than D1 or D2; such as for example without limitation about 24 inches (61 cm) in one embodiment. Other diametrical sizes may be used in other embodiments and does not limit the invention.

To summarize operation of the nuclear waste storage system and ambient cooling air ventilation system, nuclear waste canisters 150 containing radioactive waste materials (e.g. SNF fuel assembly and/or other high level radioactive waste materials removed from the reactor) are loaded into the CECs 110. The lids 115 are then placed onto the CECs to enclose the CECs and their internal cavities.

With the canisters positioned inside the CECs and lids in place, air in the ventilation annulus 121 between the canister and shell body 111 of each CEC 110 becomes heated by the canister. The heated air rises, collects in the air outlet plenum 154 above the canister in cavity 120 of the CEC, and exits the CEC back to atmosphere through the air outlet 118 formed through the lid 115 of the CEC (see directional air flow arrows in FIGS. 4-5 and 18).

The upward convective flow of air inside cavity 120 of each CEC 110 creates a negative pressure which draws ambient air down into the cooling air feeder shell 130 via the known thermo-siphon effect or mechanism. The CEC draws the air from the bottom of the air feeder shell into the lower portion of its internal cavity 120 and ventilation annulus 121 through the flow conduits 160 to complete the ventilation air flow circuit. It bears noting that this natural air flow is unassisted by powered fans or blowers, thereby avoiding operating costs associated with electric power consumption, but importantly ensuring continued cooling of the CECs 110 in the event of power disruption to prevent overheating the CECs and protect the containment of the nuclear waste materials.

Figure 20:
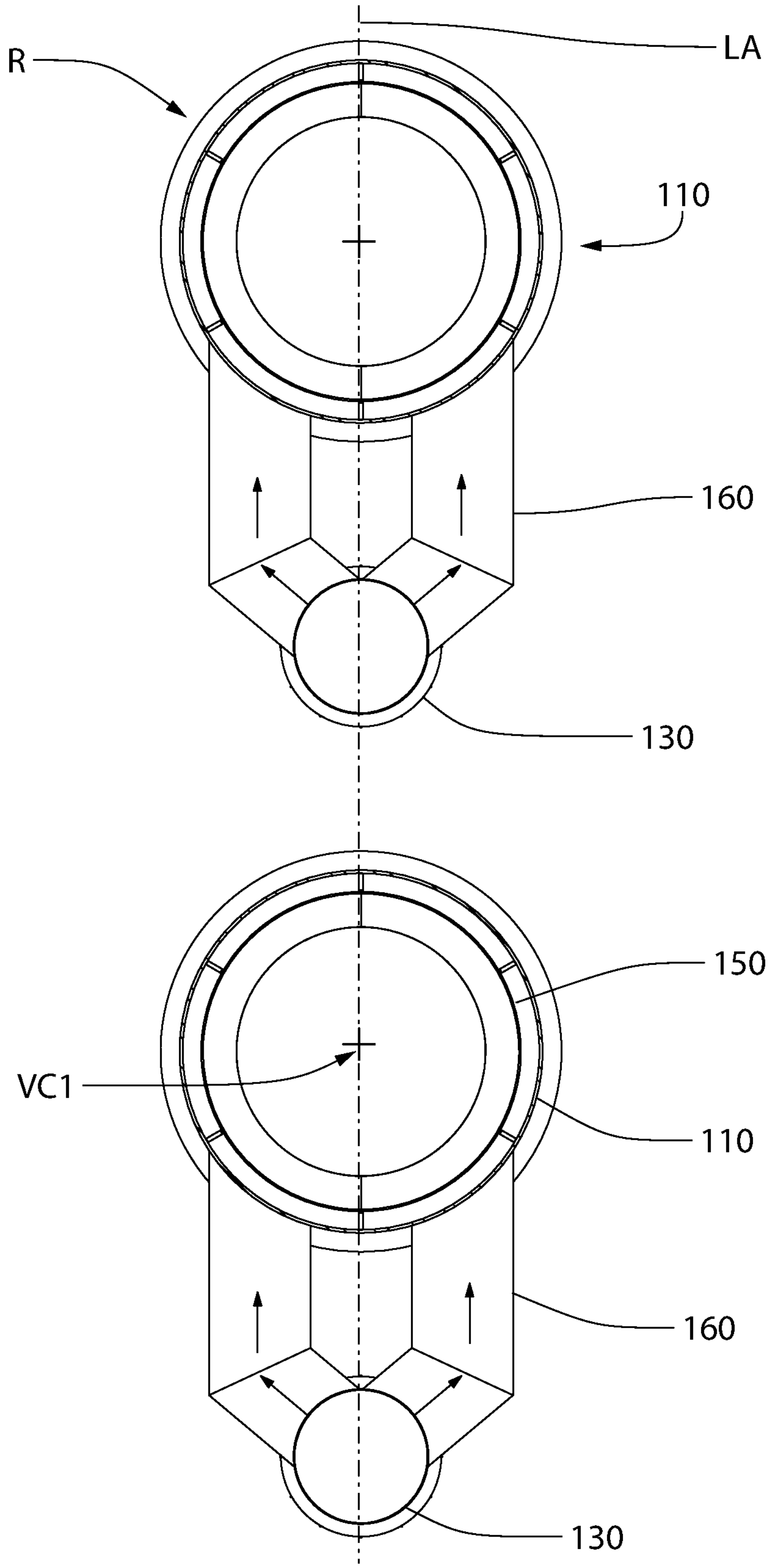
FIG. 20 is a top view of a third embodiment of a nuclear waste storage system according to the present disclosure showing a pair of CECs and cooling air feeder shells.

FIG. 20 depicts an alternative second embodiment and arrangement of a nuclear waste storage system and corresponding air ventilation system. In this embodiment, each CEC 110 is fluidly coupled to only a single cooling air feeder shell 130 by a pair of angled/curved flow conduits 160 to prevent radiation streaming as previously described herein. The CEC includes two air inlets 125 also arranged to introduce ventilation air tangentially into the internal cavity of the CEC. The bifurcated ventilation air supply effectively creates a curtain of cooling air around the nuclear waste canister 150 inside the CEC with minimal flow resistance to maximize the air flow for cooling the radioactive waste material. This alternative embodiment may be appropriate where certain canisters 150 are still emitting extremely high levels of thermal energy (heat) which must be dissipated in order to protect the structural integrity of the canister and nuclear waste therein. Multiple pairs of the fluidly isolated CECs 110 and cooling air feeder shells 130 in FIG. 20 may be arranged in a row R of the CIS facility. The CECs 110 and air feeder shells 130 are arranged on the longitudinal axis LA of each row R that may be provided in the array of CECs.

It bears noting that certain CIS facilities may combine some rows of CECs 110 and air feeder shells 130 according to the arrangement shown in FIG. 20 for high thermal energy emitting nuclear waste canisters, and some other rows of CECs and air feeder shells according to the arrangement shown in FIGS. 4-7 for lower thermal energy emitting nuclear waste canisters. In yet other embodiments, the two different arrangements of CECs and air feeder shells may be mixed in a single row R. Accordingly, numerous variations are possible depending on particular nuclear waste material storage needs and level of thermal energy emitted by the canisters 150.

FIGS. 1-3 and 8-19 depict yet another third alternative embodiment and arrangement of a nuclear waste storage system and corresponding air ventilation system. This a high airflow capacity configuration of the passively cooled nuclear waste storage system with thermo-siphon driven ventilation system suitable for radioactive nuclear waste emitting extremely high levels of heat that must be dissipated by ambient cooling air to protect the radioactive waste (e.g. SNF fuel assemblies, etc.) inside the nuclear waste canisters 150. The cooling air requirements of these high heat load CECs may exceed even the higher airflow capacity provided by the CECs in FIG. 20 with a dedicated separate pair of cooling air feeder shells 130 as shown.

Accordingly, CECs 110 in this high airflow capacity third embodiment may each be fluidly coupled to two pairs (i.e. four) cooling air feeder shells 130 by air flow conduits 160 (see, e.g., FIGS. 1-3 and 14). With continuing reference to FIGS. 1-3 and 8-19 generally, one pair of feeder shells 130 may be located on one lateral side of the CEC, and the remaining pair of feeder shells may be located on the opposite other lateral side as shown. The CEC includes four air inlets 125; each of which is fluidly coupled by a flow conduit 160 to one of the four cooling air feeder shells 130. The flow conduits 160 may be similarly configured and arranged to the prior embodiments of the ambient air ventilation system previously described herein to introduce ventilation air tangentially into the lower/bottom portion of internal cavity 120 of the CEC 110 in order to achieve the same airflow benefits noted above.

Figure 3:
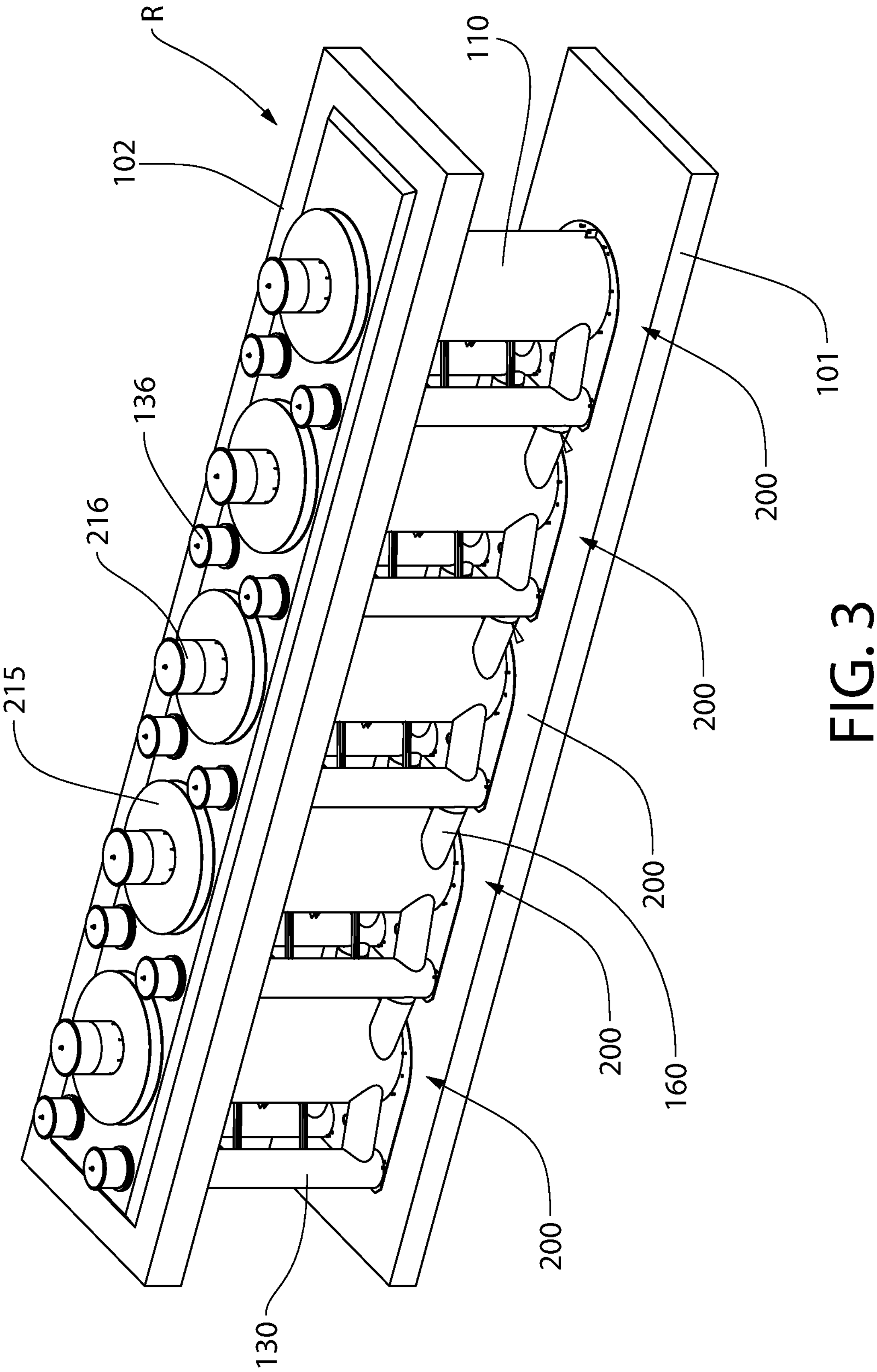
FIG. 3 is a perspective view of one of the nuclear waste storage rows of the ISFSI facility of FIGS. 1 and 2.

It bears noting that each CEC 110 in a single row R need not necessarily be coupled to four cooling air feeder shells 130 as seen in FIGS. 1-3. For example, one CEC 110 located at one end of row R is shown fluidly coupled to only a pair of cooling air feeder shells 130 as this CEC may not have a heat load as high as the heat loads of the remaining other CECs in the depicted row which require a higher ambient ventilation air flow volume or rate (e.g. CFM —cubic feet per minute) to dissipate the higher heat emissions from the canisters 150 stored therein. Accordingly, the present passively cooled nuclear waste storage and ventilation system offers considerable flexibility in configuration which can be customized in order to accommodate the particular heat load dissipation needs of the CECs which may differ.

With continuing general reference to FIGS. 1-3 and 8-19, the construction and structural details of the CECs 110 in this third embodiment and arrangement of passively-cooled nuclear waste storage system may be similar to the previously described embodiments with exception of the additional cooling air inlets 125 to accommodate the two pairs of cooling air feeder shells 130. The description of the CEC structure including lid 115 will therefore not be repeated here for sake of brevity. The features or parts of the CEC in the presently illustrated third embodiment of the nuclear waste storage system are therefore numbered the same as in the figures for the first and second embodiments.

In the present high air flow embodiment shown in FIGS. 1-3 and 8-19, the CECs 110 and cooling air feeder shells 130 however have been structurally integrated into a readily transportable and mountable modular nuclear waste storage unit 200 (best seen in FIGS. 8-16). The modular unit 200 is a self-supported and transportable assemblage or structure which includes a common or shared support plate 202 formed of a suitably strong and appropriate metallic material (e.g., stainless steel or other). The support plate 202 has a horizontally broadened and flat body 201 configured for mounting and anchoring onto the top surface of the subterranean concrete base pad 101 such as via anchors 103 which may be threaded fasteners or other type anchoring/mounting devices. One CEC 110 and a single pair of cooling air feeder shells 130 on one lateral side of the CEC are fixedly attached to the common or shared support plate 202 such as via welding. The support plate 202 may have any suitable configuration, such as a U-shaped mixed polygonal-non-polygonal configuration in one non-limiting embodiment as shown.

To ensure that the vertically tall shell body 111 of the CEC 110 and pair of cooling air feeder shells 130 are structurally stabilized and braced for lifting and transport as a single self-supporting unit, a plurality of horizontally-extending cross-support members 204 (e.g., structural beams of suitable shape) are provided which structurally ties the CEC shell body and feeder shells together in a rigid manner. In one embodiment (as variously appearing in FIGS. 8-16), the CEC 110 in each modular nuclear waste storage unit 200 is structurally tied and laterally braced to each of the pair of cooling air feeder shells 130 by a plurality of vertically spaced apart cross-support members 204. In the non-limiting illustrated embodiment, three cross-support members are shown to tie each of the lower portion 111*d*, middle portion 111*e*, and upper portion 111*a* of the CEC to each of the two feeder shells 130. More or less cross-support members 204 may be used. The pair of cooling air feeder shells 130 are similarly structurally tied together and laterally braced by vertically spaced apart cross-support members 204 which may be of the same type or different than the cross-support structural members tying the CEC 110 to each of the cooling air feeder shells 130. In one non-limiting embodiment, a W-beam may be used for cross-support structural members 204; however, other suitable type/shape structural members may be used.

The modular nuclear waste storage unit 200 advantageously allows the units to be fabricated under controlled shop conditions in the fabrication facility, and then shipped to the installation site (e.g., Consolidated Interim Storage facility). Since the CEC 110 and pair of cooling air feeder shells 130 are already palletized so to speak on the common support plate 201, installation requires only making the piping connections with the flow conduits 160 at the installation site. This results in rapid installation and deployment of the modular nuclear waste storage units.

Figure 19:
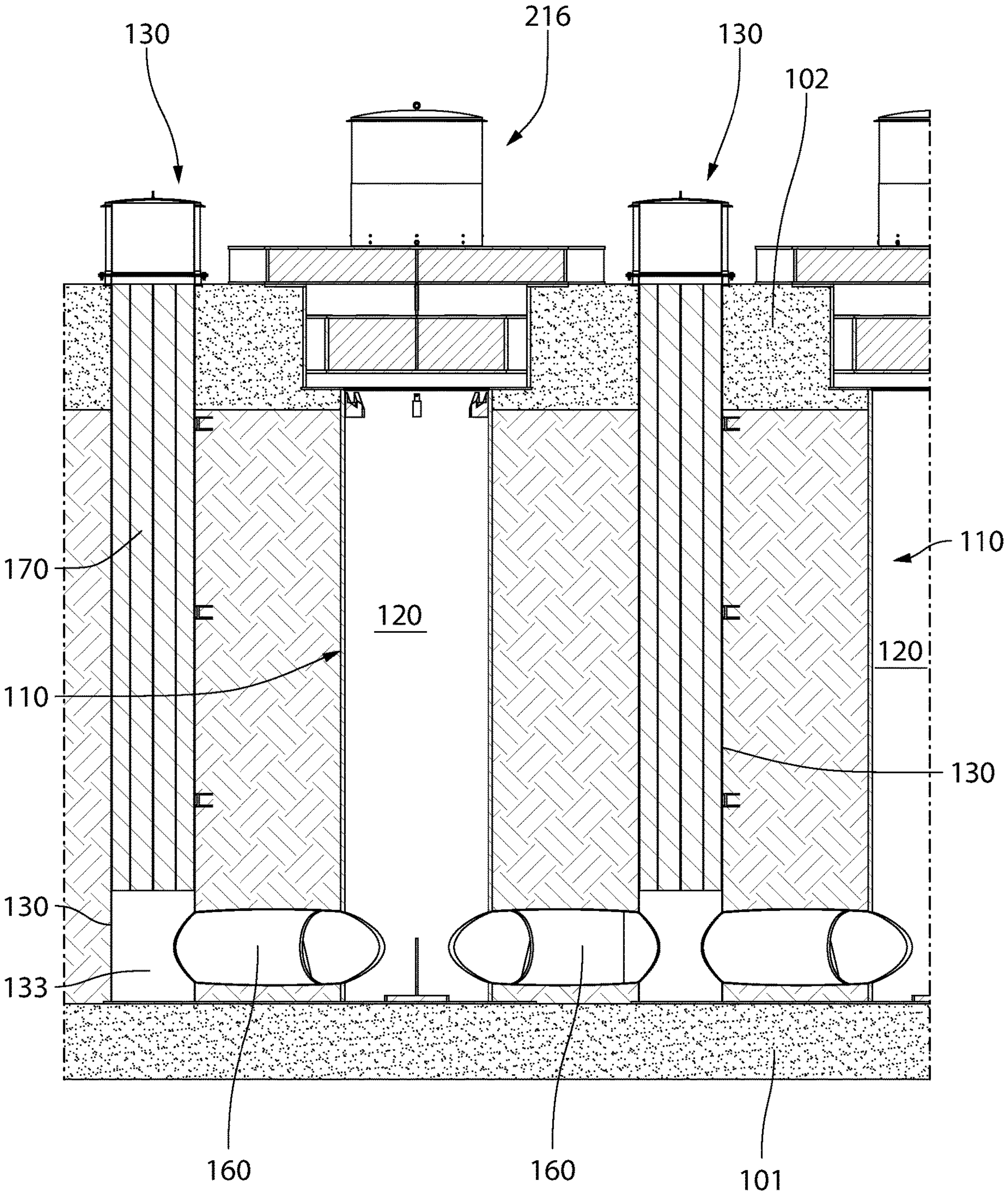
FIG. 19 is a cross-sectional side view thereof showing multiple CECs and cooling air feeder shells; in part of the nuclear waste storage row of FIG. 3.

To install the modular nuclear waste storage units 200 in the manner shown in FIG. 3 such as at a CIS site or facility, the installation process or method includes pouring the concrete base pad 101 and then positioning and mounting a first storage unit 200 on the pad when cured and hardened. A second storage unit 200 is next positioned and mounted on the base pad adjacent to the first storage unit in a longitudinally spaced apart manner along the row R. The piping connections can now be made for the first storage unit. Each of the four cooling air feeder shells 130 are then fluidly coupled directly to the CEC 110 of the first storage unit by a separate flow conduit 160. The piping connections between the CEC and feeder shells 160 may be welded or preferably bolted piping flange type connections which can be made more expediently than welded connections. Since the air flowing inside the flow conduits 160 is at most at air a slight negative (sub-atmospheric) pressure when the ventilation system is in operation, flanged type connections are suitable for these service conditions. The next additional third, fourth, so on nuclear waste storage units 200 may then be added and installed in a similar manner. Once all units have been mounted to the base pad 101 and fluidly coupled to their respective cooling air feeder shells 130, the flowable engineered fill 140 may be installed on top of the base pad and around the CECs and feeders shells of the CIS facility to fill the voids between this equipment for lateral support and radiation attenuation/blocking as shown in FIGS. 17-19 (note engineered fill not shown in FIG. 3 for clarity).

Next, the concrete top pad 102 may be formed on top of the engineered fill. The modular nuclear waste storage units 200 are now ready for receiving a nuclear waste canister 150 in each cavity 120. In some embodiments as disclosed in U.S. Pat. No. 9,852,822 which is incorporated herein by reference, a pair of canisters 150 may be vertically stacked in each CEC 110 and supported therein in the manner described. It bears noting that the CEC 110 whether holding a single or two vertically stacked canisters 150 has a cross-sectional area sufficient for holding only a single canister at a single elevation (i.e. no side-by-side canister placement).

It bears noting that in the preferred but non-limiting embodiment, the foregoing CECs 110 of the multiple modular nuclear waste storage units 200 are preferably positioned on the longitudinal axis LA of the storage row R (i.e. vertical centerline axis VC1 intersects longitudinal axis LA). This is similar to the previous two embodiments of the nuclear waste storage system 100 shown in FIGS. 4-7 and 20 described above. In the present embodiment shown in FIGS. 1-3, the first and second cooling air feeder shells 130 of the first pair of feeder shells may be transversely spaced apart perpendicularly to and on opposite sides of longitudinal axis LA). The first and second feeder shells are located on a first lateral side of a first CEC 110. The third and fourth cooling air feeder shells of the second pair of feeder shells may similarly be transversely spaced apart in the same manner and located on a second lateral side of the first CEC 110 opposite the first lateral side.

The first, second, third, and fourth cooling air feeder shells 130 are preferably fluidly coupled directly to the first CECs by separate metallic flow conduits 160 as shown in FIG. 3 (see also variously FIGS. 8-19). Accordingly, there are no intervening CECs or cooling air shells. Flow conduits 160 may be formed by sections of piping as previously described herein.

In the present third embodiment, the flow conduits 160 may each comprise a horizontally-extending straight piping section fluidly coupling a lower portion of the cavity 120 of the first CEC 110 to a lower portion of each of the cooling air feeder shells 130. Each straight piping section flow conduit 160 defines a horizontal centerline axis Hc which is acutely angled to longitudinal axis LA by angle A1 (see, e.g., FIG. 14). This angled arrangement of the cooling air feeder shells 130 to the longitudinal axis is sufficient to ensure there is no straight line of sight between the first CEC 110 and the next adjacent CEC which is mounted on a different support plate 201. In certain embodiments, angle A1 may be between about and including 10 to 20 degrees.

Figure 14:
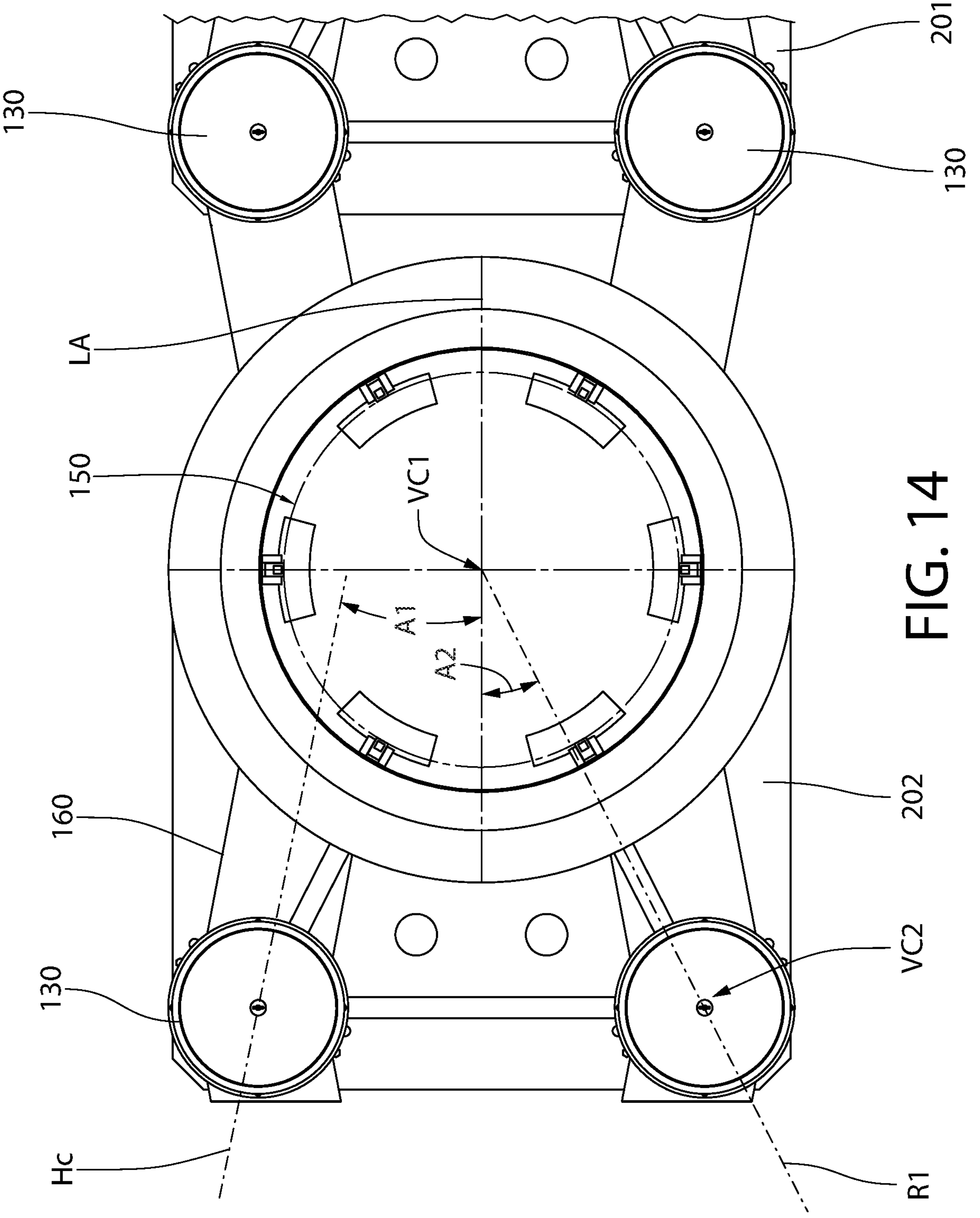
FIG. 14 is a top view thereof with the top lid removed to show the internal cavity of the CEC.
Figure 15:
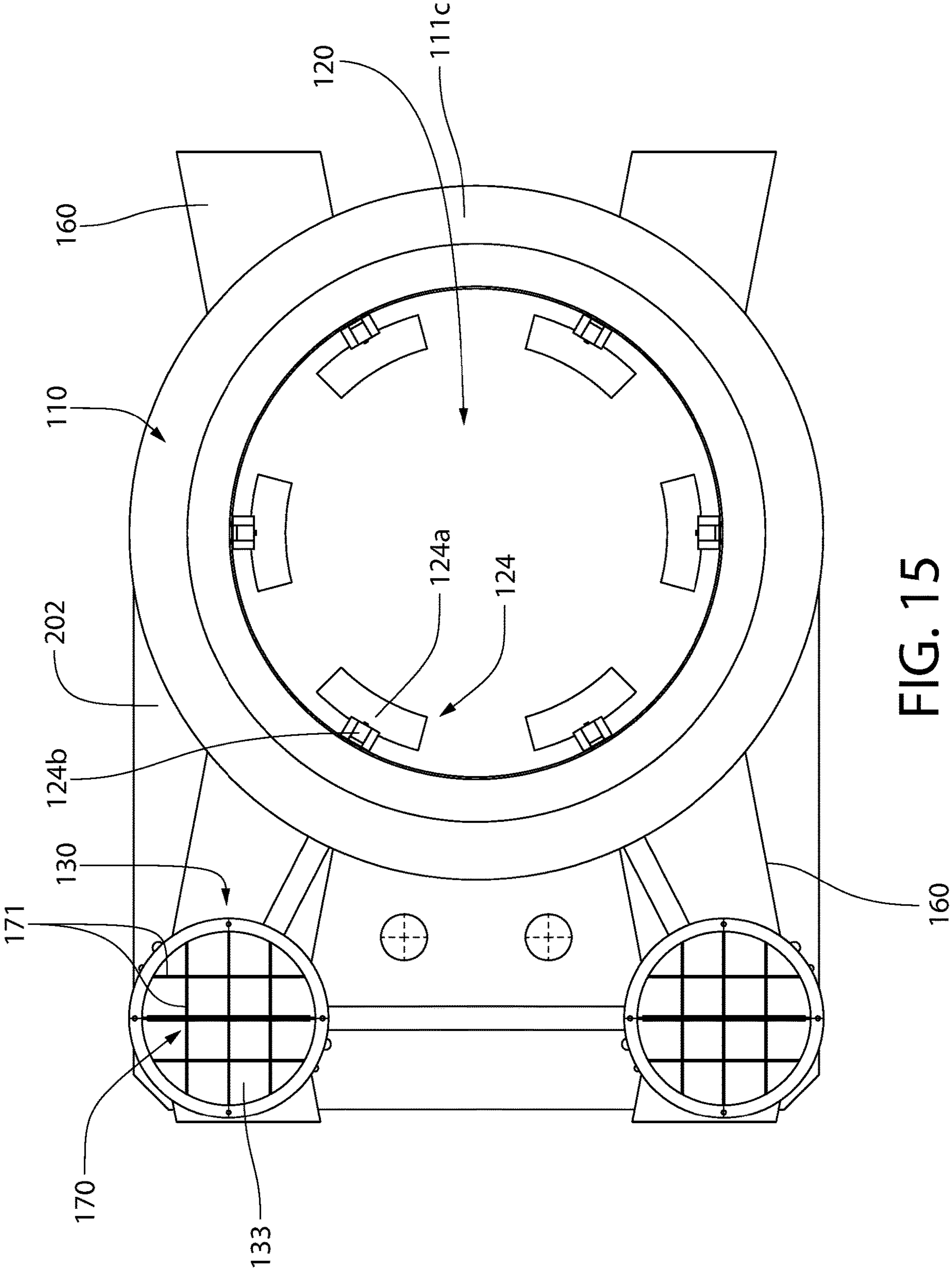
FIG. 15 is a top view thereof with the top air intake housing removed from the pair of cooling air feeder shells to reveal the array of radiation attenuator plates therein.

As also shown in FIG. 14, the cooling air feeder shells 130 in each pair on opposite lateral sides of the depicted CEC 110 are on opposite sides of longitudinal axis LA. The geometric vertical centerline VC2 of each of the feeder shells falls on a horizontal reference line R1 which is oriented at an acute angle A2 to the longitudinal axis LA of the nuclear waste storage row R. Angle A2 may be about 30 degrees (±5 degrees) in one embodiment as illustrated. It bears noting that the angular arrangement of the flow conduits 160 and cooling air feeder shells 130 to the longitudinal axis LA by angles A1 and A2 respectively advantageously contributes to allow closer spacing between the CECs 110 and feeder shells in each row. This allows more CECs to be tightly packed into each row R.

Referring to FIGS. 15-19, each cooling air feeder shell 130 in some embodiments may include an array 170 of vertically elongated radiation attenuator plates 171. The plates 171 may be flat, and are structurally coupled together (e.g. welded, via clips/brackets, etc.) and arranged in an orthogonal grid as shown. Plates 171 are disposed in the vertical air passage 133 of the cooling air feeder shells 130 and create vertically-extending grid openings between them through which the ventilation air is drawn downwards through the shells. Attenuator plates 171 may extend vertically for a majority of the H1 the cooling air feeder shells. In one embodiment, the attenuator plates extend vertically from top end 135 of the shells downwards towards bottom end 134 and terminate at a point just above and proximate to the top of the flow conduits 160 so as to not interfere with the ventilation air flow from the shells 130 to the CECs 110. In one embodiment, attenuator plates 171 may be formed of steel; however, other suitable materials including boron-containing materials and metals may be used. The attenuator plates 171 advantageously help prevent radiation streaming to the ambient environment surrounding the nuclear waste storage system.

In operation, the ambient cooling air ventilation system of the present high airflow capacity embodiment shown in FIGS. 1-3 and 8-19 functions and follows the same general path as the previously described embodiments. The air inlets 125 are each configured and arranged to introduce cooling ventilation air tangentially into the cavity 120 of each CEC 110 as shown. Ambient ventilation air is drawn downwards through and between the attenuator plates 171 inside each cooling air feeder shell 130, and then flows horizontal/laterally to the CEC 110 through flow conduits 160 to cool the canister 150 in each CEC via the convective natural thermo-siphon effect previously described herein.

In the present embodiment of FIGS. 1-3 and 8-19, an alternative air outlet 220 is shown which is formed directly through lid 215 rather than between the periphery of the lid and upper portion 111*a* of the CEC 110 and top pad 102 as with previous lid 115 in prior embodiments of FIGS. 4-7 described herein. In the present embodiment, the air outlet 220 forms a circuitous multi-angled passageway internally through the lid terminating in air discharge housing 216 mounted to the top surface of the lid (see, e.g., FIG. 18 and directional airflow arrows). To accommodate this internal air outlet 220 passage, lid 215 is configured slightly differently than lid 115 previously described herein.

Air discharge housing 216 of present lid 215 comprises a perforated cylindrical metal shell which projects vertically upwards from the top surface of the lid 215 as shown. In one embodiment, housing 216 comprises a plurality of lateral openings extending 360 degrees circumferentially around for discharging air laterally outwards therefrom back to the ambient environment. A circular cap 217 encloses the top of the air discharge housing 216 to prevent the ingress of rain. The air discharge housing 216 and to cap 217 may be formed of metal such as stainless steel for corrosion protection. Other shaped caps and intake housings may be used in other embodiments.

The present lid 215 may have a composite metal and concrete construction and shape similar to previous lid 115 in FIGS. 4-7 including an outer shell 215*a* formed of steel such as stainless steel, and interior concrete lining 215*b*. This robust construction not only provides radiation shielding, but also offers protection against projectile impacts. In one configuration, lid 215 includes a circular upper portion 218*a* and adjoining circular lower portion 218*b* having an outer diameter smaller than an outer diameter of the upper portion similar to previous lid 115. The present lid 215 effectively seals off the upwardly open recess 117 formed into the top surface 102*a* of the top pad 102 around the top end 112 of each CEC 110 by the upper diametrically enlarged top cylindrical section 111*b* of the CEC.

In cooling operation, air rising upwards within ventilation annulus 121 between the heat-emitting canister 150 and shell body 111 of CEC 110 flows to the bottom of lid 215 (see, e.g., FIG. 18 and directional airflow arrows). The air then flows radially outwards and then turns upwards around the periphery of the smaller diameter lower portion 218*b* of the lid within air outlet 220. The air then flows radially inwards and turns 90 degrees upwards towards the discharge housing 216. The heated air is discharged laterally and radially from housing 216 through the perforations back to ambient atmosphere. The cooling cycle operates continuations via the thermo-siphon as long as the nuclear waste canister 150 continues to emit heat generated by the nuclear waste inside.

Stackable Nuclear Waste Storage System

To address the need described above to increase storage capacity at existing or new below grade ISFSI facilities as described above with respect to FIGS. 1-20 or other storage facility, FIGS. 21-44 depict various aspects of a passively cooled and stackable nuclear waste storage system which provides both below grade and above grade storage.

Referring to FIGS. 21-44, the system comprises a pair of vertically stacked nuclear waste storage vessels including a lower below grade module and an upper above grade module. The below grade module may be one or more of the embodiments of the vertically elongated CEC 110 (cavity enclosure containers) previously described herein which is mounted on the subterranean concrete base pad 101 of the ISFSI and situated below the storage site's final cleared grade of topsoil and/or engineered fill. CEC 110 is passively cooled via the natural thermo-siphon ventilation system described above via one or more cooling air feeder shells 130 fluidly coupled to the internal storage cavity 120 of the CEC by one or more horizontal/lateral flow conduits 160. The lid 115 on the CEC is omitted and instead an above grade module is mounted immediately above the CEC.

The above grade module may be a vertically-elongated radiation-shielded cask 300 positioned above the below grade CEC 110. The stacked casks and CEC may be concentrically arranged with respect to one another and coaxially aligned along a common vertical centerline collectively defined by vertical centerline axis VC1 of CEC 110 and vertical centerline cask axis CA1 of cask 300 (see, e.g., FIG. 41). In one embodiment, the cask 300 may be fixedly and detachably mounted to the ISFSI top pad 102 such as via bolting or other means. There may be no direct fixed coupling via bolting or other means of the cask to the below grade CEC. In other possible embodiments, the cask 300 may be directly coupled to top of the CEC (e.g., bolted or otherwise) either instead of or in addition to mounting to the concrete top pad.

Because cask 300 is an above grade nuclear waste storage module, it is a heavily radiation-shielded double-walled vessel. A suitable basic cask usable in the stacked storage system may be a HI-STORM cask available from Holtec International of Camden, New Jersey when is modified to include the unique features described herein for a stacked installation above the below grade CEC including the special cooling air ventilation provisions disclosed to fluidly interconnect the internal nuclear waste canister cavities of the CEC 110 and cask 300 thereby forming a fluidly contiguous internal space of the cooling air ventilation system as further described herein.

Cask 300 in one embodiment includes a vertically orientated and elongated cask body 310 having a greater height than width. The cask body is formed by a cylindrical outer shell 311 and inner shell 312, and radiation shielding material 313 disposed in an annular space formed therebetween. The shells 311, 312 and shielding material 313 collectively define a cylindrical vertical sidewall 318 of the cask having the foregoing composite construction of different materials. The inner and outer shells are concentrically arranged and coaxial relative to each other as shown.

In one embodiment, the shielding material 313 may comprise a concrete mass or liner for neutron and gamma radiation blocking. A concrete aggregate comprising hematite or another type iron ore preferably may be used. This advantageously maximizes conductive heat transfer through the sidewalls 318 of the cask body to help dissipate and transmit a portion of the thermal energy (e.g., heat) emitted by the SNF (or other radioactive waste) stored inside the casks within the canister. The passive ventilation air system described herein dissipates the remainder of the decay heat to protect the structural integrity of the canister and SNF assemblies stored therein. Other radiation shielding materials may be used in addition to or instead of concrete including lead for gamma radiation shielding, boron containing materials for neutron blocking (e.g. Metamic® or others), steel, and/or others shielding material typically used for such purposes in the art.

Inner shell 312 of the cask 300 defines an inner or internal surface 312*a* and outer shell 311 defines an outer or external surface 311*a* of the casks. Surfaces 311*a*, 312*a* formed by the cylindrical shells 311, 312 may correspondingly be cylindrical and arcuately curved in one embodiment. The cask further defines a top end 319 defined by the upper end of the cask body 310 and bottom end 320 defined by the lower end.

The inner and outer shells 312, 311 may be formed of a suitable metallic material, such as without limitation steel (e.g. carbon or stainless steel). If carbon steel is used at least the external surface 311*a* of the cask may be epoxy painted/coated for corrosion protection. The metal shells 311, 312 may each have representative thickness of about ¾ inches as one non-limiting example; however, other suitable thicknesses may be used.

Above grade cask 300 comprises a vertically-extending internal cavity 321 which extends along the vertical cavity axis CA1 defined by the cask body 318. Cask 300 is concentrically and coaxially aligned with vertical centerline axis VC1 of the CEC 110. Cavity 321 extends vertically for substantially the entire height of the cask. Cavity 321 may be of cylindrical configuration in one embodiment with a circular cross-sectional shape to conform to the cylindrical shape of the nuclear waste canister 150; however, other shaped cavities with corresponding cross-sectional shapes may be used including polygonal shapes and other non-polygonal shapes (e.g. rectilinear, hexagon, octagonal, etc.) depending on configuration of the nuclear waste container stored therein. The cavity of cask 300 may have a height and transverse cross-sectional area configured to hold only a single nuclear waste canister 150 loaded with SNF assemblies (not shown) or other high level radioactive waste emitting radiation and substantial amounts of thermal energy in the form of decay heat.

Cask 300 further comprises a bottom baseplate 315 which may be seal welded to the inner and outer shells 312, 311 at the bottom end 320 of the cask body. Structurally, this forms a rigid self-supporting cask assemblage or structure which can be fabricated in the shop, and then transported to the desired nuclear waste storage site (e.g., nuclear generating plant and/or ISFSI) where it can be moved and handled by suitable lifting equipment such as track-driven cask crawlers (used and are well known in the art). The cask crawlers are also used for loading the nuclear waste canisters into the casks. Baseplate 315 may be structurally reinforced and stiffened by a plurality of circumferentially spaced apart angled gusset plates 315*b* welded to the peripheral portion of the baseplate which projects radially outward beyond outer shell 311 and the lower portion of external surface 311*a* of outer shell 311 as shown. The peripheral portion of baseplate 315 defines a user-accessible mounting flange 350 for anchoring the cask to the concrete top pad 102.

Baseplate 315 of upper cask 300 is configured for placement and seating on a top surface of a substantially flat horizontal support structure such as the ISFSI concrete top pad 102 to rigidly and detachably anchor the cask 100*a* thereto. This laterally stabilizes the stacked cask assemblage to withstand vibrational loads and moments during a seismic event. Cask 300 directly engages top pad 102, and in some embodiments abuttingly engages the annular seating flange 111*c* at the top of the CEC 110 (see, e.g., FIGS. 36A-B). This forms an annular cask-to-CEC interface 448. It bears noting that baseplate 315 of cask 300 is not fixedly coupled to the CEC seating flange 111*c* (e.g., bolted, welded, etc.) since the flange 111*c* is not accessible being located to abutting engage only the inner annular bottom surface portion of the cask baseplate (best shown in FIG. 36B). The peripheral portion of baseplate 315 which defines the mounting flange 350 abuttingly engages and is fixedly coupled to the top surface of the concrete top pad 102 as shown. In one non-limiting embodiment, a plurality of circumferentially spaced apart threaded mounting fasteners 324 such as anchor bolts may embedded in concrete pad and arranged in a bolt circle may be used to fixedly anchor the peripheral mounting flange 350 defined by baseplate 315 of cask 300 in place such as via threaded nuts. Other forms of mounting the baseplate to the concrete pad may be used.

Baseplate 315 may be made of a similar metallic material as the shells 111, 112 (e.g., steel or stainless steel). The bottom surface of baseplate 315 may be considered to define the bottom end 320 of the cask 300 for convenience of description purposes.

Baseplate 315 comprises peripheral portion which projects radially outward beyond outer shell 311 and defines the mounting flange 350 as previously described herein. The baseplate 315 may be structurally reinforced and stiffened by a plurality of circumferentially spaced apart angled gusset plates 315*b* welded to the mounting flange and the lower portion of the external surface 311*a* of outer shell 311 of cask 300 as shown.

In an important aspect of the invention, baseplate 315 of upper cask 300 is a perforated baseplate comprising a plurality of perforations in the form of axial through holes 315*a*. The through holes may have a circular cross-sectional shape in one embodiment; however, other suitably shaped through holes in cross section such as polygonal (e.g., square, rectangular etc.) and non-polygonal shapes may be used. The through holes 315*a* are vertically elongated and may be oriented parallel to each other and vertical cavity axis CA1 of the cask. Preferably, only the central portion of the perforated baseplate 315 which resides inside the internal cavity 321 of the cask 300 includes the perforations (i.e. through holes 315*a*).

Baseplate 315 of the above grade upper cask 300 is structured to support the entire weight of the nuclear waste canister 150 stored in the cask. The perforated baseplate 315 of cask 300 provides a structural purpose and in addition functions as an integral part of the cask and CEC ventilation air system described herein which removes decay heat (thermal energy) emitted by the nuclear waste canisters 150 in the stacked storage assembly. The through holes 315*a* of perforated baseplate 315 places the cavity 321 of the cask in fluid communication with the cavity 120 of the lower grade CEC 110. The fluid communication is established by the act of mounting the upper cask above the CEC, which in effect forms a common fluidly interconnected and contiguous ventilation riser extending in a vertical direction internally through the stack of cask 300 and CEC 110. Because the top end of the below grade CEC 110 and its cavity 120 are upwardly open (when lid 115 is removed to mount cask 300 above), the perforated baseplate 315 forms the only physical barrier between the cavities of the lower CEC and upper cask. The through holes 215*a* in perforated baseplate 215 defines an air transmissible barrier or structure which permits ventilation air in the lower cavity 120 of CEC 110 to be transferred and flow upwards into the upper cavity 321 of cask 300. Operation of the ventilation system will be further described herein.

Perforated baseplate 315 of upper cask 300 further plays an important role in preventing radiation streaming or shine therethrough during the process of mounting the upper cask above the embedded lower CEC 110. After a nuclear waste canister 150 is loaded into cavity 321 of upper cask 300 while positioned on the concrete top pad 102 (as further described herein), the upper cask must be lifted off of the pad by a commercially-available cask crawler to position the cask on top of the lower CEC already seated elsewhere on the pad. While the upper cask is suspended in mid air, the potential for radiation streaming or shine from the nuclear waste inside the cask cavity through the perforated baseplate to the ambient environment is created. To combat this issue, the axial through holes 315*a* in baseplate 315 therefore have a profile with height to diameter ratio of at least 2:1, and preferably more than 3:1. The baseplate 215 therefore is a vertically thick metallic structure which may be about 6 inches thick or more for this purpose in some non-limiting embodiments. The vertically elongated through holes 215*a* act to scatter the radiation to prevent radiation streaming to the environment through the baseplate. To further enhance radiation scattering effectiveness of the elongated through holes, some or all of the through holes may be obliquely oriented to the cavity axis CA1 of the upper cask 300 instead of being parallel thereto.

Figure 34:
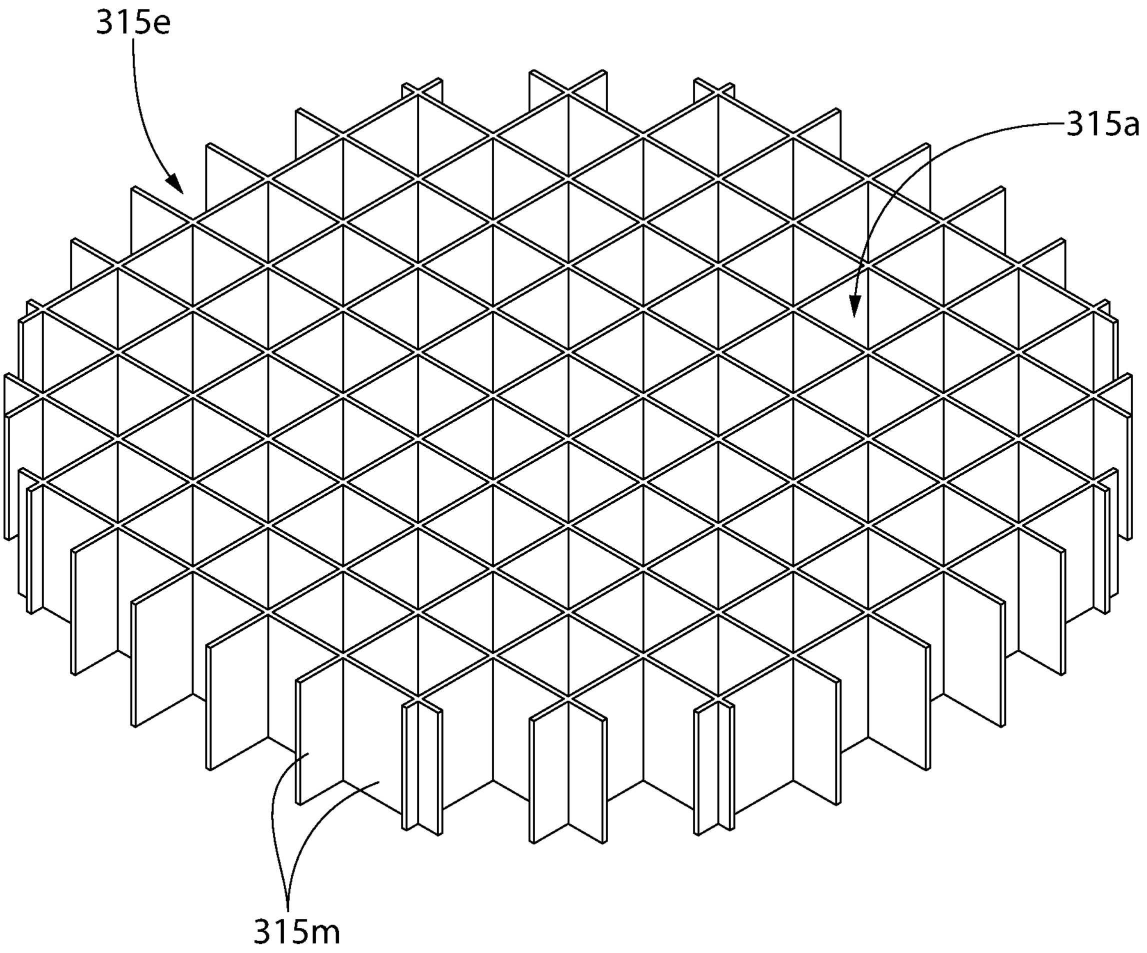
FIG. 34 is a perspective view of a first embodiment of a central portion of a perforated baseplate of the upper cask.
Figure 35:
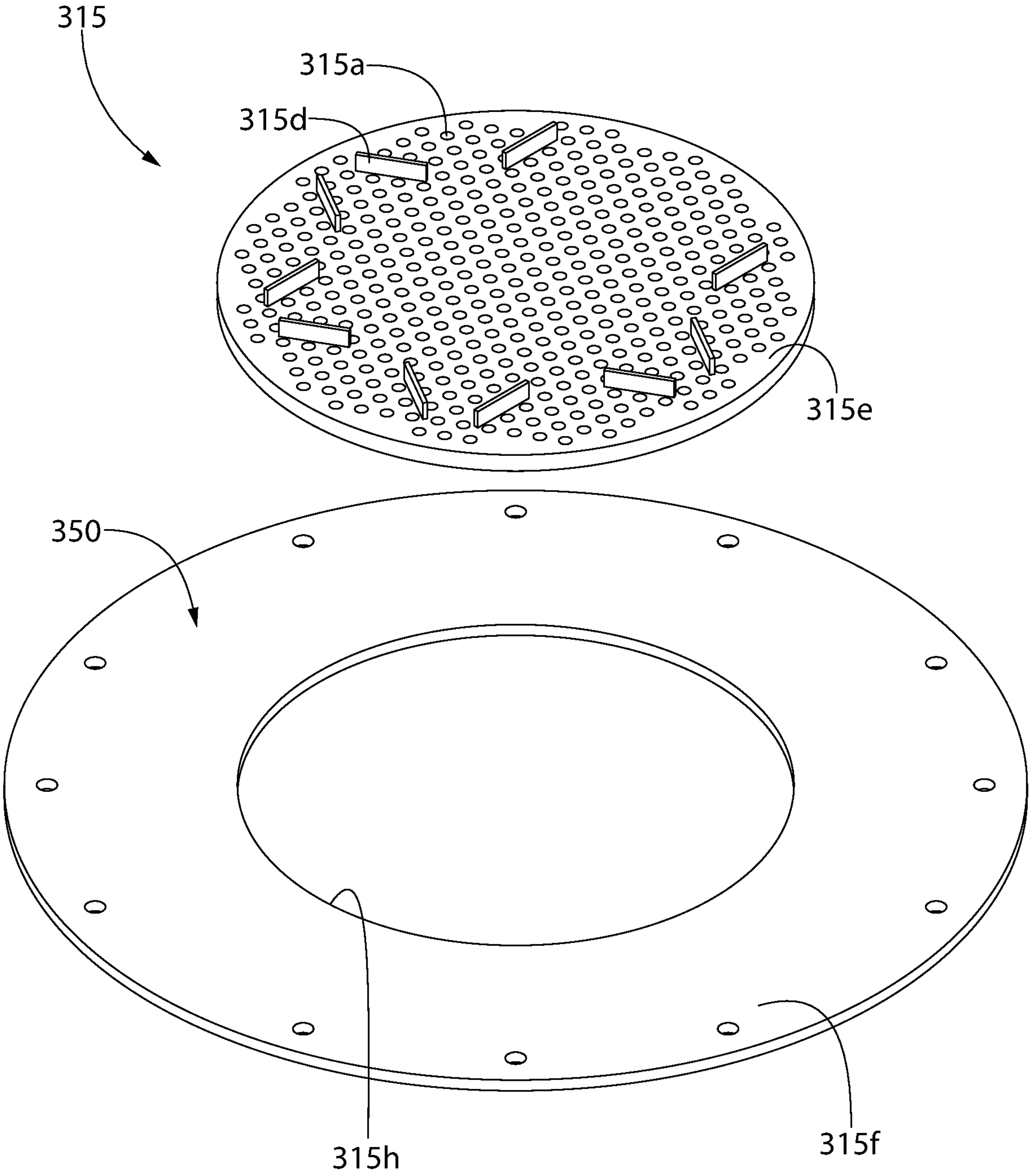
FIG. 35 is a perspective view of a second embodiment of a central portion of the perforated baseplate showing the entire structure of the baseplate.

In some embodiments, instead of a single monolithic unitary structure which can be provided, the perforated baseplate 315 of upper cask 300 alternatively may have a two-piece construction (see, e.g., FIGS. 34-36). This includes a circular central portion 315*e* located inside the cavity 321 (which is perforated with the axial through holes 315*a* previously described herein) for supporting the upper canister 150, and an outer annular portion formed by a flat annular bottom closure plate 315*f* welded to the bottom ends of the upper cask cylindrical outer and inner shells 311, 312. Closure plate 315*f* defines a central opening 315*h* which allows rising air from the lower below grade CEC 110 to flow through the perforated central portion 315*e* of the baseplate 315 into the internal cavity 321 of upper above grade cask 300. The bottom closure plate 315*f* may be considered part of the entire structure of the baseplate 315. It bears noting that bottom closure plate 315*f* defines the peripheral portion of baseplate 315, which in turn defines the mounting flange 450 for coupling the upper cask 300 to lower CEC 110.

The perforated central portion 315*e* of baseplate 315 may be supported by an inner portion of bottom closure plate 315*f* located inside cavity 321 of above grade cask 300 via an annular stepped shoulder 315*g* formed by an inward radial extension or protrusion of closure plate 315*f* in one embodiment. Central portion 315*e* may loosely engage the stepped shoulder 315*g* of bottom closure plate 315*f* to be removable, or alternatively may be welded to outer closure plate 315*f* for rigid fixation thereto. For the former loose coupling mounting, the circular perforated central portion 315*e* may be inserted through the top end of upper cask 300 after the annular bottom closure plate 315*f* is welded to outer and inner shells 311, 312 of the cask body.

Figure 21:
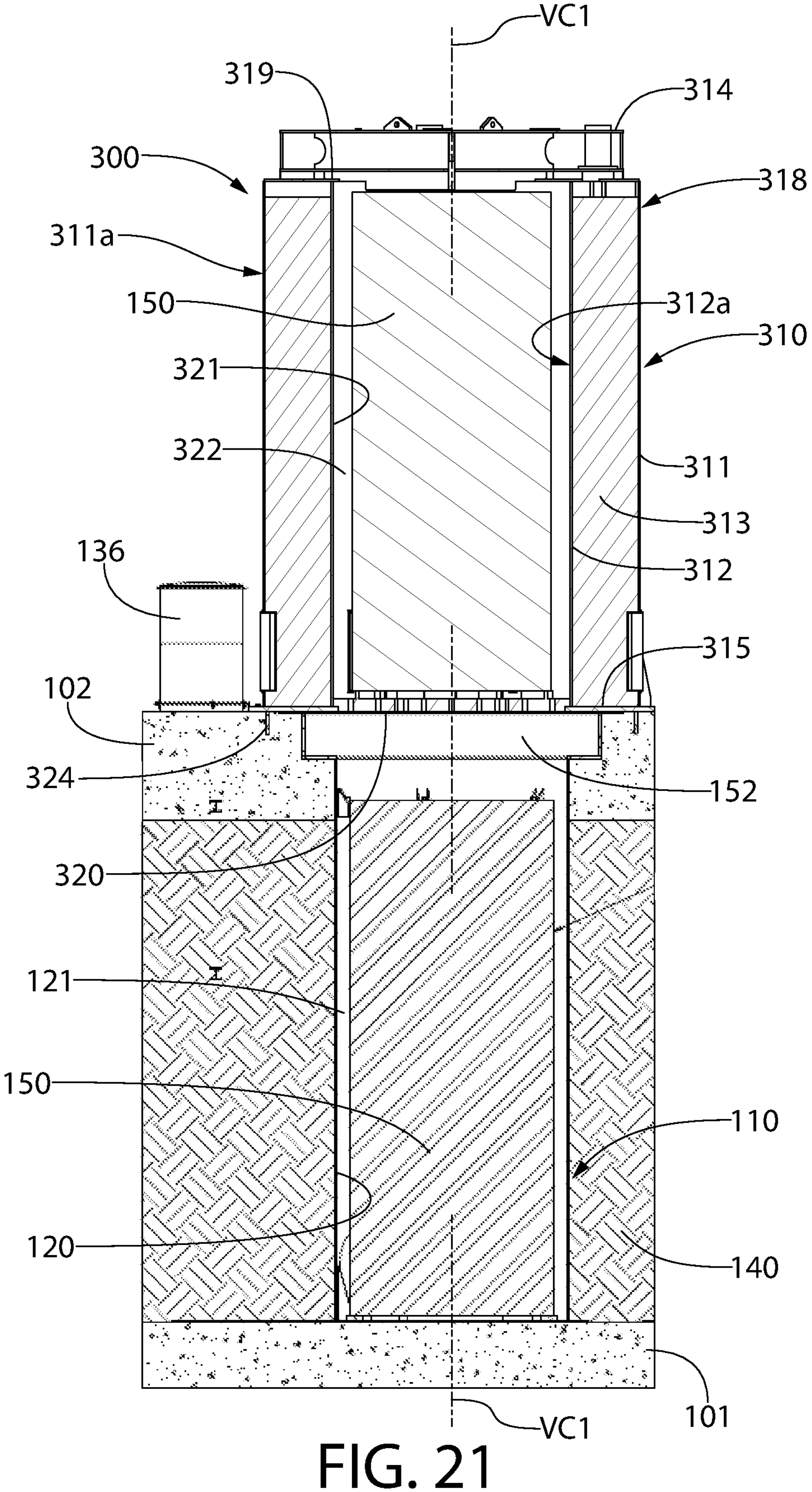
FIG. 21 is a side cross sectional view of a stackable nuclear waste storage system for storing high level nuclear radioactive waste material including the below grade lower CEC of FIGS. 4-5 and an above grade upper cask mounted over and atop the CEC.
Figure 22:
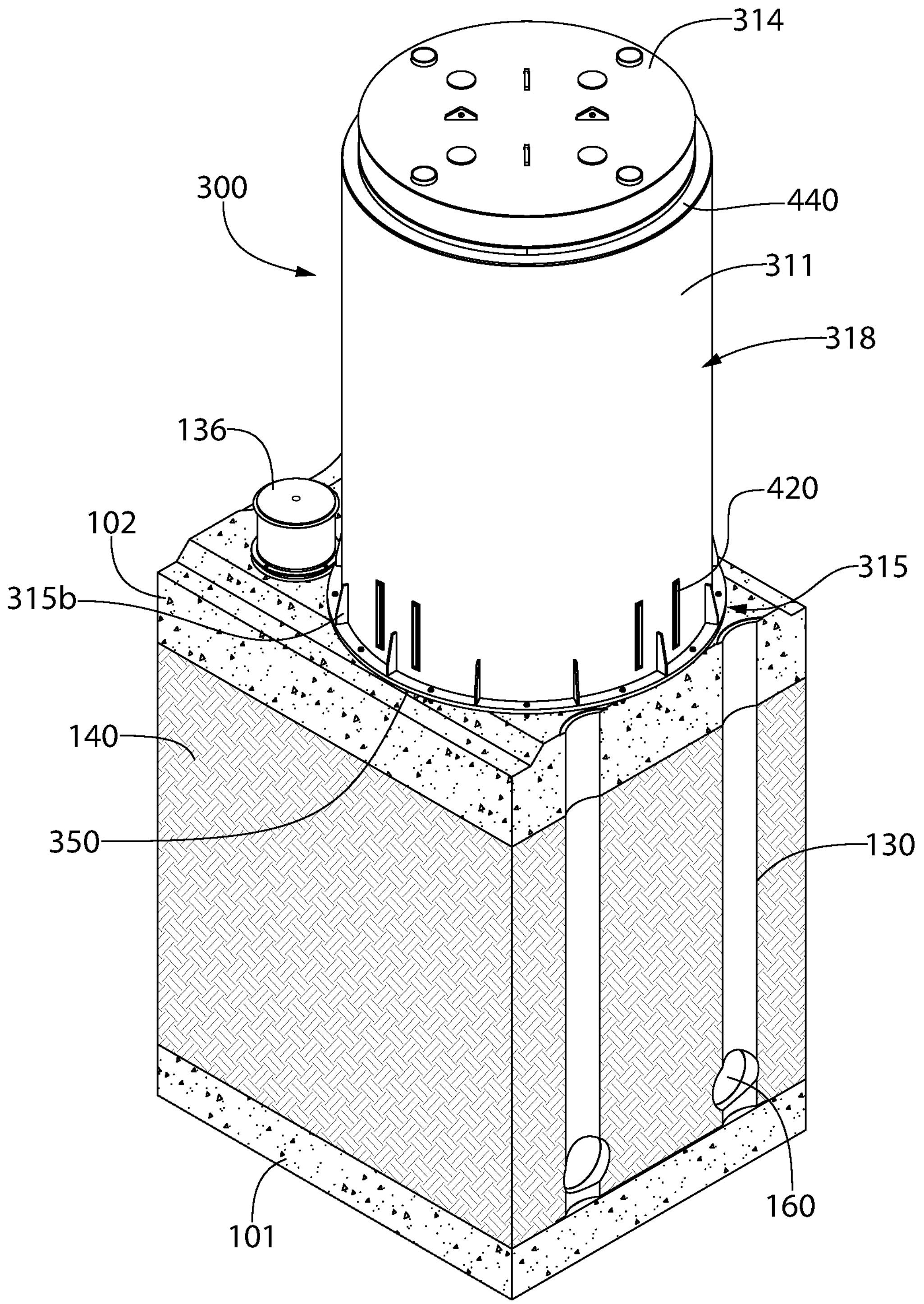
FIG. 22 is a first perspective view thereof.
Figure 23:
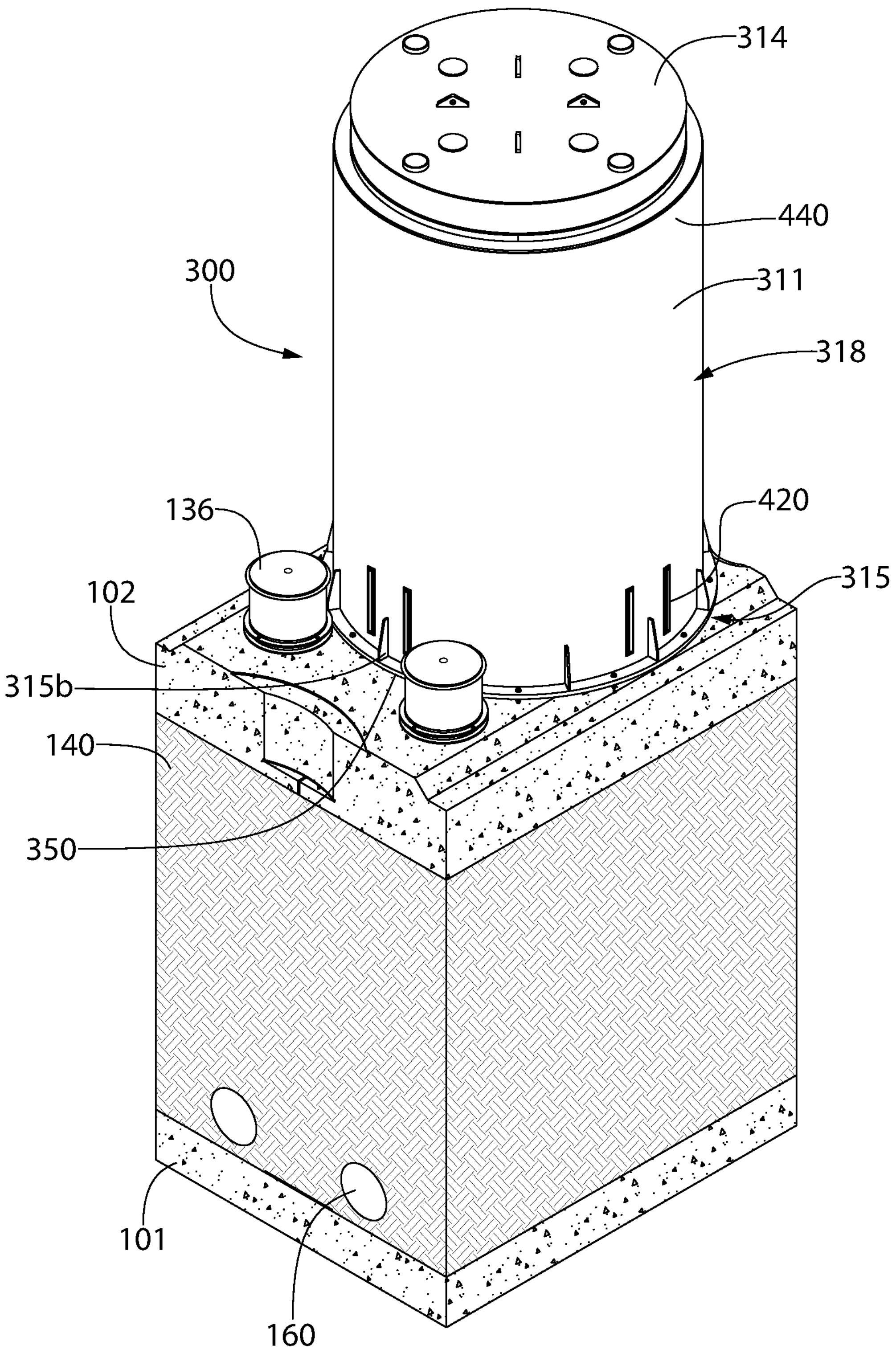
FIG. 23 is a second perspective view thereof.
Figure 24:
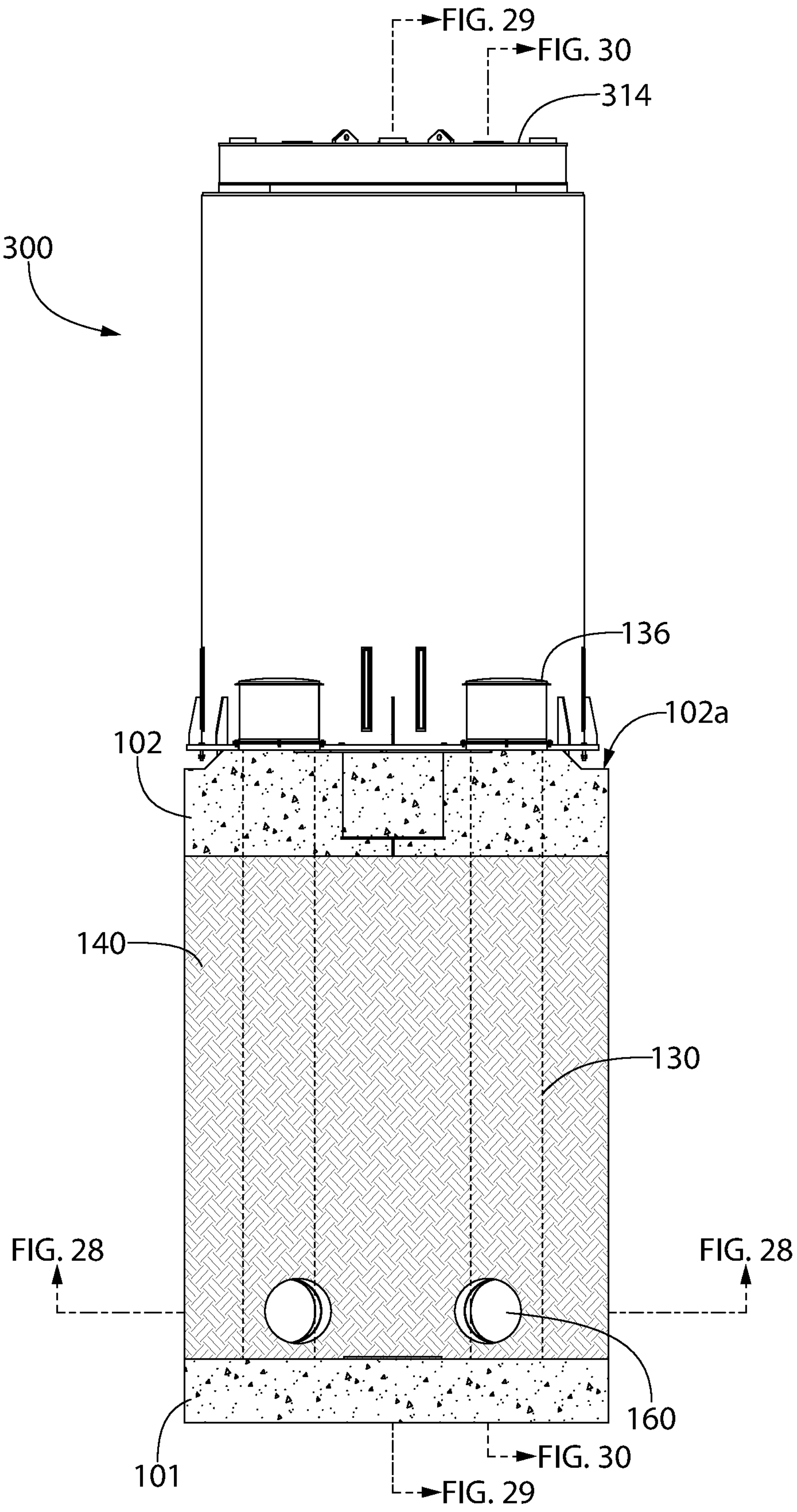
FIG. 24 is a first side view thereof.
Figure 25:
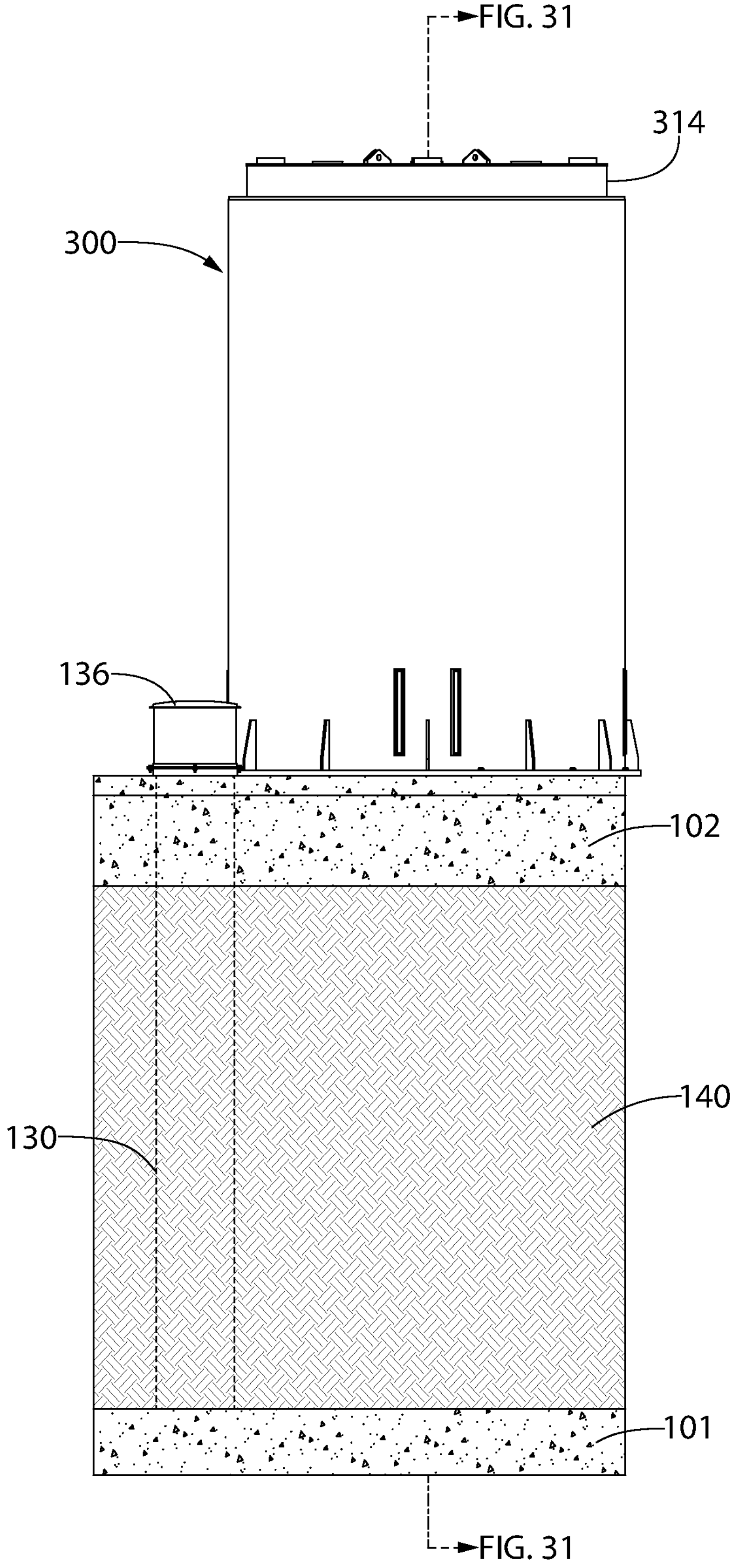
FIG. 25 is a second side view thereof.
Figure 27:
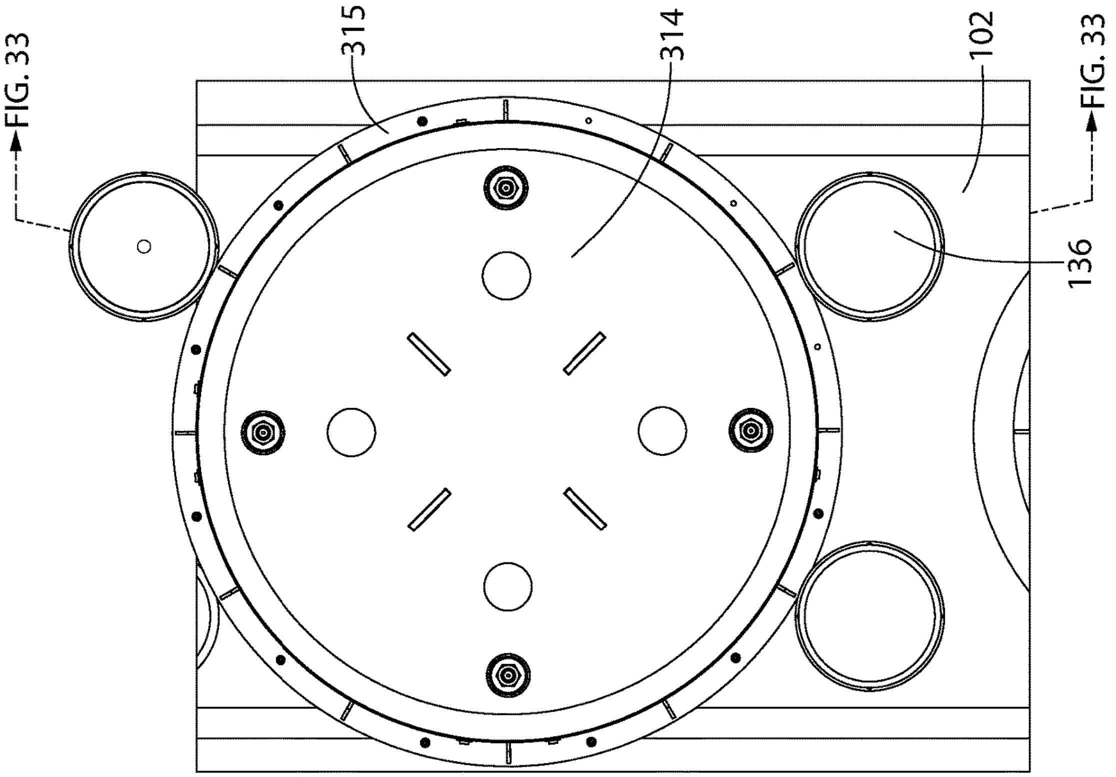
FIG. 27 is a second top view of the storage system.
Figure 26:
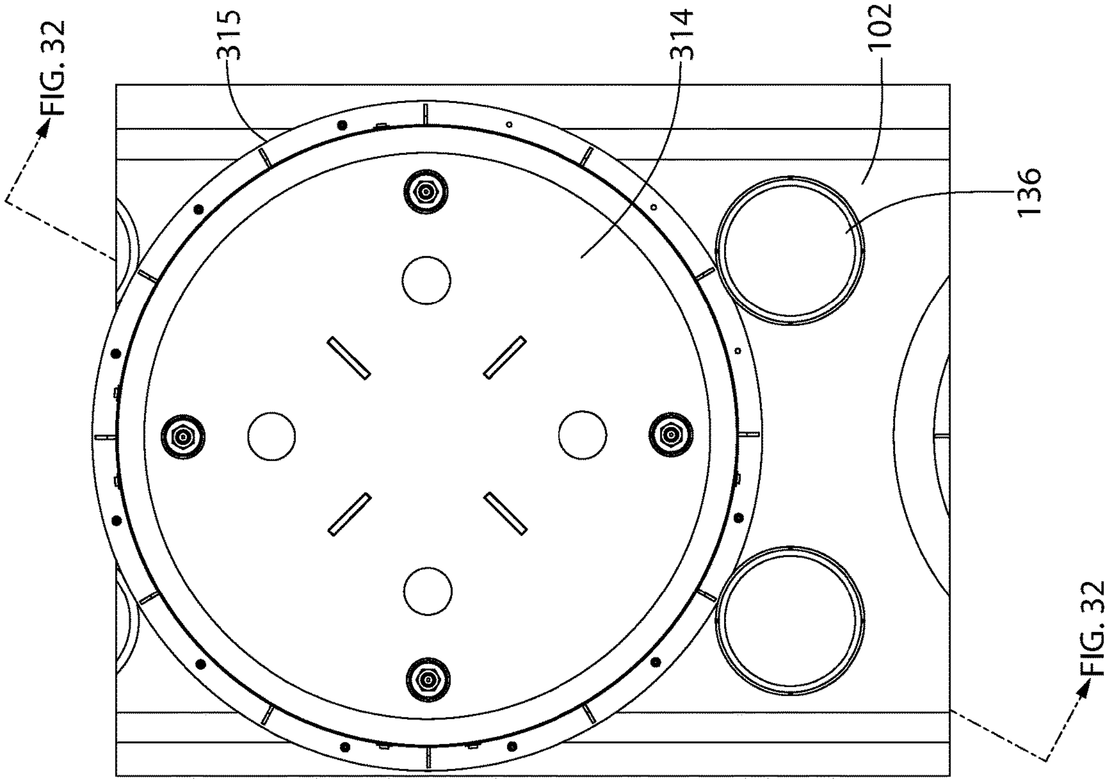
FIG. 26 is a first top view of the storage system.
Figure 28:
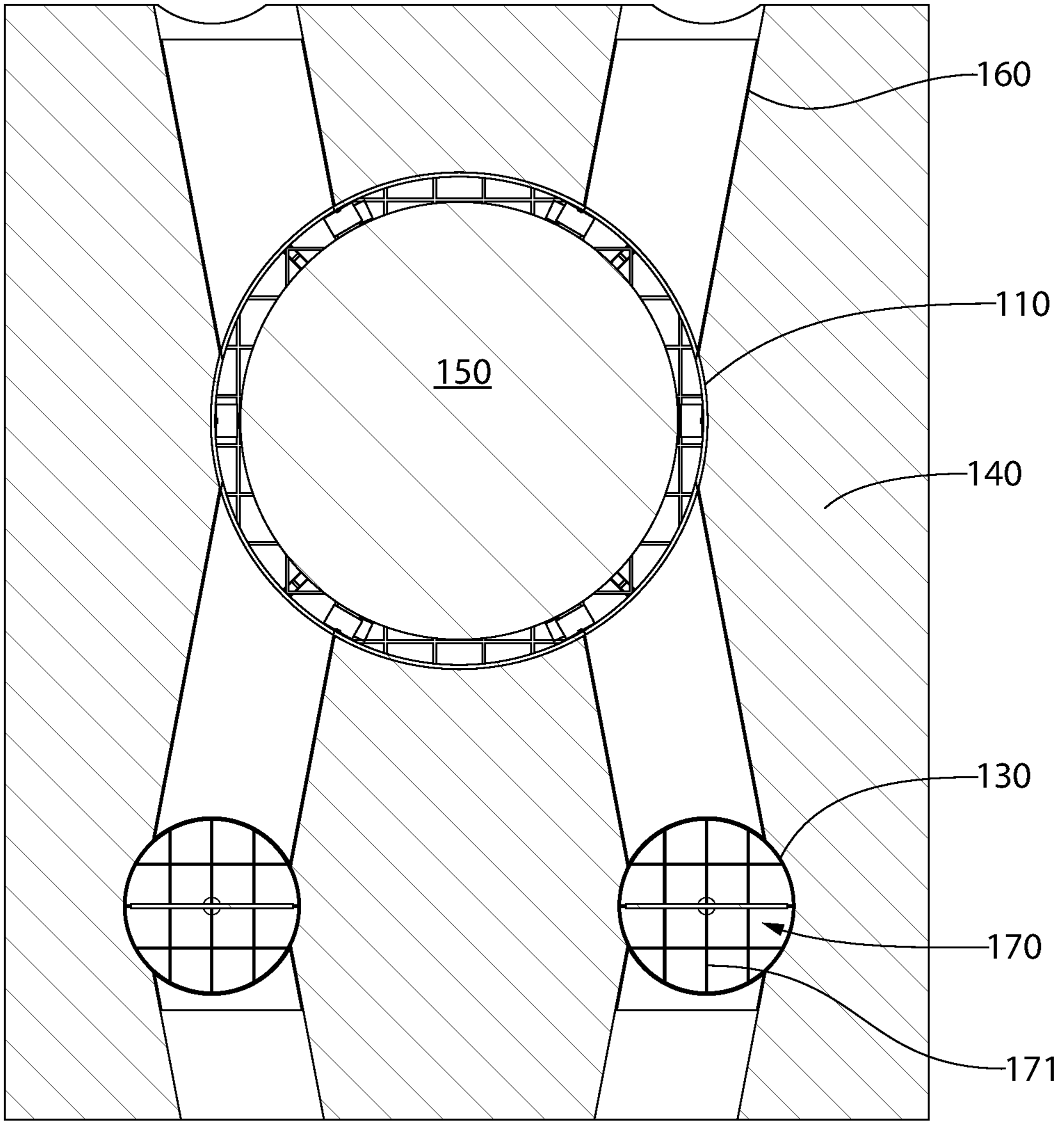
FIG. 28 is a transverse cross sectional view through the lower CEC showing the air inlet ducts and air inlet of the CEC.

In one embodiment, the central portion 315*e* may be thicker in construction than the bottom closure plate 315*f* of upper cask 300 as depicted herein because the central portion supports the weight of the canister 150 in the cask (see, e.g., FIG. 21). In other possible constructions, the entire baseplate 315 may have a uniform thickness.

The circular central portion 315*e* of baseplate 315 may have a variety of structures whether a monolithic one-piece or two-piece construction of the baseplate is used. FIG. 35 depicts one embodiment of central portion 315*e* formed by a plurality of orthogonally arranged and intersecting metallic flat plates 315*m* which define the plurality of axial through holes 315*a*. The outside perimeter of this embodiment defines an imaginary circle which conforms to and is complementary configured to the circular transverse cross-sectional area defined by internal cavity 321 of the above grade cask 300 which receives the central portion. FIG. 36 depicts an alternative and preferably embodiment in which central portion 315*e* of baseplate 315 of the cask 300 is formed by a solid circular metallic plate through which the plurality of through holes 315*a* previously described herein are formed. This central portion 315*e* formed by a thick steel plate allows formation of the through holes 315*a* which may offer greater protection against radiation streaming or shine through the perforated baseplate 315 in some cases than the embodiment of FIG. 35. Other perforated structures may be used for central portion 315*e* so long as through holes of any suitable configuration are provided to fluidly interconnect cavity 120 of the below grade CEC 110 to cavity 321 of above grade cask 300.

In some embodiments, a plurality of spacer plates 315*d* may be rigidly attached (e.g., welded) to a top surface of the perforated baseplate 315 inside cavity 321 as shown in FIG. 35. The spacer plates may be distributed over and spaced apart across the baseplate. Any suitably shaped structural steel plates may be used to construct the spacer plates. The spacer plates 315*d* are configured to engage and elevate a bottom of the nuclear waste canister 150 above the perforated baseplate in the above grade cask 300. This advantageously allows ventilation air to circulate and flow beneath the canister to enhance cooling the nuclear waste therein. Spacer plates 315*d* may be about 6 inches high in some embodiments and are arranged in a plurality of orientations to each other to create radiation scattering which further prevent radiation streaming or shine through the perforated baseplate 315.

With continuing general reference to FIGS. 21-44, the internal cavities 120, 321 of both the lower CEC 110 and upper cask 300 each have a height and transverse cross-sectional are configured for holding no more than a nuclear waste canister 150 therein, as previously described herein. The diameter of each cavity is intentionally larger than the outer diameter of the fuel canister 150 by an amount (e.g., less than ⅓ the diameter of the canister) to form a respective ventilation annulus 121 (CEC 110) or 322 (cask 300) between the canister 150 and CEC shell body 111 or inner shell 312 of the cask within internal cavities 120 or 321, respectively (see, e.g. FIG. 36A). The radial width W1 of annulus 121 in lower CEC 110 and width W2 of annulus 322 in upper cask 300 are each preferably sufficient to draw heat generated by the nuclear waste within each canister 150 away from the canister as the cooling ventilation air flows upwards alongside the outer surface of the canisters as it is heated via a natural convective thermo-siphon effect. A typical ventilation annulus inside a CEC or cask may be in the range of about and including 2-6 inches in radial width as a non-limiting example depending on the estimated heat load generated by the fuel canister 150. The ventilation annulus is defined by and extends vertically for the full height of the canister in each of the CEC and cask, and may terminate at top proximate to the top ends of the internal cavities as shown (see, e.g., FIG. 21). Accordingly, the canister 150 has a height approaching the full height of the cavity of the CEC and cask, and at least greater than ¾th the height of its respective cavity in which it is housed. This lower portions of each ventilation annulus 121 and 322 in the CEC and cask are placed in fluid communication with ambient atmosphere via the air inlet ducts extending through the sidewalls of the CEC and cask, as further described elsewhere herein.

In one embodiment, the radial width W2 of ventilation annulus 322 in upper cask 300 is preferably larger than radial width W1 of the ventilation annulus 121 in lower CEC 110. Because the nuclear waste canisters 150 stored in the CEC and cask have the same diameter which is standardized, the larger radial width W2 of the upper cask is the result of the cavity 321 of the upper cask having a larger diameter D2 than the diameter D1 of cavity 120 in the lower CEC (see, e.g., FIG. 36A). The additional annulus 322 volume thus created in the cavity 321 of upper cask 300 can advantageously accommodate the additional volume of heated ventilation air received from the lower CEC 110 without compromising the ability of the upper annulus 322 to absorb the additional heat generated by the canister 150 in the upper cask. By contrast, the CEC 110 may have a smaller diameter D1 cavity 120 since it only draws the volume of ambient cooling air inwards through its air inlets 125 necessary to accommodate the heat load created by a single nuclear waste canister 150 inside the CEC.

Figure 29:
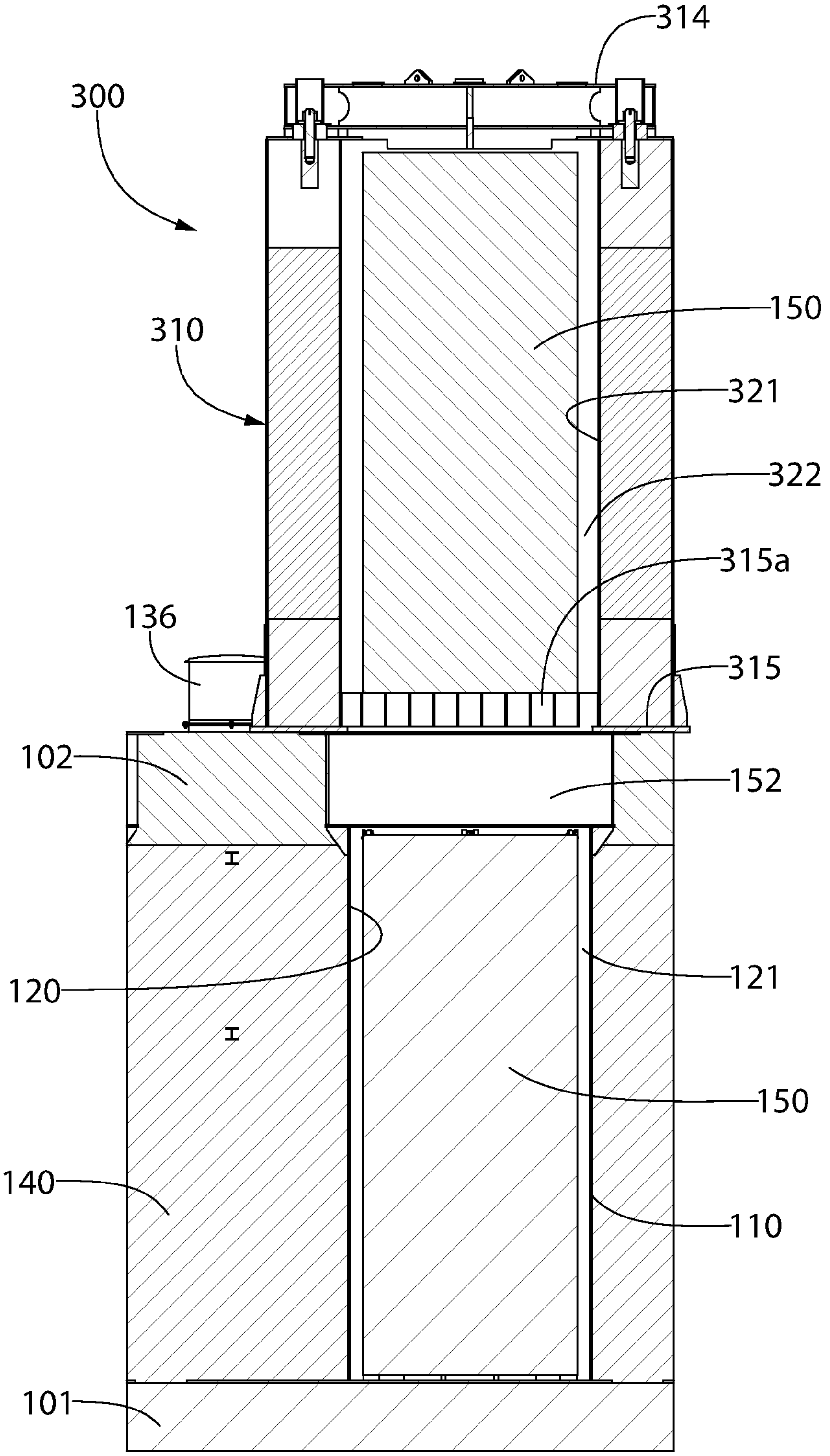
FIG. 29 is a first vertical cross sectional view of the storage system including the lower CEC and upper cask.
Figure 30:
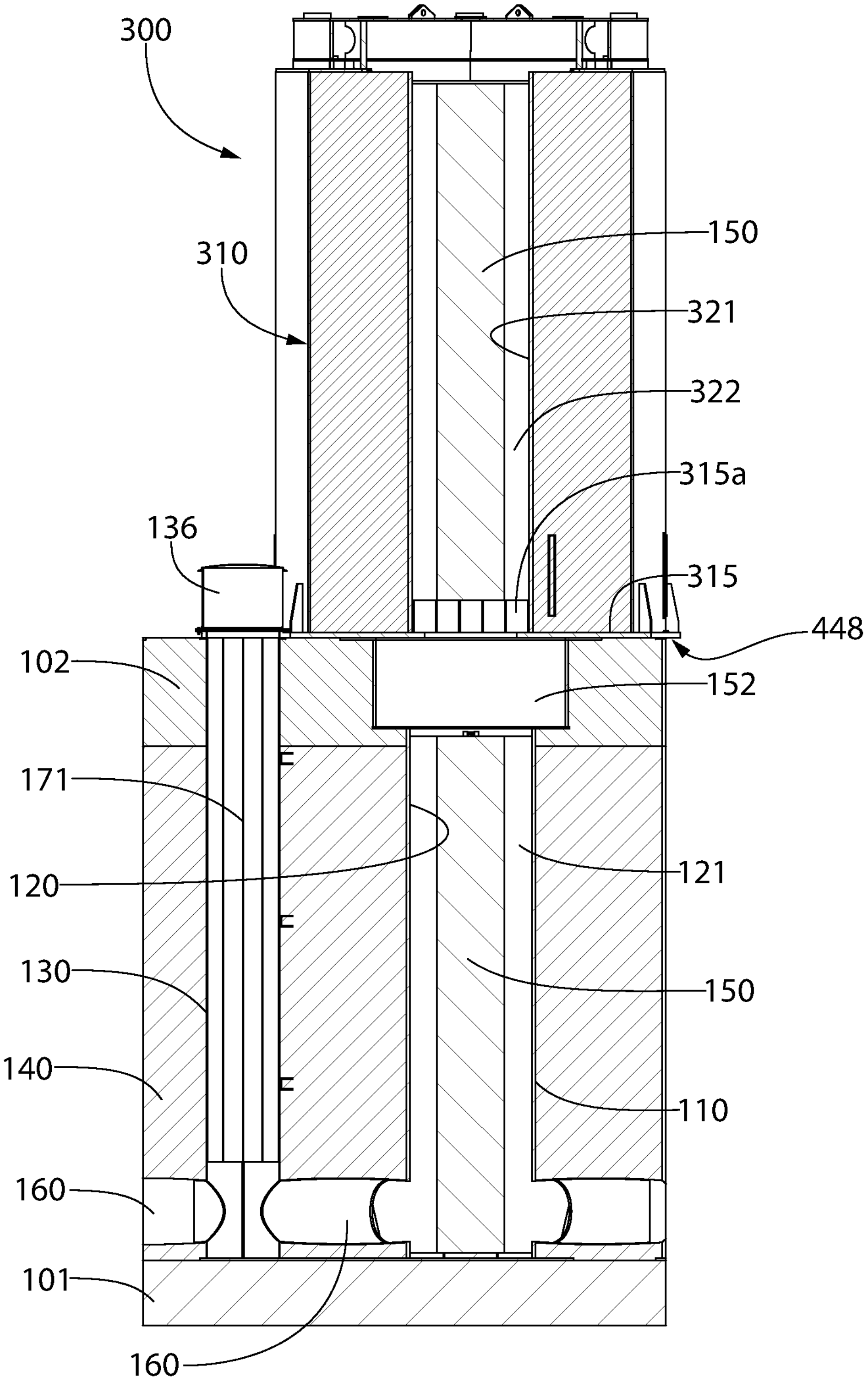
FIG. 30 is a second vertical cross sectional view thereof.
Figure 31:
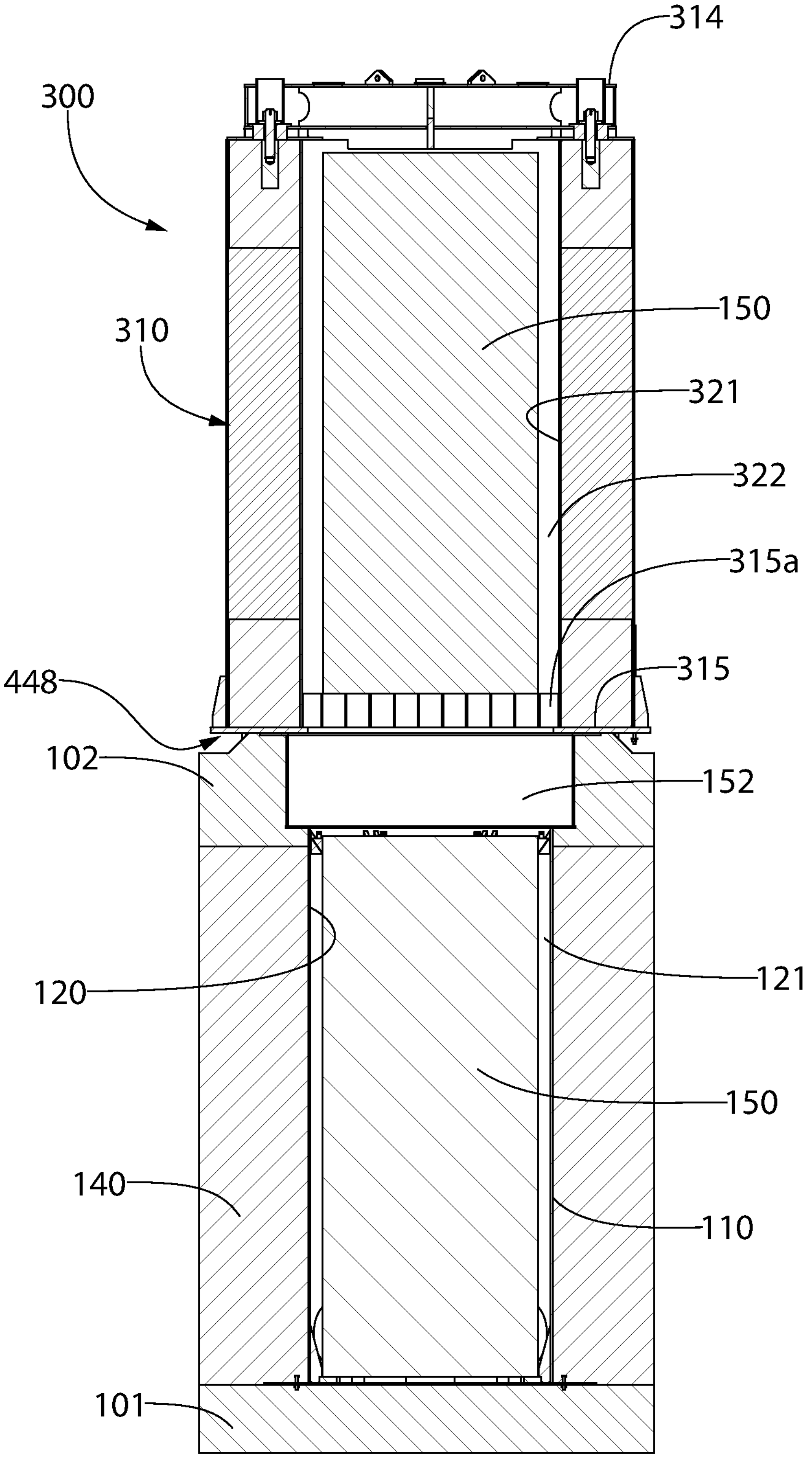
FIG. 31 is a third vertical cross sectional view thereof.
Figure 32:
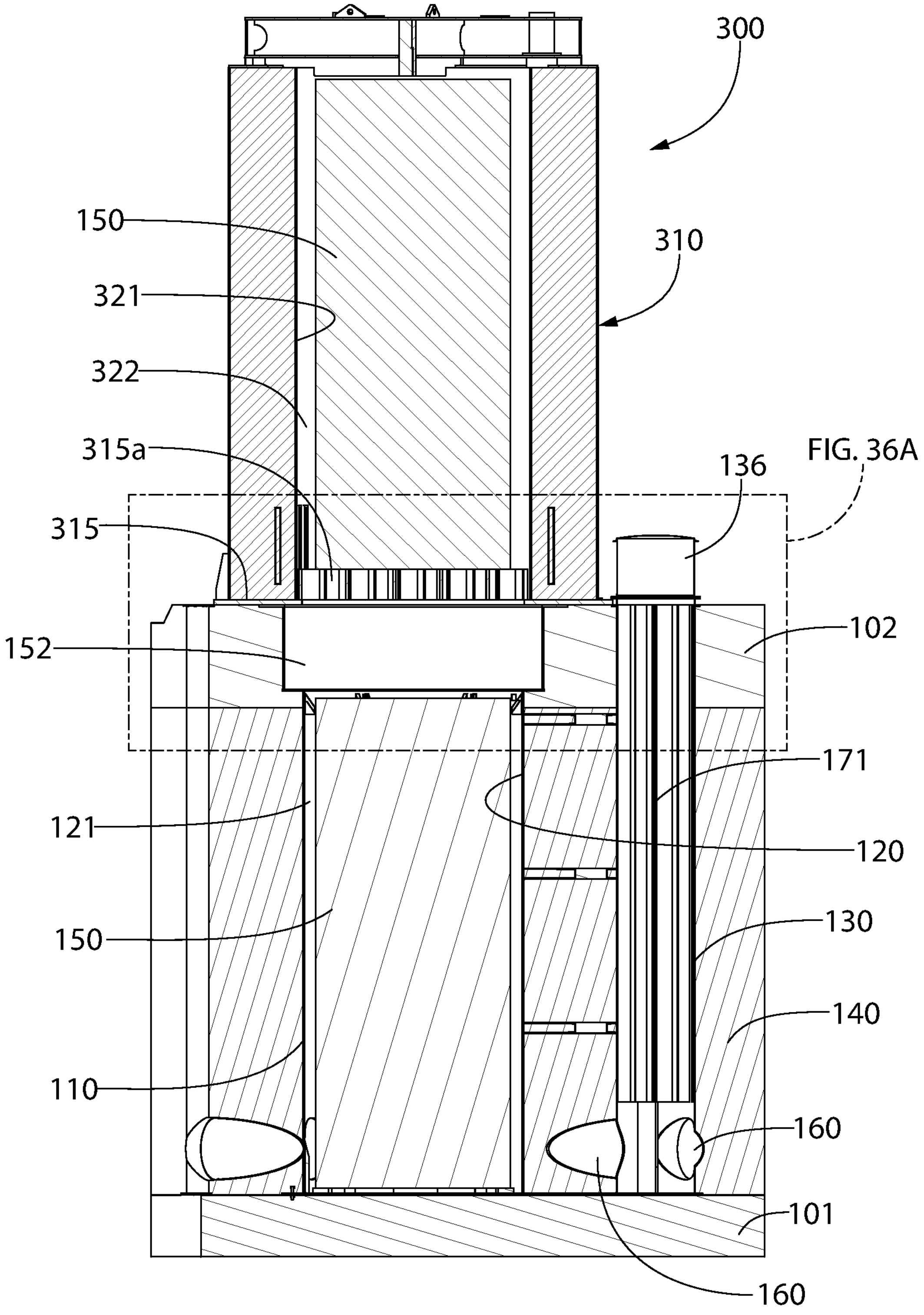
FIG. 32 is a fourth vertical cross sectional view thereof.
Figure 33:
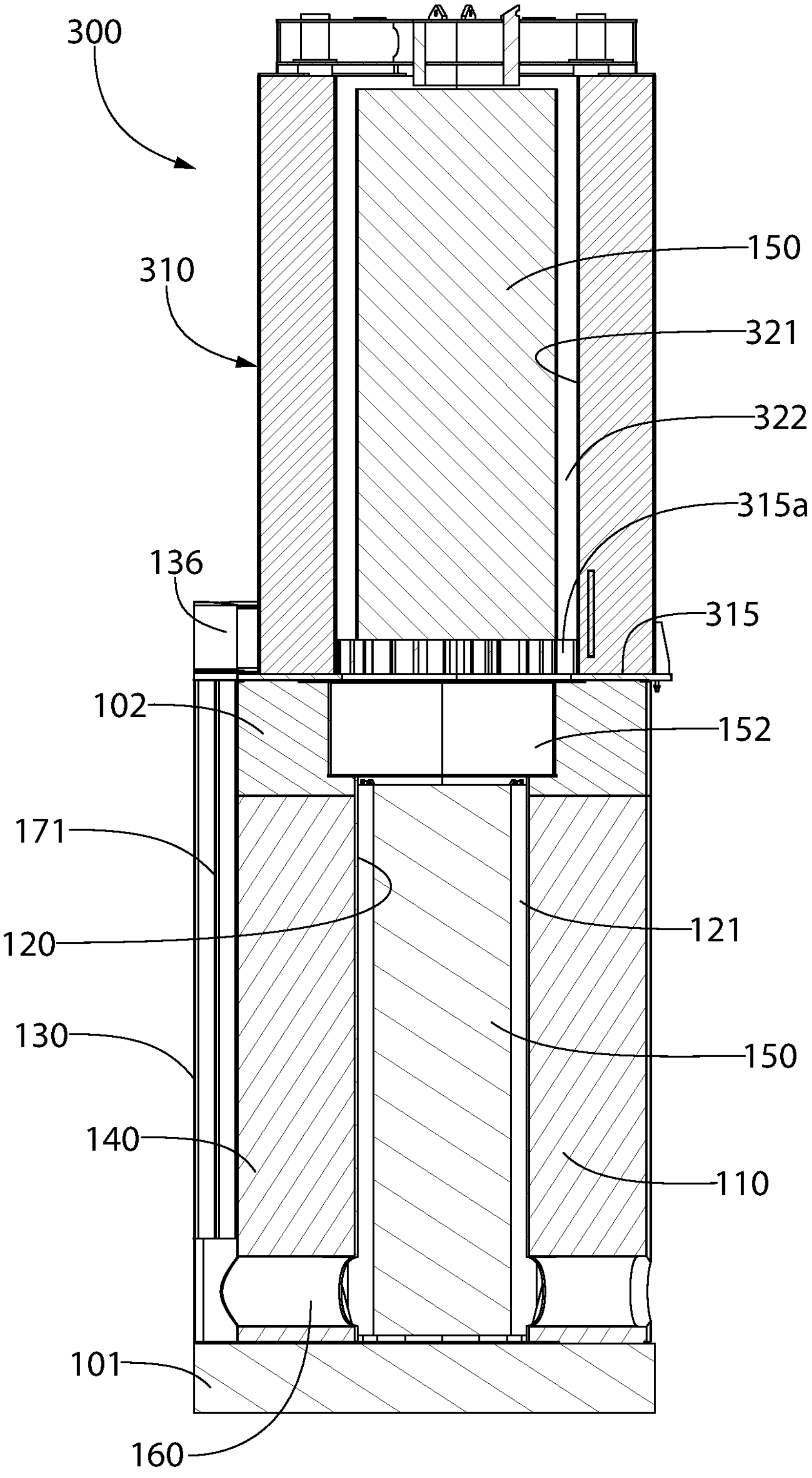
FIG. 33 is a fifth vertical cross sectional view thereof.
Figure 36A:
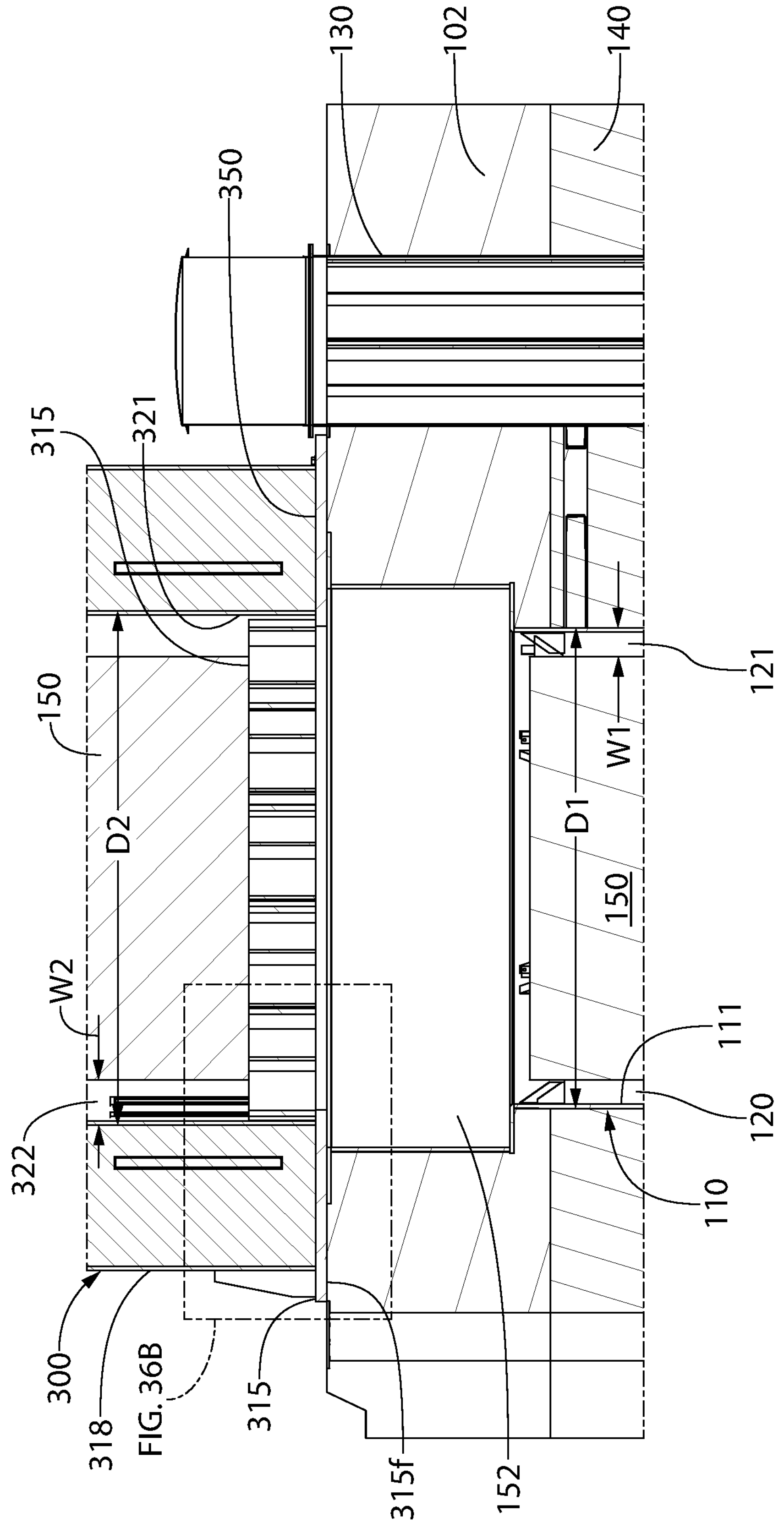
FIG. 36A is an enlarged partial transverse cross sectional view of storage system showing the cask-to-CEC interface area.
Figure 36B:
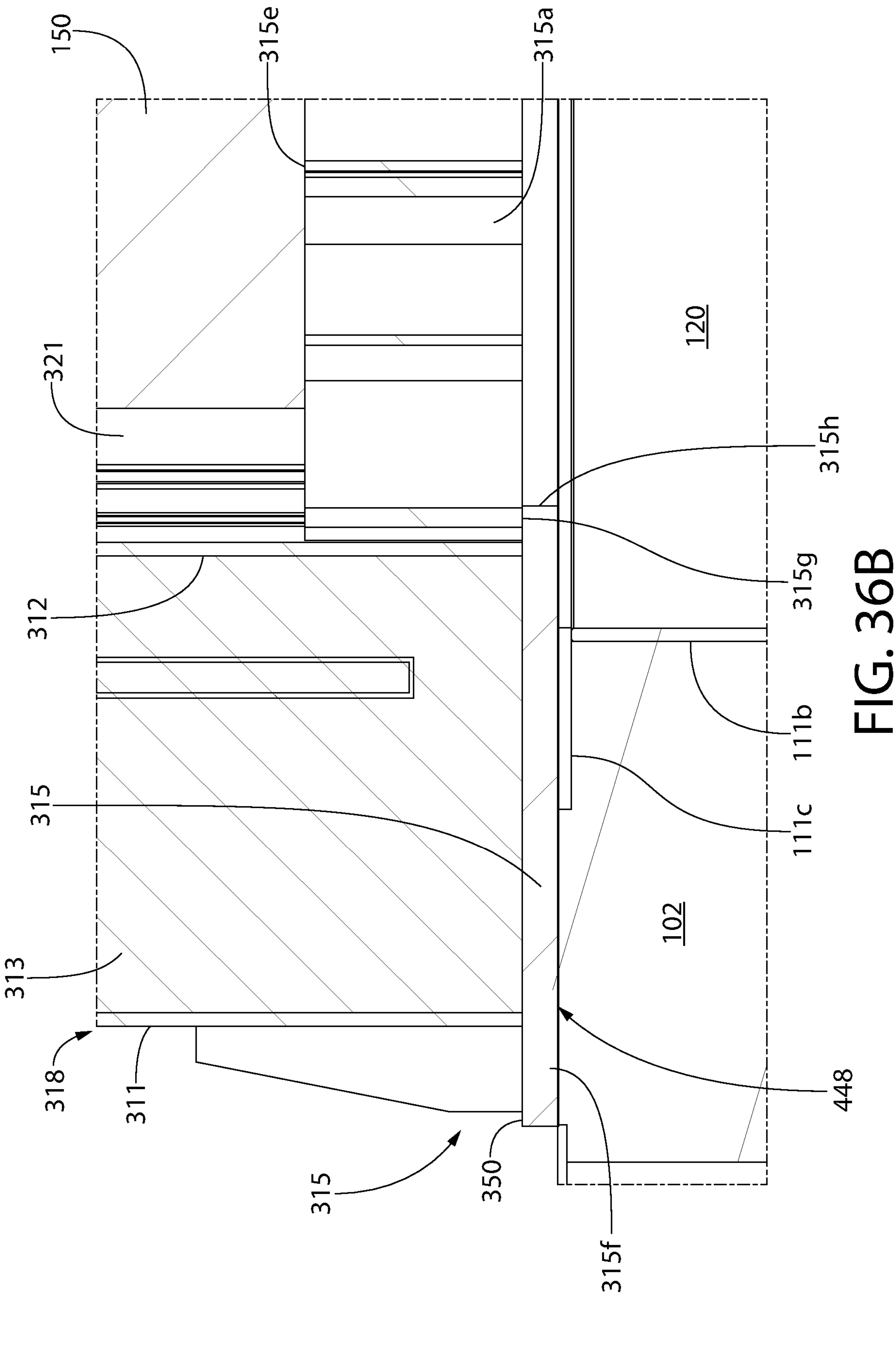
FIG. 36B is a detail taken from FIG. 36A.

As shown in FIGS. 29 and 36A, a cask-to-cask interface 448 is formed between the upper cask 300 and lower CEC 110. Specifically, the interface may be defined by the joint between the bottom mounting flange 350 of the upper cask defined by baseplate 315 and the top surface 102*a* of the top pad 102. It bears special note that nuclear waste canister 150 in the cavity 321 of upper cask 300 is positioned above the interface 448 (e.g., bottom end of canister), and conversely the canister 150 in the cavity 120 of lower CEC 110 is positioned below interface 448 (e.g., top end of canister). The prevents radiation shine or streaming through the cask-to-cask interface 448 from the casks radially outwards to the ambient environment.

A radiation-shielded closure lid 314 is detachably coupled to the top end 319 of the above grade upper cask 300. Reference is made in general to FIGS. 21-44 as applicable, and in particular FIG. 37 which shows the lid in greater and enlarged cross-sectional detail. Lid 314 closes the normally upwardly open cavity 321 of upper cask 300 when in place. Lid 314 may be a circular cylindrical structure comprising a hollow metal outer housing 314*b* defining an interior space filled with a radiation shielding material 314*a* such as a concrete plug or liner encased by the outer housing. Other shielding materials may be used in addition to or instead of concrete. Lid 314 provides radiation shielding in the vertical upward direction, whereas the concrete liner 313 disposed between the inner and outer shells 312, 311 of the cask body 318 provides radiation shielding in the lateral or horizontal direction. With exception of the concrete liner, the foregoing lid-related components are preferably all formed of a metal such as without limitation steel (e.g. carbon or stainless).

Figure 6:
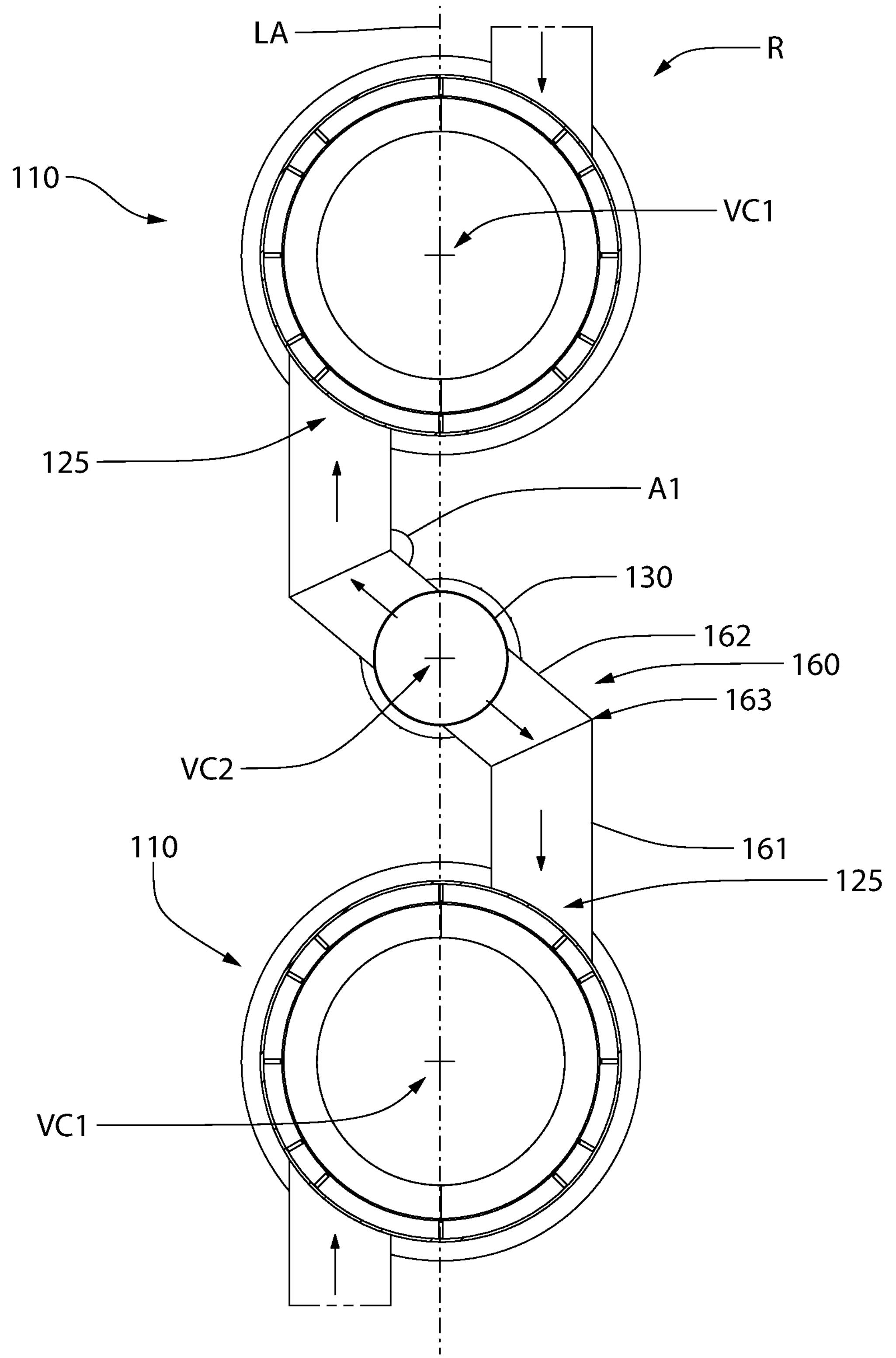
FIG. 6 is a top plan view of an arrangement of multiple CECs of the second embodiment.
Figure 7:
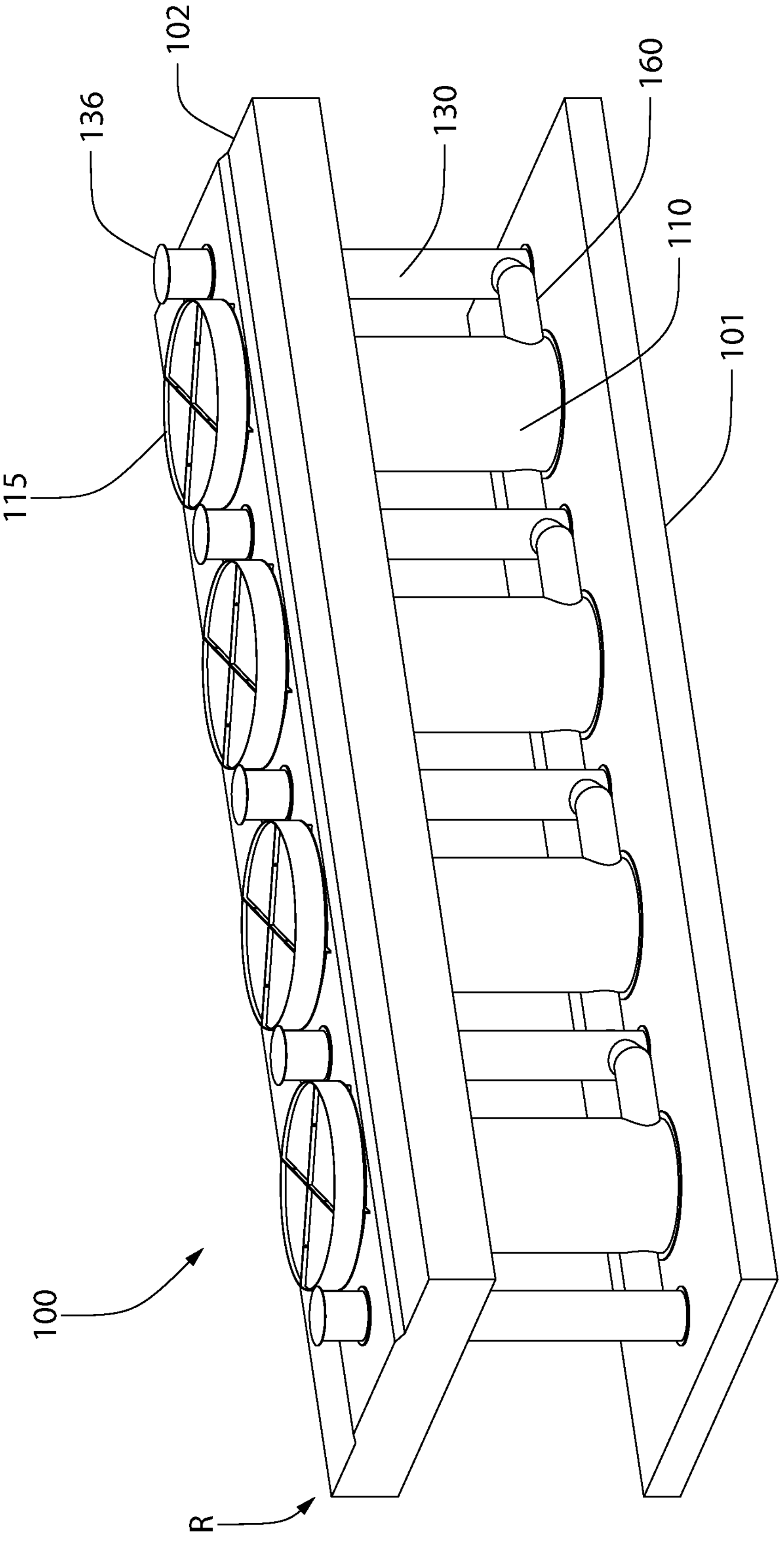
FIG. 7 is a perspective view of one nuclear waste storage row according to the second embodiment.
Figure 8:
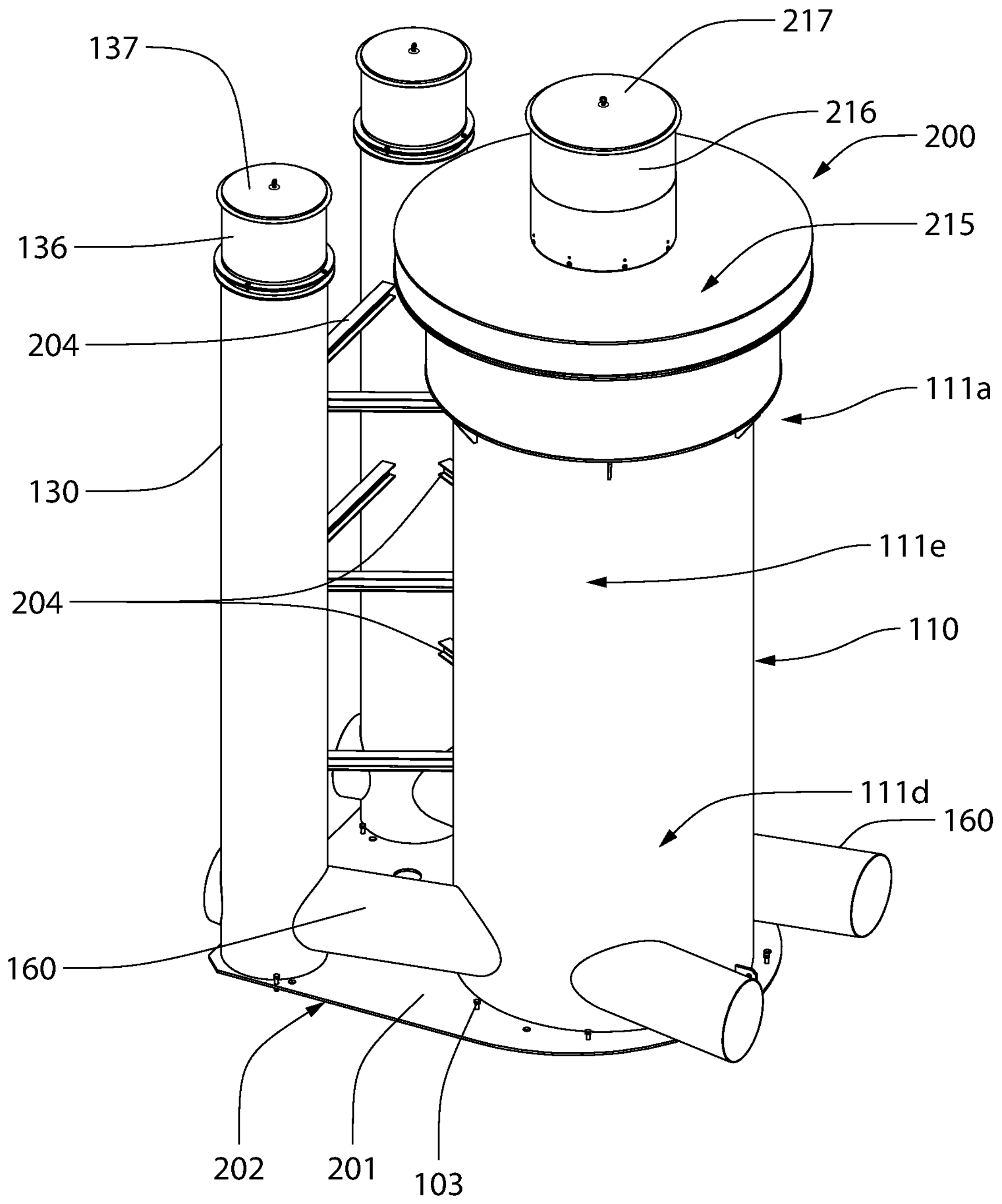
FIG. 8 is a top perspective view of the first embodiment of a nuclear waste storage system of FIGS. 1-3 showing one of the modular nuclear waste storage units including a CEC; pair of directly fluidly coupled cooling air feeder shells all mounted on a common support plate.
Figure 9:
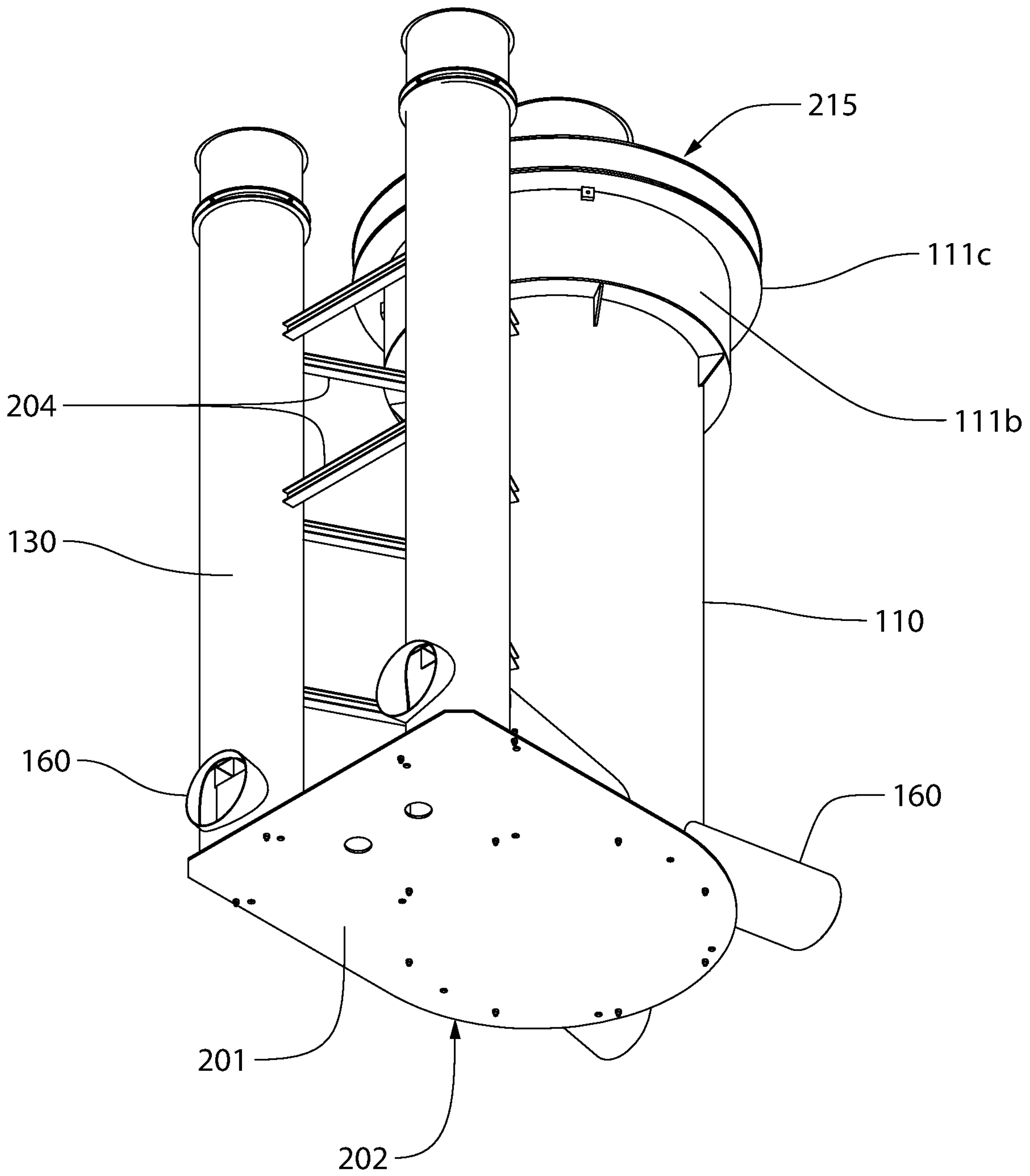
FIG. 9 is a bottom perspective view thereof.
Figure 10:
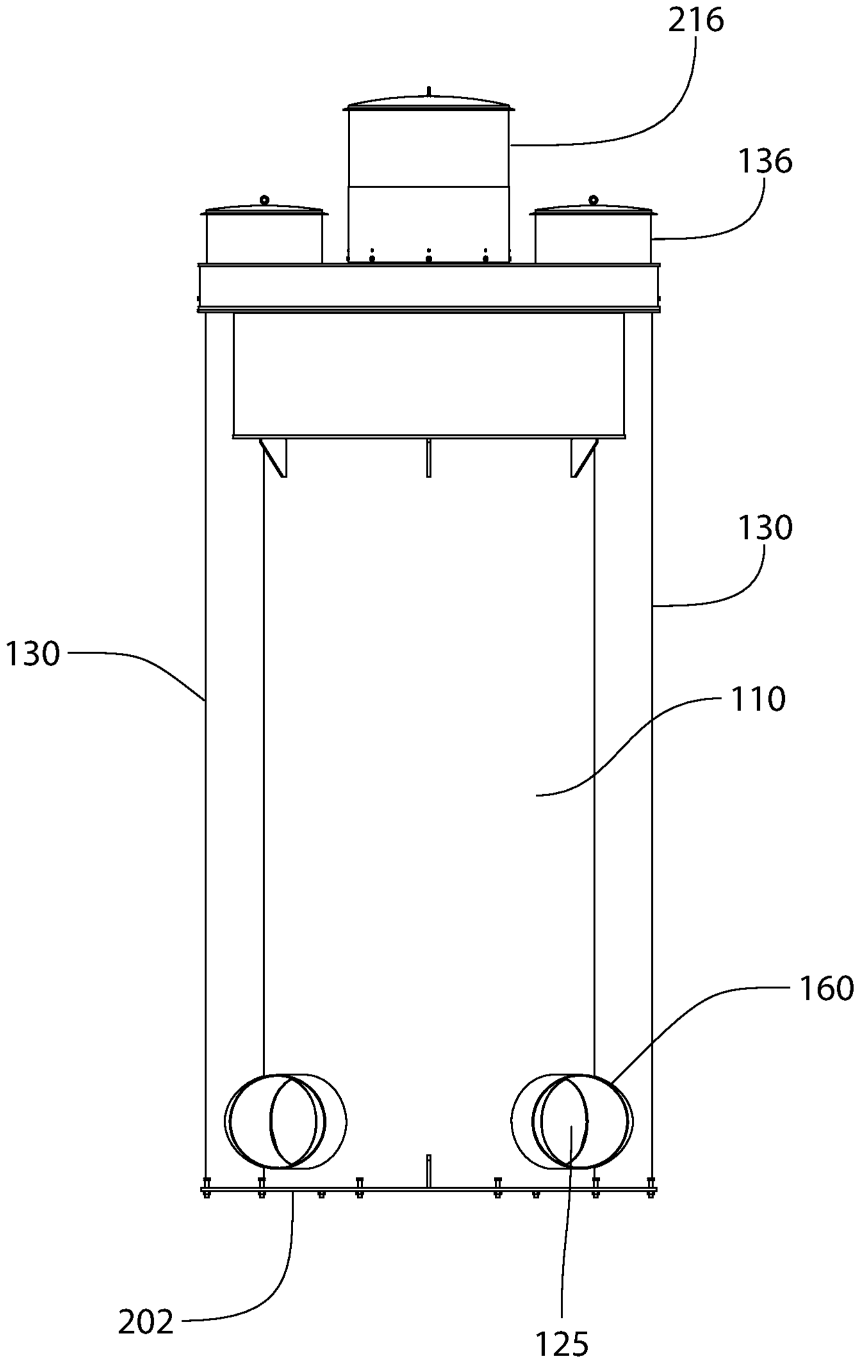
FIG. 10 is a first lateral side view thereof.
Figure 11:
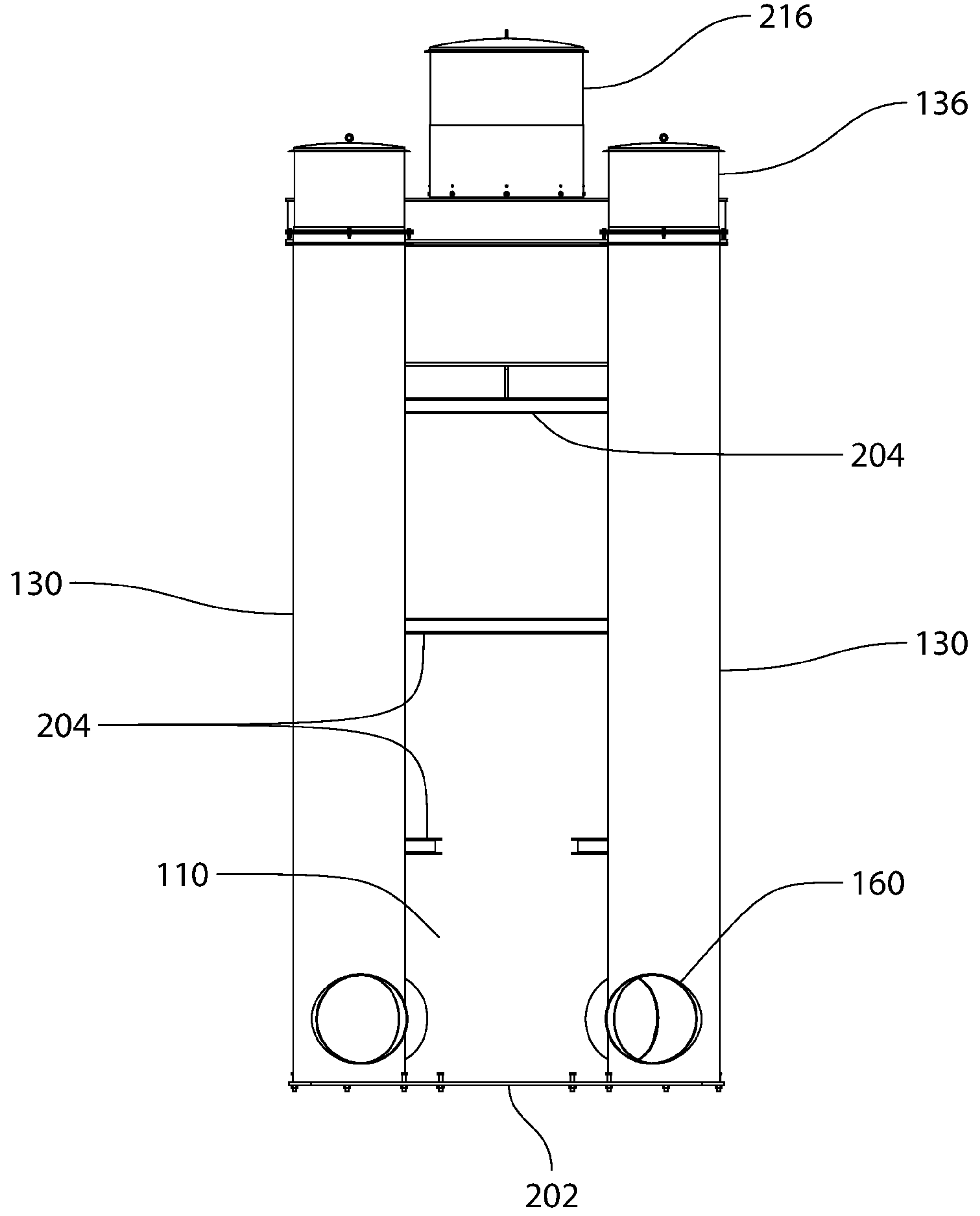
FIG. 11 is a second lateral side view thereof.
Figure 12:
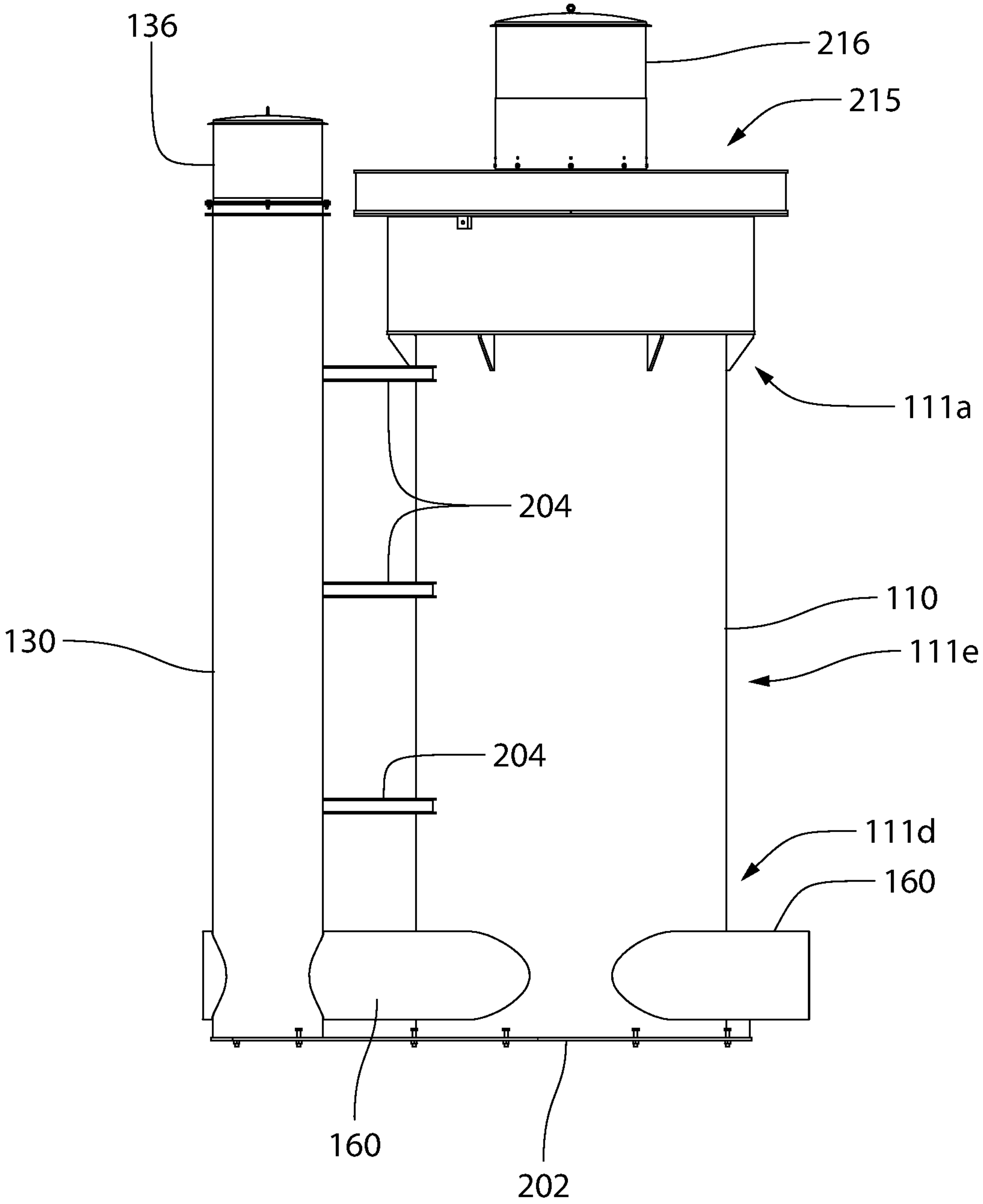
FIG. 12 is a front view thereof.
Figure 13:
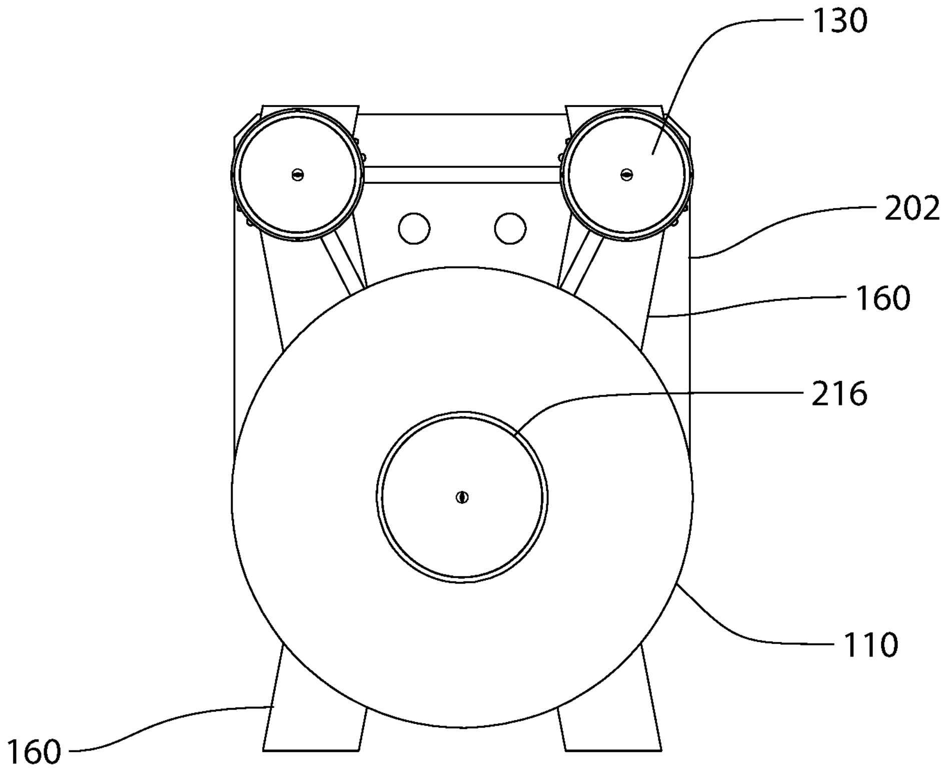
FIG. 13 is a top view thereof with the top lid in place on the CEC.

Housing 314*b* of lid 314 may include circular top cover plate 314*b*-1, circular bottom cover plate 314*b*-2, and a circumferentially-extending peripheral ring wall or shell 314*b*-3 extending vertically between the ring plate and top plate (see, e.g. FIG. 6). The top and bottom cover plates may be flat and the ring shell 314*b*-3 may be cylindrical in shape in a certain embodiment.

A plurality of circumferentially spaced apart cylindrical standoffs 441 may be provided which elevate the bottom cover plate 314*b*-2 of lid 314 above the top end 319 of the upper cask 300. This provides a vertical gap of annular configuration which extends circumferentially all around the lid between the bottom cover plate and the top end of the cask to define an air outlet duct 440 through the lid to atmosphere. The air outlet duct 440 may extend 360 degrees all around the lid 314 except for interruptions by the standoffs 441. An annular mesh screen 444 with open flow areas encloses the annular air outlet duct 340 to prevent the ingress of debris or other materials into the cask, while concomitantly allowing the heated ventilation air to exit the lid back to atmosphere.

A central air collection recess 314*c* is formed beneath bottom cover plate 314*b*-2 of lid 314 on the underside of the lid by gap created by the standoffs 441. Central air collection recess 314*c* is downwardly open to internal cavity 321 of cask 300 to receive the vertically rising ventilation air from the ventilation annulus 322 which is heated by the canister. The central air collection recess collects the heated ventilation air and directs the air radially outwards back to ambient atmosphere through the air outlet ducts 440.

Figure 37:
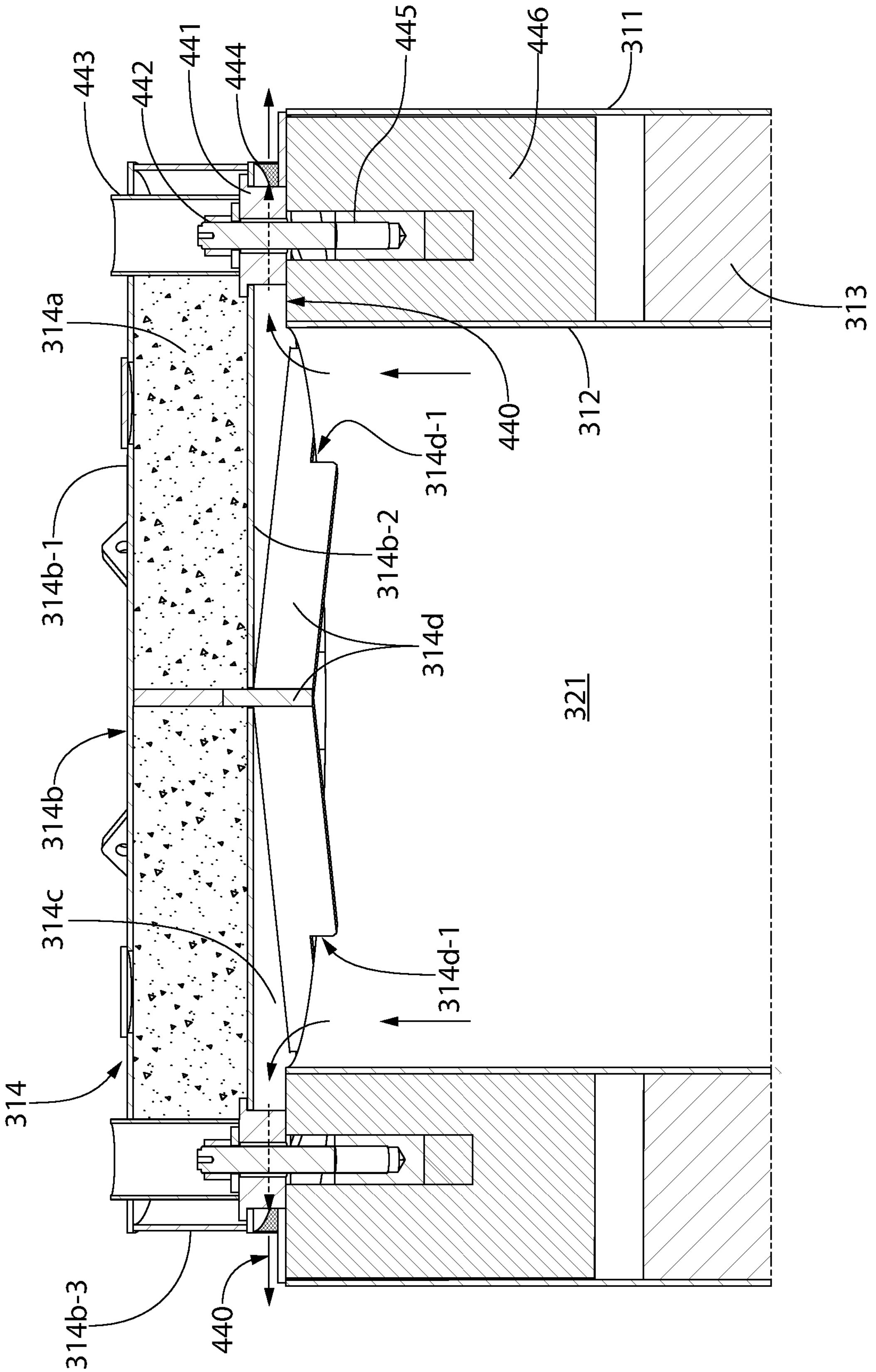
FIG. 37 is a partial transverse cross sectional view of the upper portion of the upper cask and cask lid.
Figure 38:
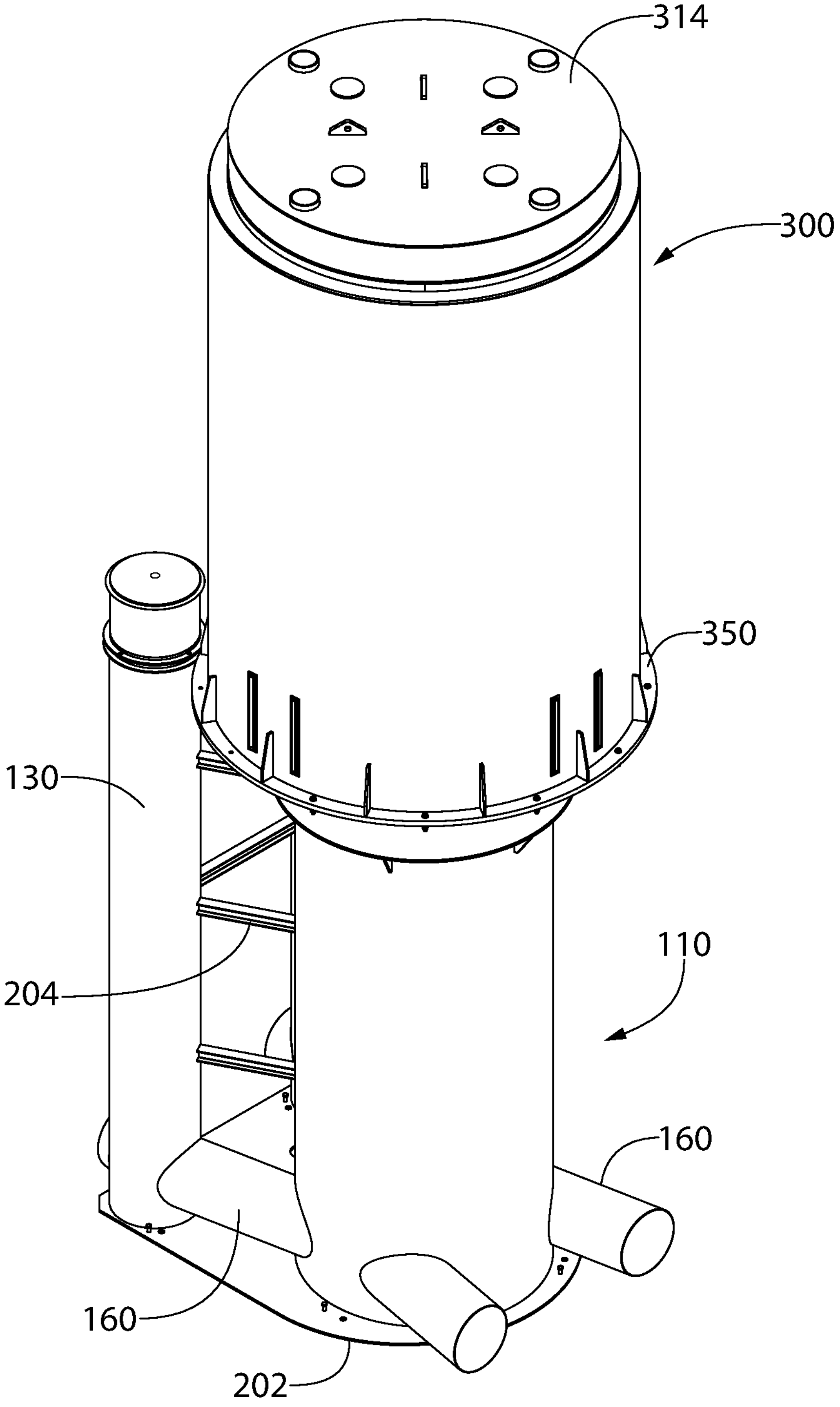
FIG. 38 is a first perspective view of the CEC and cask assembly.
Figure 39:
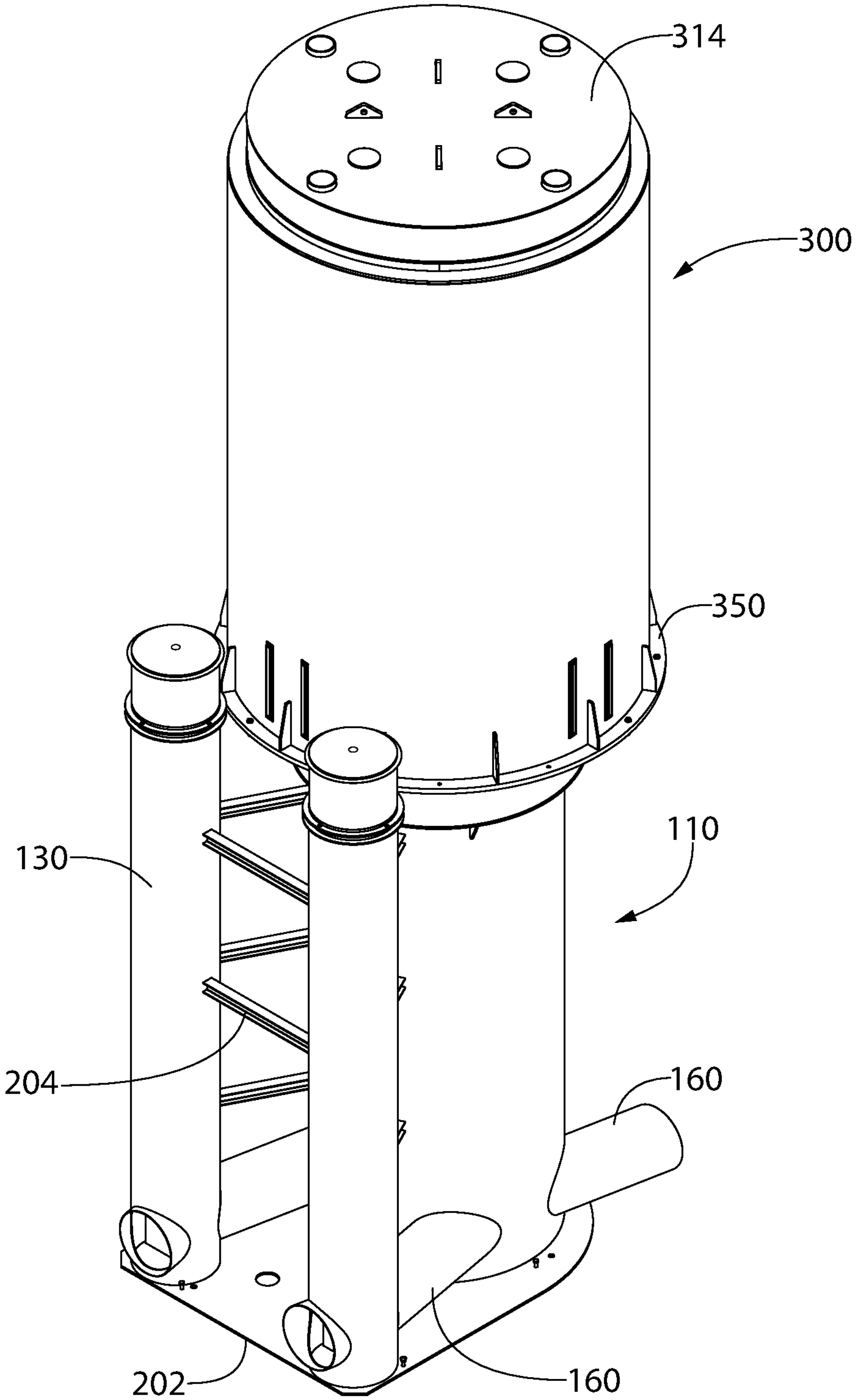
FIG. 39 is a second perspective view thereof.
Figure 40:
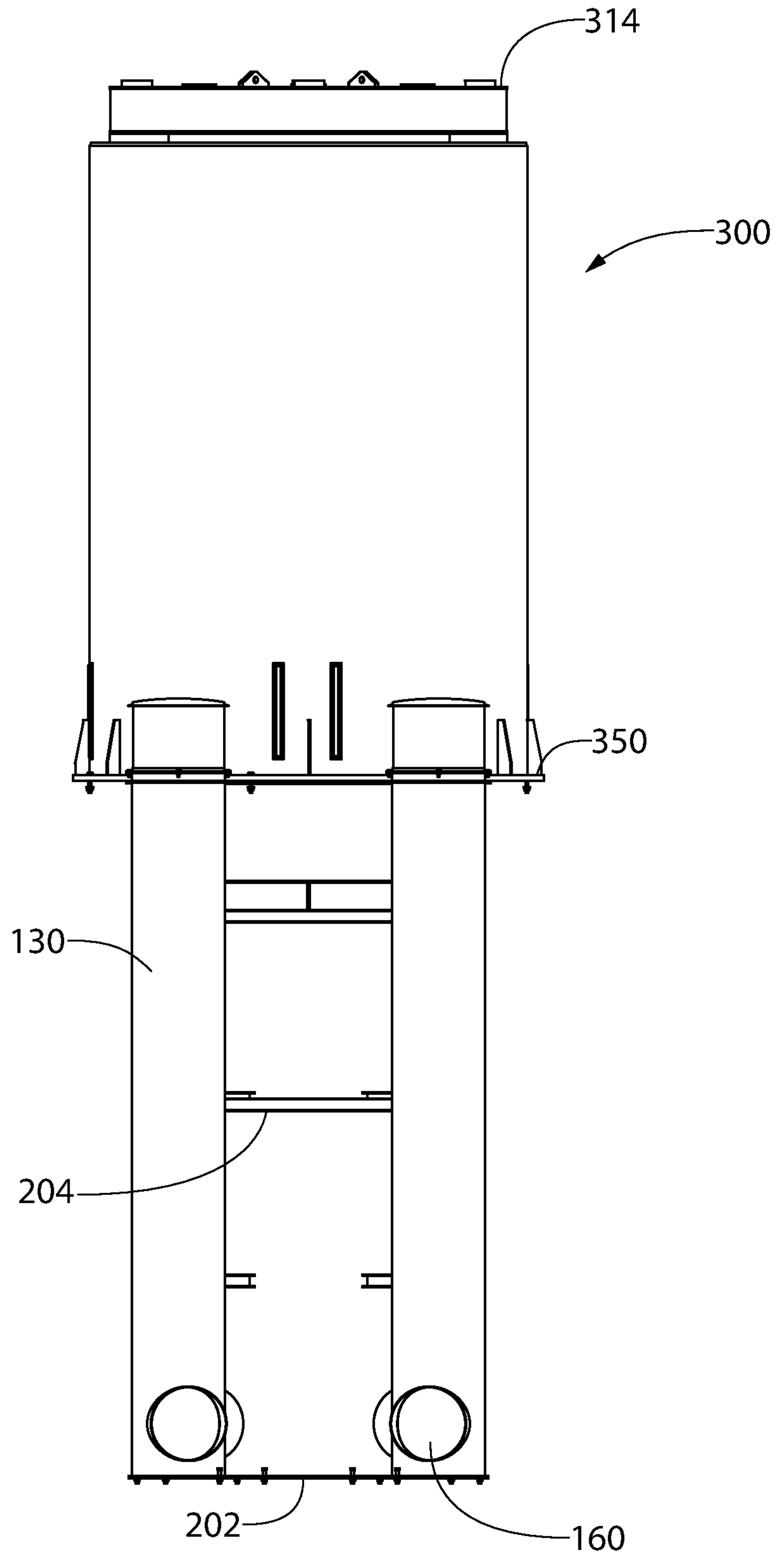
FIG. 40 is first side view thereof.
Figure 41:
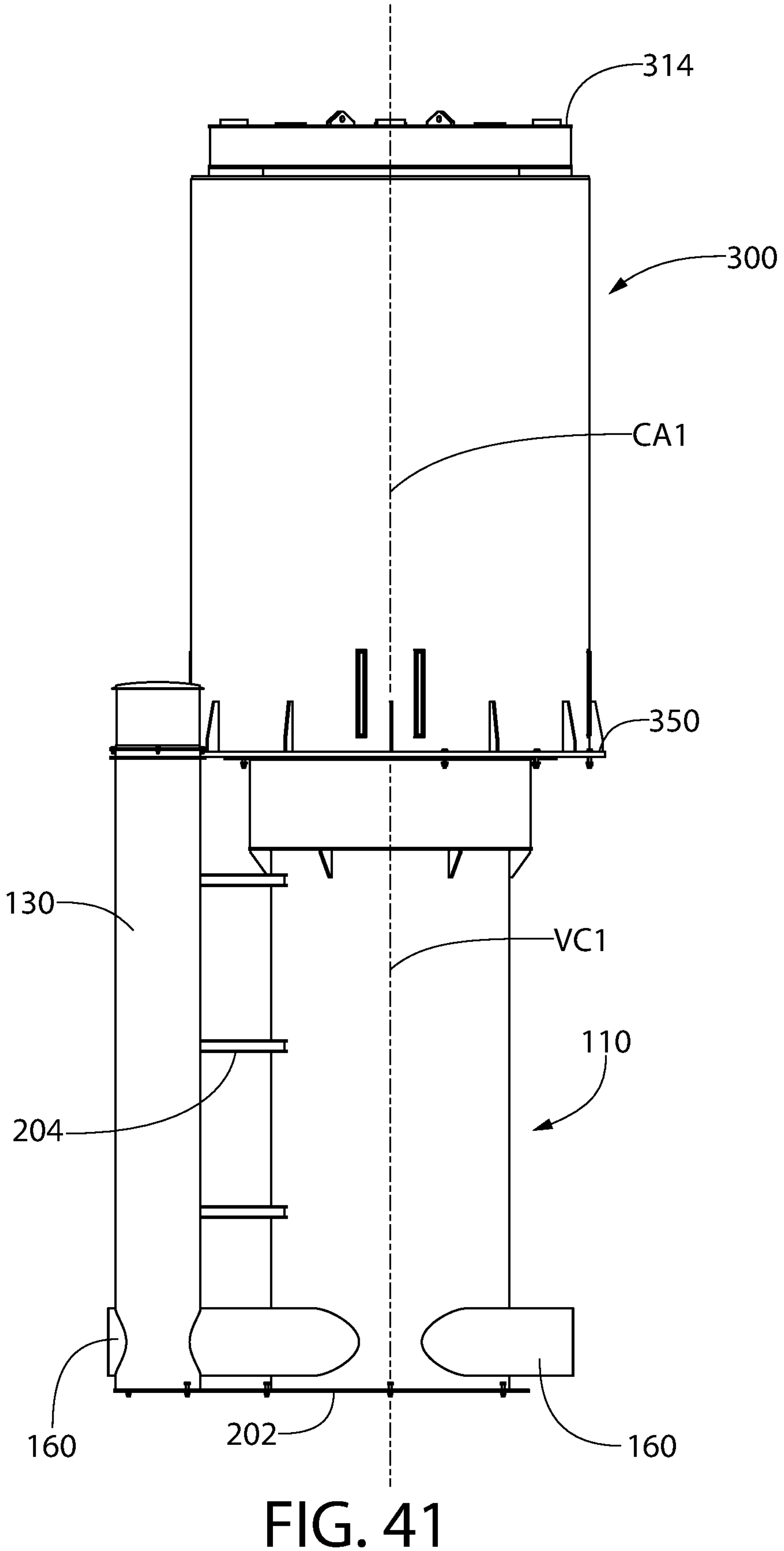
FIG. 41 is a second side view thereof.
Figure 42:
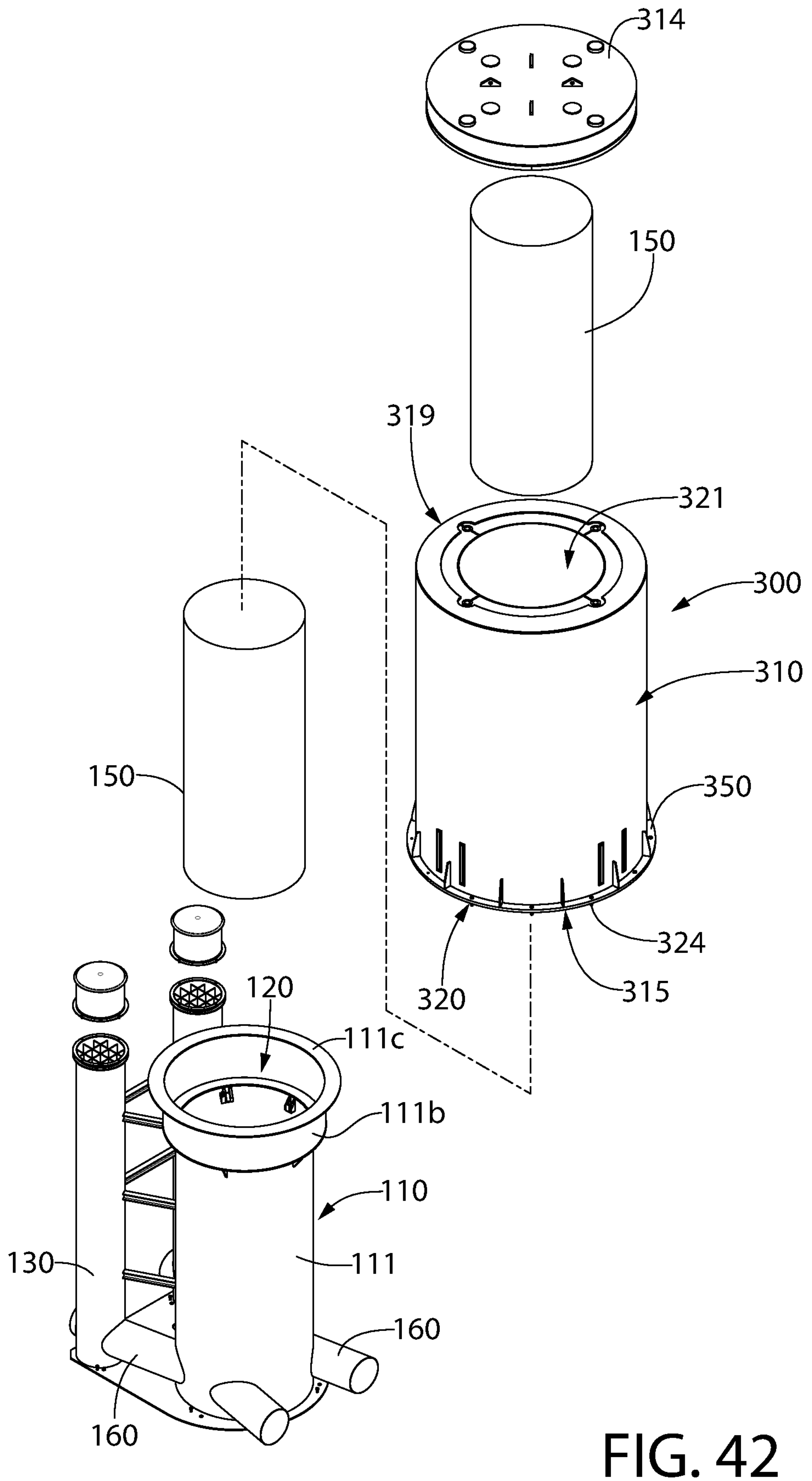
FIG. 42 is a first exploded perspective view thereof.
Figure 43:
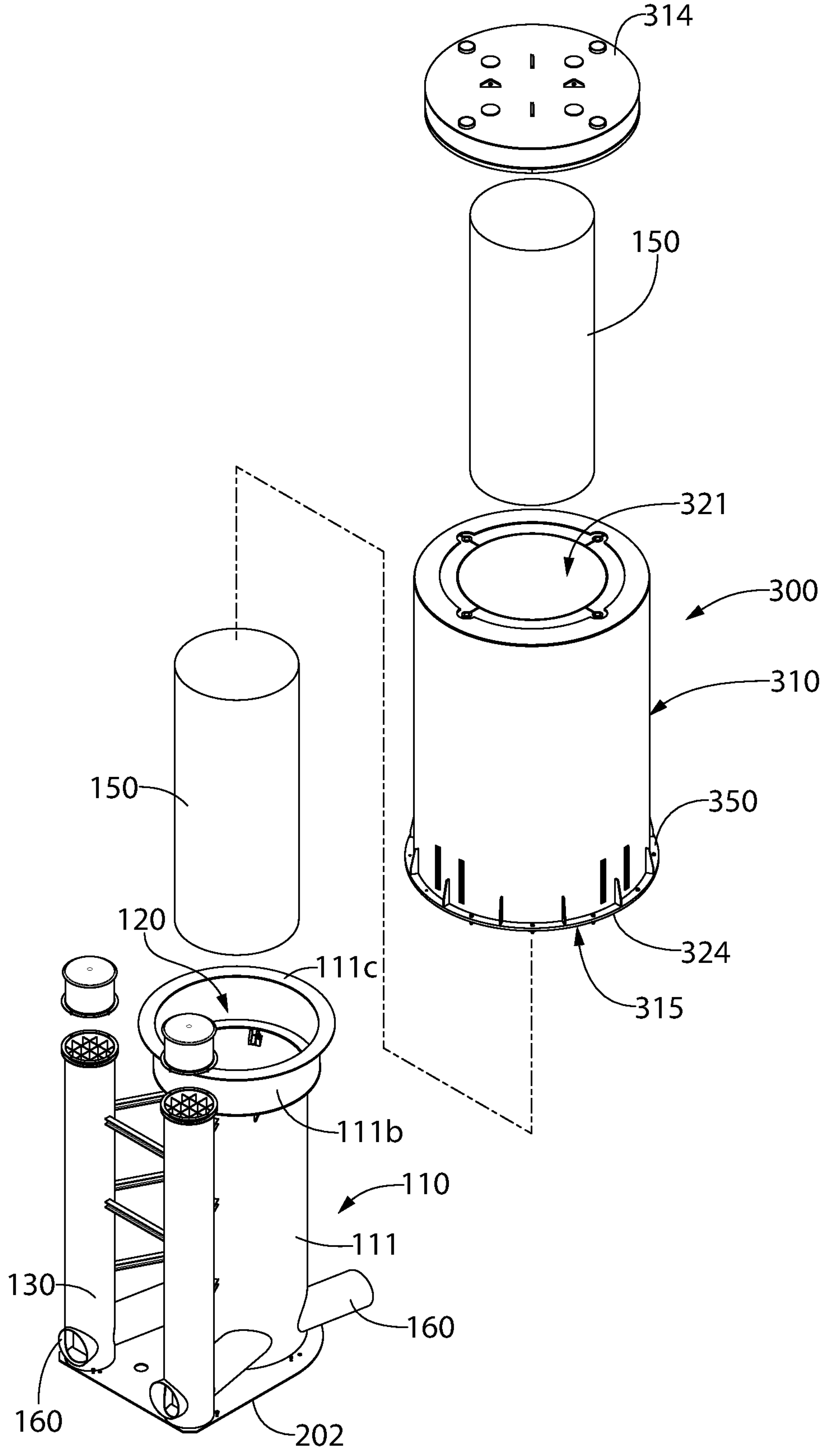
FIG. 43 is a second exploded perspective view thereof.

Vertical stiffening plates 314*d* welded between the top and bottom cover plates through the concrete radiation shielding material 314*a* structurally stiffens the lid housing. In one embodiment, as best shown in FIG. 37, the stiffening plates are further configured and operable to detachably engage the top end 319 of the cask 300 to which the lid is mounted. For this purpose, the stiffening plates 314*d* may include a step-shaped cutout 314*d*-1 configured to engage the top end of the cask. The stiffening plates therefore serve to primarily support the full weight of the heavy radiation-shielded lid which is not imposed on the standoffs 441. The bottom cover plate 314*b*-2 may be welded to each of the standoffs which partially supports the weight of the lid.

The standoffs 441 may play a further role in detachably coupling the lid 314 to the upper cask 300. Although the heavy weight of the concrete-filled lid tends to keep the lid in place on the cask, it is desirable to provide additional securement in form of bolting the lid to the cask. For that purpose, a plurality of threaded lid bolts 442 may be provided each of which extends vertically through one standoff 441 and threadably engages a mating threaded socket 445 provided in the top end 319 of the cask 300. In one embodiment, each socket may be provided by a vertically oriented lid mounting plate 246 which is welded between inner and outer shells 312, 311 of the cask (see, e.g., FIG. 21). Each threaded socket is welded to its associated lid mounting plate which is embedded in the concrete radiation-shielding material 314*a*. Each standoff 441 includes a tubular access sleeve 443 which extends vertically through the radiation shielding material 314*a* of the lid 314 as shown to allow an operator to access the lid bolting.

Additional features of the passive ventilation air system used to cool the nuclear waste inside the above grade upper casks 300 will now be described.

The present nuclear waste storage system disclosed herein includes a natural circulation air ventilation system (i.e. unpowered by fans/blowers) for removing decay heat emitted from the canister 150 which holds the SNF or other high level radioactive waste. The cooling airflow provided by the ambient air surrounding the cask has flow driven by the natural convective thermo-siphon effect in which ventilation air within the ventilation annuluses 121 and 322 of the lower CEC 110 and upper cask 300 is heated by the canisters 150 therein which emit the heat generated by the decaying SNF or other radioactive waste stored inside. This air heating generates an upflow of the heated air within each respective ventilation annulus. This natural convection driven airflow effect is well understood in the art without further elaboration.

Referring generally to FIGS. 21-44 as applicable, the cask ventilation provisions of the upper cask 300 include a plurality of circumferentially spaced apart ventilation air inlet ducts 420 configured to draw in and introduce ambient ventilation air radially inwards into the internal cavity 321 of the cask. Air inlet ducts 420 establish fluid communication between cask cavity 321 (including ventilation annulus 322 formed in the cavity between canister 150 and inner shell 312 of the cask body 310) and ambient atmosphere which provides the source of the cooling air.

The air inlet ducts 420 may be circumferentially spaced apart around the perimeter/circumference of upper cask 300. The inlet ducts 300 may be equally or unequally spaced apart and may include at least four ducts to deliver ambient cooling air to each quadrant of the nuclear waste canister 150 contained in internal cavity 321 of upper cask 300. In the illustrated embodiment, each quadrant of the canister is cooled by a pair of inlet ducts 420 (i.e. 8 ducts total).

In one non-limiting preferred embodiment, the air inlet ducts 420 are disposed in and formed through the lower portion of the upper cask body 310 proximate to the bottom end 320 of the cask and cavity 321 therein to introduce ambient cooling or ventilation air into the lower portion of the cavity and upper ventilation annulus 322 of the upper cask 300. Accordingly, each air inlet duct 420 extends horizontally/laterally and radially completely through the sidewall 318 formed by the cask body 310 from outer shell 311 to inner shell 312. The radially oriented ducts 420 define air inlet passageways which place the lower portion of the cask cavity 321 and ventilation annulus 322 of upper cask 300 in fluid communication with ambient atmosphere and cooling air.

Air inlet ducts 210 of upper cask 100*b* introduces fresh cool ambient ventilation air radially inwards into the upper cask cavity 321 where it mixes with already heated ventilation air flowing vertically upwards from the lower CEC 110 into the upper cask cavity. Advantageously, this mixing of air streams tempers and cools the rising heated ventilation air from the lower CEC so that it is better able to absorb heat emitted by the nuclear waste canister 150 inside the upper cask 300. The stacked assemblage of the lower CEC 110 and upper cask 300 therefore are cooled by two vertically spaced apart sets of air inlets; air inlets 125 of CEC 110 being below grade and air inlet ducts 420 of cask 300 being above grade. This provides adequate cooling capacity for the heat load generated by the thermal energy emissions for both nuclear waste canisters 101 accommodated by the nuclear waste storage system.

The air inlet ducts 420 of the upper cask 300 each include an entrance opening 411 located at and penetrating the outer or external surface 311*a* of the upper cask outer shell 311 and an exit opening 412 located at and penetrating the inner or internal surface 312*a* of inner shell 311. A metallic flow conduit 413 of suitable configuration extends between and fluidly couples the entrance and exit of each inlet duct. The flow conduits 413 may have any suitable configuration and polygonal or non-polygonal cross-sectional shape. In one embodiment, as shown, the flow conduits may have a box-like configuration with a rectilinear cross-sectional shape (e.g., rectangular or square). Air inlet ducts 420 of upper cask 300 may be vertically elongated in configuration n one non-limiting embodiment.

Figure 44:
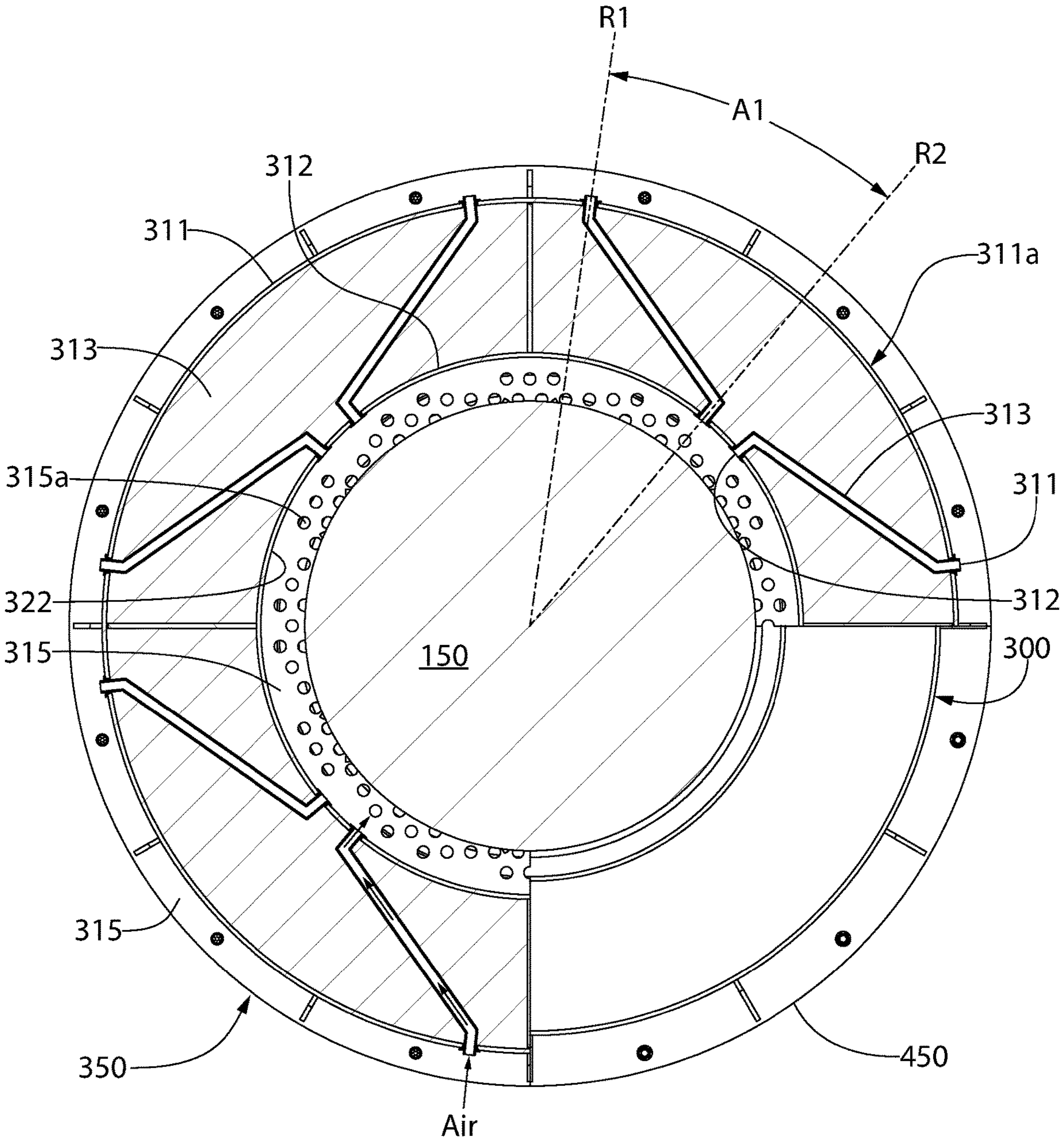
FIG. 44 is a transverse cross sectional view taken through the air inlet ducts of the upper cask.

Each flow conduit 413 of the upper air inlet ducts 420 extends radially through the sidewall 318 of the cask body 310 (i.e. shells 311, 312 and radiation shielding material 313 therebetween) to fluidly connect ambient air to the internal cavity 321 and ventilation annulus 322 of the upper cask 300 (see, e.g., FIG. 44). The flow conduit 313 may therefore be embedded within the radiation-shielding material liner of the upper cask 100*b*.

To prevent radiation streaming from the SNF or other radioactive waste stored inside the canister 150 when disposed in upper cask 300 to the ambient environment through the inlet ducts 420, each inlet duct may have a circuitous configuration to draw ambient ventilation air radially inwards into the cask cavity 321 in a circuitous path such that no straight line of sight exists between external entrance opening 201 and the internal exit opening 212 of each air inlet duct. To provide such a circuitous configuration, the entrance opening 211 may be radially and angularly offset from exit opening 212 of the duct. In one non-limiting example, the entrance opening 211 may be located at a first angular position defined by a radial reference line R1 and the exit opening 212 may be located at a second angular position defined by a second radial reference line R2 (see, e.g., FIG. 44). The entrance and exit openings 411, 412 may be angularly offset at an angle A1 between about and including 20 to 40 degrees. Angle A1 may be about 30 degrees in one preferred but non-limiting embodiment. The flow conduit 413 located therebetween extends transversely to radial references lines R1 and R2 through the radiation-shielding material 313 liner of the upper cask body 310 as shown to fluidly coupled the entrance and exit openings. The foregoing configuration and arrangement eliminates any straight line of sight through the upper set of air inlet ducts 420.

In operation of the passive ventilation air cooling system, air residing inside the ventilation annulus 121 of the below grade lower CEC 110 between the canister 150 and CEC shell body 111 is heated by the thermal energy emitted by the canister (i.e. nuclear waste container therein). The heated ventilation cooling air rises flowing vertically upwards within the annulus to the open top end of the lower CEC. Due to the natural convective thermo-siphon effect, the rising heated ventilation air concurrently draws available ambient cooling air from above grade surrounding the CEC vertically downwards via cooling air feeder shell(s) 130, then laterally/horizontally to the CEC air inlets 125 in the manner previously described herein. The cool ambient air flow radially inwards through the air inlets 125 adjacent to the bottom of the CEC cavity 120 into the CEC.

Concurrently, air residing inside the ventilation annulus 322 of the above grade upper cask 300 between its canister 150 and inner shell 312 is heated by the thermal energy emitted by the canister (i.e. nuclear waste container therein). This heated ventilation air inside upper cask 300 rises flowing vertically upwards within the annulus to the top end of the upper cask beneath the lid 314. Due to the natural convective thermo-siphon effect, the rising heated ventilation air concurrently draws available ambient cooling air surrounding the cask radially inwards through its set of air inlet ducts 420 adjacent to the bottom of the upper cask 300.

The process continues with the rising heated ventilation air in the lower CEC 110 which leaves the lower CEC and flows through the through holes 315*a* of the upper cask perforated baseplate 315 to enter the bottom of the ventilation annulus 322 inside upper cask 300. This heated ventilation air mixes with cool ambient air drawn into the upper cask via the set of air inlet ducts 420 as previously described herein. The mixed air is further heated by the canister 150 in the upper cask 300 as noted above. The further heated ventilation air continues to flow upwards and reaches the top end of the upper cask from which it is discharged back to atmosphere through the annular air outlet duct 440 defined by top closure lid 314 on the cask. This ventilation air circulation pattern continues indefinitely as long as the canisters emit some degree of heat.

Deployment of Stackable Nuclear Waste Storage System

There are at least two deployment scenarios in which the stackable nuclear waste storage system may be used to store nuclear waste at an ISFSI or other site. A method or process for storing nuclear waste will now be summarized with respect to these scenarios and variations thereof.

In a first deployment scenario, one or more below grade CECs 110 alone may be used at a first point in time for a period of time until additional nuclear waste storage capacity is required in the future at the storage site. The mounting of the lower CECs and later upper casks 300 into the tiered assemblage disclosed herein is therefore intended to be staggered over time instead of during the same in installation sequence as in the second deployment scenario described below. Each lower CEC of the stacked storage modules may be buried and positioned at a discrete location on the concrete pad S of the storage facility (see, e.g., FIGS. 1-3). The cooling air feeder shells 130 and flow conduits 160 associated with each CEC 110 are fluidly coupled to their respective one or more CECs as previously described herein.

With the CECs 110 each embedded in the concrete top pad 102 and engineered fill 140, a first nuclear waste canister 150 is lowered and inserted into each CEC internal cavity 120. The canister 150 is in a dry condition and may be loaded into cask 100*a* via a commercially-available transfer cask which is a lighter vessel with thinner walls providing less radiation shielding (sidewalls without concrete) than heavier thick walled storage casks with concrete sidewalls such as lower and upper casks 100*a*, 100*b*. Transfer casks are typically submerged in the fuel pool with a nuclear waste canister (e.g., MPC) pre-loaded therein, which is then with SNF assemblies in a known manner. The canisters are in a wetted condition inside the transfer cask rather than a dry condition such as when canisters 101 disclosed herein are loaded into the lower and upper casks 100*a*, 100*b*. Examples transfer casks which may be used are disclosed in commonly-owned U.S. Pat. Nos. 9,466,400 and 7,330,525, which are incorporated herein by reference in their entireties. Transfer casks may also be used to load the canister into the upper cask 300 described below.

With the canister now emplaced, a CEC lid 115 is then positioned on and mounted on top of the CEC in the same manner described above.

With the canister 150 now positioned in the CEC and lid in place, the thermo-siphon ventilation air system becomes activated due to the heat generated by the canister inside. Cool ambient ventilation air is drawn through the one or more cooling air feeder shells 130 and flow conduits 160 into the CEC cavity 120 via the air inlets 125. The cooling air is heated by the thermal energy emitted from nuclear waste in the canister and rises upwards through the ventilation annulus 121 of the CEC, and is then returned to atmosphere as heated ventilation air through the air outlet 118 defined by the lid 115 as previously described herein. The method includes operating the CEC 110 for a period of time to store and cool the radioactive waste in the CEC.

At a second point in time (later than the first point in time such as for example days, weeks, months, or years later), additional storage capacity may be added as required by installing one or more upper casks 300 on some or all of the lower CECs 110 previously installed at the nuclear waste storage site. An empty and upwardly open upper cask 300 is first positioned on concrete top pad 102 in a temporary staging area. A second canister 150 is loaded and inserted into the upper cask. The lid 115 on the lower CEC 110 may be removed leaving an upwardly open vessel. The upper cask 300 may then be lifted and positioned over and above the corresponding below grade CEC and bolted to the top pad 102. The perforated baseplate 315 of upper cask may abuttingly engage the upper annular seating flange 111*c* of the CEC on the top surface 102*a* of top pad 102 (see, e.g., FIG. 36B), but is not bolted or otherwise fixedly coupled thereto in any manner. The mutual engagement is one of a flat-to-flat interface and seal at this cask-to-CEC interface 448. The cask lid 314 may then be installed and bolted on the top end 319 of the upper cask 300 either while the cask is still on top pad 102 after loading the second canister 150 therein and before lifting, or after the cask is positioned on the top pad above the CEC.

With the canister 150 now positioned in the upper cask 300 and its lid in place, the air ventilation system is activated which for the upper cask includes a combined thermo-siphon effect and venturi effect. The thermo-siphon effect is triggered by heat generated by the canister inside the cask as previously described herein. The venturi effect is triggered by the velocity of the rising and upward flowing heated stream received in the upper cask cavity 321 from the lower CEC 110 below. Cool ambient air drawn through the upper air inlet ducts 420 via the venturi effect in part and thermo-siphon in part rises upwards through the ventilation annulus 322 of the upper cask 300, and is then returned to atmosphere as further heated ventilation air through the air outlet ducts 440 defined by the lid 314. In addition, the ventilation air introduced into the upper cask via the upper air inlet ducts 320 of the cask system is mixed in the ventilation annulus 322 with the already heated ventilation received from the lower CEC 110, as previously described herein. The combined and mixed ventilation air streams are thus discharged together from the lid on the upper cask.

In a second deployment scenario of the stackable nuclear waste storage system, both the lower CEC 110 and upper cask 300 may be installed at the storage site (e.g., ISFSI)

contemporaneously at the same point in time initially. The method or process includes positioning the CEC 110 on the concrete base pad 101, preferably anchoring the CEC to the pad to provide stability, and then loading/inserting the first nuclear waste canister 150 therein.

The method or process continues in the same manner previously described above for the first deployment scenario until the upper cask 300 is mounted on top pad 102 with lid in place above the CEC 110 to establish fluid communication between the internal cavities 321 and 120 through the perforated baseplate 315.

Numerous other variations in the sequence and/or methods described above with respect to each deployment scenario may be used.

It bears noting that the cask body 310 of the above grade upper cask 300 is free of any air outlets (i.e. sidewall 318). The air outlet 440 is instead defined by the cask lid 314. It also bears noting that the shell body 111 of the below grade CEC 110 is free of any air outlets. The air outlet 118 instead is defined by the CEC lid 115 but only when the CEC is used alone before the upper cask 300 is mounted above and fluidly coupled to the CEC.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. An underground passively ventilated nuclear waste storage system comprising:

a horizontal longitudinal axis;

a horizontally extending concrete top pad located at grade and having a top surface;

a horizontally extending subterranean concrete base pad located below grade and spaced vertically apart from the top pad;

a horizontally broadened flat support plate fixedly anchored on the base pad and having a top surface;

a vertically elongated first cavity enclosure container fixedly mounted on the support plate along the longitudinal axis, the first cavity enclosure container having a cylindrical body defining a vertical centerline axis and comprising a first air inlet, a second air inlet, an air outlet, and an internal cavity;

the internal cavity of the first cavity enclosure container being configured for holding a single nuclear waste canister which contains radioactive nuclear waste emitting heat;

the first cavity enclosure container including a bottom end disposed on the support plate, a top end terminating adjacent to the top surface of the top pad, and a lid removably coupled to the top end and defining an air outlet in fluid communication with the internal cavity;

a vertically elongated first cooling air feeder shell fixedly mounted on the support plate and spaced apart from the first cavity enclosure container, the first cooling air feeder shell having a top end located at or above the top surface of the top pad and operable to draw in ambient air, and a bottom end located on the support plate, the first cooling air feeder shell being fluidly coupled directly to the first air inlet of the first cavity enclosure container via a first flow conduit;

a vertically elongated second cooling air feeder shell fixedly mounted on the support plate and spaced apart from the first cavity enclosure container and the first cooling air feeder shell, the second cooling air feeder shell having a top end located at or above the top surface of the top pad and operable to draw in ambient air, and a bottom end located on the support plate, the second cooling air feeder shell being fluidly coupled directly to the second air inlet of the first cavity enclosure container via a second flow conduit;

a first plurality of cross-support members horizontally coupled between the first cavity enclosure container and each of the first and second cooling air feeder shells;

a second plurality of cross-support members horizontally coupled between the first and second cooling air feeder shells;

wherein the support plate and cross-support members form a rigid self-supporting modular unit for transporting and installing the first cavity enclosure container and the first and second cooling air feeder shells on the base pad.

2. The system according to claim 1, wherein the bottom ends of the first cavity enclosure container and the first and second cooling air feeder shells are welded to the support plate.

3. The system according to claim 2, wherein the support plate has a U-shaped configuration.

4. The system according to claim 2, wherein the first and second cooling air feeder shells each have a height at least equal to a height of the first cavity enclosure container.

5. The system according to claim 4, wherein the first cavity enclosure container has a larger diameter than the first and second cooling air feeder shells.

6. The system according to claim 5, wherein the first cavity enclosure container includes a cylindrical shell body comprising a lower portion proximate to and extending upwards from the base pad, an upper portion embedded in the top pad which defines the top end of the first cavity enclosure container, and a middle portion extending between the lower and upper portions, the upper portion being step-shaped including a diametrically enlarged cylindrical section having a diameter larger than a diameter of the lower and middle portions.

7. The system according to claim 6, wherein the upper portion is terminated with a radially projecting annular seating flange which rests on the top surface of the concrete top pad.

8. The system according to claim 6, wherein the air outlet of the first cavity enclosure container extends through the lid and an air discharge housing attached to a top surface of the lid and projecting upwards therefrom.

9. The system according to claim 8, wherein the lid comprises a cylindrical upper portion positioned outside the diametrically enlarged cylindrical section of the shell body and having a diameter larger than the diametrically enlarged cylindrical section, and a cylindrical lower portion depending downwards from the upper portion of the lid and insertably positioned inside the diametrically enlarged cylindrical section of the upper portion of the shell body, the lower portion of the lid having a diameter smaller than the diametrically enlarged cylindrical section to define a vertical air passage therebetween which is in fluid communication with the internal cavity of the first cavity enclosure container.

10. The system according to claim 9, wherein the lid defines an air discharge pathway in which air from the internal cavity of the first cavity enclosure container flows vertically upwards in the vertical air passage, then flows radially inwards into the air outlet formed inside the lid, then flows vertical upwards into the air discharge housing on top of the lid, and then flows radially outwards to atmosphere.

11. The system according to claim 9, wherein a ventilation annulus is formed between the canister and the cylindrical shell body of first cavity enclosure container, the ventilation annulus being in fluid communication with the first and second cooling air feeder shells which are fluidly coupled to a lower portion of the ventilation annulus.

12. The system according to claim 1, wherein the first and second flow conduits each comprise a horizontally-extending straight piping sections fluidly coupling a lower portion of the internal cavity of the first cavity enclosure container to a lower portion of each of the first and second cooling air feeder shells.

13. The system according to claim 12, wherein a cooling air flow pathway is defined and configured in which ambient cooling air is drawn vertically down into the first and second cooling air feeder shells, flows horizontally through the first and second flow conduits to the first cavity enclosure container, rises vertically in the internal cavity of the first cavity enclosure container, and exits from the air outlet at the top end of the first cavity enclosure container to atmosphere.

14. The system according to claim 1, wherein the first and second air inlets of the first and second cavity enclosure containers are configured to introduce the cooling air tangentially into the internal cavity of the first cavity enclosure container.

15. The system according to claim 14, wherein the first and second flow conduits are oriented horizontally at an acute angle to the longitudinal axis, and the first and second cooling air feeder shells are not located on the longitudinal axis.

16. The system according to claim 1, wherein the first and second cooling air feeder shells are spaced apart and located on a first lateral side of the first cavity enclosure container.

17. The system according to claim 16, further comprising:

vertically elongated third and fourth cooling air feeder shells spaced apart and located on a second lateral side of the first cavity enclosure container opposite the first lateral side, the third and fourth cooling air feeder shells each being fluidly coupled directly to the first cavity enclosure container by third and fourth flow conduits, respectively;

the third and fourth cooling air feeder shells each being fixedly mounted on a second support plate anchored to the base pad and spaced apart from the first cavity enclosure container, the third and fourth cooling air feeder shells each having a top end located at or above the top surface of the top pad and operable to draw in ambient air, and a bottom end located on the second support plate.

18. The system according to claim 17, wherein the third and fourth cooling air feeder shells are fluidly coupled directly to a second cavity enclosure container by fifth and sixth flow conduits, respectively.

19. The system according to claim 18, wherein second cavity enclosure container is located on the longitudinal axis, and the first, second, third, and fourth cooling air feeder shells are not located on the longitudinal axis.

20. The system according to claim 19, wherein the first and third cooling air feeder shells are located on a first side of the longitudinal axis, and the second and fourth cooling air feeder shells are located on a second side of the longitudinal axis opposite the first side of the longitudinal axis.

* * * * *